(12) United States Patent
Petite

(10) Patent No.: US 7,103,511 B2
(45) Date of Patent: Sep. 5, 2006

(54) WIRELESS COMMUNICATION NETWORKS FOR PROVIDING REMOTE MONITORING OF DEVICES

(75) Inventor: Thomas D. Petite, Douglasville, GA (US)

(73) Assignee: StatSignal IPC, LLC, Atlanta, GA (US)

(*) Notice: Subject to any disclaimer, the term of this patent is extended or adjusted under 35 U.S.C. 154(b) by 716 days.

(21) Appl. No.: 09/925,269

(22) Filed: Aug. 9, 2001

(65) Prior Publication Data

US 2002/0019725 A1  Feb. 14, 2002

Related U.S. Application Data

(63) Continuation-in-part of application No. 09/812,809, filed on Mar. 20, 2001, now abandoned, which is a continuation-in-part of application No. 09/412,895, filed on Oct. 5, 1999, now Pat. No. 6,218,953, which is a continuation-in-part of application No. 09/172,554, filed on Oct. 14, 1998, now Pat. No. 6,028,522, and a continuation-in-part of application No. 09/271,517, filed on Mar. 18, 1999, now abandoned, and a continuation-in-part of application No. 09/439,059, filed on Nov. 12, 1999, now Pat. No. 6,437,692.

(51) Int. Cl.
*G06F 15/00* (2006.01)

(52) U.S. Cl. .................. 702/188; 340/870.06; 455/423

(58) Field of Classification Search ................. 702/188, 702/57; 315/133–134, 139, 149; 340/870.01, 340/870.06, 870.07, 870.16; 455/73, 403, 455/422–423

See application file for complete search history.

(56) References Cited

U.S. PATENT DOCUMENTS 3,665,475 A  5/1972  Gram (Continued)

FOREIGN PATENT DOCUMENTS

EP  0718954  6/1996

(Continued)

OTHER PUBLICATIONS

"Part15.1: Wireless Medium Access Control (MAC) and Physical Layer (PHY) Specifications for Wireless Personal Area Networks (WPANS)", Jun. 14, 2002, IEEE, www.ieee802.org/15/Bluetooth/802-15-1_Clause_05.pdf.*

(Continued)

*Primary Examiner*—Marc S. Hoff
*Assistant Examiner*—Mary Catherine Baran
(74) *Attorney, Agent, or Firm*—Troutman Sanders LLP; Ryan A. Schneider; James Hunt Yancey, Jr.

(57) ABSTRACT

Wireless communication networks for monitoring and controlling a plurality of remote devices are provided. Briefly, one embodiment of a wireless communication network may comprise a plurality of wireless transceivers having unique identifiers. Each of the plurality of wireless transceivers may be configured to receive a sensor data signal from one of the plurality of remote devices and transmit an original data message using a predefined wireless communication protocol. The original data message may comprise the corresponding unique identifier and sensor data signal. Each of the plurality of wireless transceivers may be configured to receive the original data message transmitted by one of the other wireless transceivers and transmit a repeated data message using the predefined communication protocol. The repeated data message may include the sensor data signal and the corresponding unique identifier. Furthermore, at least one of the plurality of wireless transceivers may be further configured to provide the original data messages and the repeated data messages to a site controller connected to a wide area network. The site controller may be configured to manage communications between the wireless communication network and a host computer connected to the wide area network.

29 Claims, 10 Drawing Sheets

U.S. PATENT DOCUMENTS

| | | |
|---|---|---|
| 3,705,385 A | 12/1972 | Batz |
| 3,723,876 A | 3/1973 | Seaborn, Jr. |
| 3,742,142 A | 6/1973 | Martin |
| 3,848,231 A | 11/1974 | Wooten |
| 3,892,948 A | 7/1975 | Constable |
| 3,906,460 A | 9/1975 | Halpern ................. 340/172.5 |
| 3,914,692 A | 10/1975 | Seaborn, Jr. |
| 3,922,492 A | 11/1975 | Lumsden |
| 3,925,763 A | 12/1975 | Wadwhani et al. |
| 4,025,315 A | 5/1977 | Mazelli ........................ 44/52 |
| 4,056,684 A | 11/1977 | Lindstrom |
| 4,083,003 A | 4/1978 | Haemmig |
| 4,120,452 A | 10/1978 | Kimura et al. |
| 4,124,839 A | 11/1978 | Cohen |
| 4,135,181 A | 1/1979 | Bogacki et al. |
| 4,204,195 A | 5/1980 | Bogacki |
| 4,213,119 A | 7/1980 | Ward et al. |
| 4,277,837 A | 7/1981 | Stuckert |
| 4,354,181 A | 10/1982 | Spletzer ..................... 340/642 |
| 4,396,910 A | 8/1983 | Enemark et al. |
| 4,396,915 A | 8/1983 | Farnsworth et al. |
| 4,417,450 A | 11/1983 | Morgan, Jr. et al. |
| 4,436,957 A | 3/1984 | Mazza |
| 4,446,454 A | 5/1984 | Pyle |
| 4,454,414 A | 6/1984 | Benton |
| 4,468,656 A | 8/1984 | Clifford et al. |
| 4,488,152 A | 12/1984 | Arnason et al. |
| 4,495,496 A | 1/1985 | Miller, III |
| 4,551,719 A * | 11/1985 | Carlin et al. ............ 340/825.36 |
| 4,605,844 A | 8/1986 | Haggan ..................... 235/380 |
| 4,611,198 A | 9/1986 | Levinson et al. |
| 4,621,263 A | 11/1986 | Takenaka et al. |
| 4,630,035 A | 12/1986 | Stahl et al. ................. 340/539 |
| 4,631,357 A | 12/1986 | Grunig |
| 4,670,739 A | 6/1987 | Kelly, Jr. |
| 4,707,852 A | 11/1987 | Jahr et al. |
| 4,731,810 A | 3/1988 | Watkins |
| 4,742,296 A | 5/1988 | Petr et al. |
| 4,757,185 A | 7/1988 | Onishi ........................ 235/379 |
| 4,800,543 A | 1/1989 | Lyndon-James et al. ...... 368/10 |
| 4,825,457 A | 4/1989 | Lebowitz |
| 4,829,561 A | 5/1989 | Matheny |
| 4,849,815 A | 7/1989 | Streck |
| 4,851,654 A | 7/1989 | Nitta ........................... 235/492 |
| 4,856,046 A | 8/1989 | Steck et al. |
| 4,857,912 A | 8/1989 | Everett, Jr. et al. ....... 340/825.3 |
| 4,875,231 A | 10/1989 | Hara et al. |
| 4,884,132 A | 11/1989 | Morris et al. |
| 4,897,644 A | 1/1990 | Hirano ................. 340/825.31 |
| 4,906,828 A | 3/1990 | Halpern ..................... 235/379 |
| 4,908,769 A | 3/1990 | Vaughan et al. |
| 4,918,690 A | 4/1990 | Markkula, Jr. et al. |
| 4,918,995 A | 4/1990 | Pearman et al. |
| 4,928,299 A | 5/1990 | Tansky et al. |
| 4,940,976 A | 7/1990 | Gastouniotis et al. |
| 4,949,077 A | 8/1990 | Mbuthia |
| 4,952,928 A | 8/1990 | Carroll et al. |
| 4,962,496 A | 10/1990 | Vercellotti et al. |
| 4,967,366 A | 10/1990 | Kaehler |
| 4,968,970 A | 11/1990 | LaPorte |
| 4,968,978 A * | 11/1990 | Stolarczyk ............... 340/854.6 |
| 4,972,504 A | 11/1990 | Daniel, Jr. et al. |
| 4,973,957 A | 11/1990 | Shimizu et al. |
| 4,973,970 A | 11/1990 | Reeser |
| 4,977,612 A | 12/1990 | Wilson |
| 4,980,907 A | 12/1990 | Raith et al. |
| 4,989,230 A | 1/1991 | Gillig et al. |
| 4,991,008 A | 2/1991 | Nama ........................ 358/108 |
| 4,998,095 A | 3/1991 | Shields |
| 4,999,607 A | 3/1991 | Evans |
| 5,032,833 A | 7/1991 | Laporte |
| 5,038,372 A | 8/1991 | Elms et al. ..................... 379/94 |
| 5,055,851 A | 10/1991 | Sheffer |
| 5,057,814 A | 10/1991 | Onan et al. ................. 340/458 |
| 5,061,997 A | 10/1991 | Rea et al. .................... 358/108 |
| 5,086,391 A | 2/1992 | Chambers |
| 5,091,713 A | 2/1992 | Horne et al. ................. 340/541 |
| 5,111,199 A | 5/1992 | Tomoda et al. ........ 340/825.72 |
| 5,113,183 A | 5/1992 | Mizuno et al. ........ 340/825.31 |
| 5,113,184 A | 5/1992 | Katayama .............. 340/825.54 |
| 5,115,224 A | 5/1992 | Kostusiak et al. |
| 5,115,433 A | 5/1992 | Baran et al. |
| 5,124,624 A | 6/1992 | de Vries et al. |
| 5,128,855 A | 7/1992 | Hilber et al. |
| 5,130,519 A | 7/1992 | Bush et al. .................. 235/380 |
| 5,131,038 A | 7/1992 | Puhl et al. |
| 5,134,650 A | 7/1992 | Blackmon |
| 5,136,285 A | 8/1992 | Okuyama |
| 5,155,481 A | 10/1992 | Brennan, Jr. et al. |
| 5,159,317 A | 10/1992 | Brav |
| 5,162,776 A | 11/1992 | Bushnell et al. |
| 5,177,342 A | 1/1993 | Adams |
| 5,189,287 A | 2/1993 | Parienti |
| 5,191,192 A | 3/1993 | Takahira et al. ............. 235/375 |
| 5,191,326 A | 3/1993 | Montgomery |
| 5,193,111 A | 3/1993 | Matty et al. |
| 5,195,018 A | 3/1993 | Kwon et al. |
| 5,197,095 A | 3/1993 | Bonnet et al. |
| 5,200,735 A | 4/1993 | Hines ......................... 340/539 |
| 5,204,670 A | 4/1993 | Stinton |
| 5,212,645 A | 5/1993 | Wildes et al. ............... 364/463 |
| 5,216,502 A | 6/1993 | Katz ........................... 358/108 |
| 5,221,838 A | 6/1993 | Gutman et al. |
| 5,223,844 A | 6/1993 | Mansell et al. |
| 5,231,658 A | 7/1993 | Eftechiou |
| 5,235,630 A | 8/1993 | Moody et al. ................. 379/37 |
| 5,239,575 A | 8/1993 | White et al. |
| 5,241,410 A | 8/1993 | Streck et al. |
| 5,243,338 A | 9/1993 | Brennan, Jr. et al. ... 340/870.02 |
| 5,245,633 A | 9/1993 | Schwartz et al. |
| 5,252,967 A | 10/1993 | Brennan et al. |
| 5,253,167 A | 10/1993 | Yoshida et al. ............. 364/408 |
| 5,265,150 A | 11/1993 | Heimkamp et al. |
| 5,265,162 A | 11/1993 | Bush et al. .................... 380/24 |
| 5,266,782 A | 11/1993 | Alanara et al. |
| 5,272,747 A | 12/1993 | Meads |
| 5,282,204 A | 1/1994 | Shpancer et al. |
| 5,282,250 A | 1/1994 | Dent et al. |
| 5,289,165 A | 2/1994 | Belin |
| 5,295,154 A | 3/1994 | Meier et al. |
| 5,305,370 A | 4/1994 | Kearns et al. ................. 379/45 |
| 5,315,645 A | 5/1994 | Matheny |
| 5,317,309 A | 5/1994 | Vercellotti et al. ...... 340/825.54 |
| 5,319,364 A | 6/1994 | Waraksa et al. ........ 340/825.72 |
| 5,319,698 A | 6/1994 | Glidewell et al. ............. 379/39 |
| 5,319,711 A | 6/1994 | Servi ........................... 380/23 |
| 5,323,384 A | 6/1994 | Norwood et al. |
| 5,325,429 A | 6/1994 | Kurgan |
| 5,331,318 A | 7/1994 | Montgomery |
| 5,334,974 A | 8/1994 | Simms et al. |
| 5,343,493 A | 8/1994 | Karimullah |
| 5,345,231 A | 9/1994 | Koo et al. ............... 340/870.31 |
| 5,347,263 A | 9/1994 | Carroll et al. ............... 340/572 |
| 5,354,974 A | 10/1994 | Eisenberg ................... 235/379 |
| 5,355,513 A | 10/1994 | Clarke et al. |
| 5,365,217 A | 11/1994 | Toner |
| 5,371,736 A | 12/1994 | Evan |
| 5,382,778 A | 1/1995 | Takahira et al. ............. 235/380 |
| 5,383,134 A | 1/1995 | Wrzesinski |
| 5,406,619 A | 4/1995 | Akhteruzzman et al. |
| 5,412,192 A | 5/1995 | Hoss |
| 5,412,760 A | 5/1995 | Peitz |
| 5,416,475 A | 5/1995 | Tolbert et al. |
| 5,416,725 A * | 5/1995 | Pacheco et al. ............. 702/176 |

| Patent | Date | Inventor | Ref |
|---|---|---|---|
| 5,418,812 A | 5/1995 | Reyes et al. | |
| 5,424,708 A | 6/1995 | Ballesty et al. | |
| 5,432,507 A | 7/1995 | Mussino et al. | |
| 5,438,329 A | 8/1995 | Gastouniotis et al. | |
| 5,439,414 A | 8/1995 | Jacob | |
| 5,442,553 A | 8/1995 | Parrillo | |
| 5,445,287 A | 8/1995 | Center et al. | |
| 5,451,929 A | 9/1995 | Adelman et al. | |
| 5,451,938 A | 9/1995 | Brennan, Jr. | 340/870.14 |
| 5,452,344 A | 9/1995 | Larson | 379/107 |
| 5,465,401 A | 11/1995 | Thompson | |
| 5,467,074 A | 11/1995 | Pedtke | |
| 5,467,082 A | 11/1995 | Sanderson | 340/825.54 |
| 5,467,345 A | 11/1995 | Cutler et al. | |
| 5,468,948 A | 11/1995 | Koenck et al. | |
| 5,471,201 A | 11/1995 | Cerami et al. | 340/641 |
| 5,473,322 A | 12/1995 | Carney | |
| 5,475,689 A | 12/1995 | Kay et al. | |
| 5,481,259 A | 1/1996 | Bane | |
| 5,484,997 A | 1/1996 | Haynes | 235/492 |
| 5,493,273 A | 2/1996 | Smurlo et al. | |
| 5,493,287 A | 2/1996 | Bane | |
| 5,506,837 A | 4/1996 | Sollner et al. | |
| 5,509,073 A | 4/1996 | Monnin | |
| 5,513,244 A | 4/1996 | Joao et al. | |
| 5,515,419 A | 5/1996 | Sheffer | 379/58 |
| 5,517,188 A | 5/1996 | Carroll et al. | 340/825.54 |
| 5,522,089 A | 5/1996 | Kikinis et al. | |
| 5,528,215 A | 6/1996 | Siu et al. | |
| 5,539,825 A | 7/1996 | Akiyama et al. | |
| 5,541,938 A | 7/1996 | Di Zenzo et al. | |
| 5,542,100 A | 7/1996 | Hatakeyama | |
| 5,544,036 A | 8/1996 | Brown, Jr. et al. | |
| 5,544,784 A | 8/1996 | Malaspina | 221/135 |
| 5,548,632 A | 8/1996 | Walsh et al. | 379/58 |
| 5,550,358 A | 8/1996 | Tait et al. | |
| 5,550,359 A | 8/1996 | Bennett | 235/382 |
| 5,550,535 A | 8/1996 | Park | 340/825.44 |
| 5,553,094 A | 9/1996 | Johnson et al. | 375/200 |
| 5,555,258 A | 9/1996 | Snelling et al. | |
| 5,555,286 A | 9/1996 | Tendler | |
| 5,562,537 A | 10/1996 | Zver et al. | |
| 5,565,857 A | 10/1996 | Lee | 340/825.34 |
| 5,572,438 A | 11/1996 | Ehlers et al. | |
| 5,573,181 A | 11/1996 | Ahmed | |
| 5,574,111 A | 11/1996 | Brichta et al. | |
| 5,583,850 A | 12/1996 | Snodgrass et al. | |
| 5,587,705 A | 12/1996 | Morris | |
| 5,589,878 A | 12/1996 | Cortjens et al. | 348/211 |
| 5,590,038 A | 12/1996 | Pitroda | |
| 5,590,179 A | 12/1996 | Shincovich et al. | 379/107 |
| 5,592,491 A | 1/1997 | Dinks | |
| 5,594,431 A | 1/1997 | Sheppard et al. | |
| 5,602,843 A | 2/1997 | Gray | |
| 5,604,414 A | 2/1997 | Milligan et al. | |
| 5,604,869 A | 2/1997 | Mincher et al. | |
| 5,606,361 A | 2/1997 | Davidsohn et al. | |
| 5,608,786 A | 3/1997 | Gordon | |
| 5,613,620 A | 3/1997 | Center et al. | |
| 5,615,277 A | 3/1997 | Hoffman | |
| 5,619,192 A | 4/1997 | Ayala | 340/870.02 |
| 5,625,410 A | 4/1997 | Washino et al. | |
| 5,628,050 A | 5/1997 | McGraw et al. | |
| 5,629,687 A | 5/1997 | Sutton et al. | |
| 5,629,875 A | 5/1997 | Adair, Jr. | |
| 5,630,209 A | 5/1997 | Wizgall et al. | 455/66 |
| 5,631,554 A | 5/1997 | Briese et al. | 324/76.77 |
| 5,644,294 A | 7/1997 | Ness | |
| 5,655,219 A | 8/1997 | Jusa et al. | 370/338 |
| 5,657,389 A | 8/1997 | Houvener | |
| 5,659,300 A | 8/1997 | Dresselhuys et al. | 340/870.02 |
| 5,659,303 A | 8/1997 | Adair, Jr. | 340/870.18 |
| 5,668,876 A | 9/1997 | Falk et al. | |
| 5,673,252 A | 9/1997 | Johnson et al. | |
| 5,673,304 A | 9/1997 | Connor et al. | |
| 5,673,305 A | 9/1997 | Ross | |
| 5,682,139 A | 10/1997 | Pradeep et al. | 340/539 |
| 5,682,476 A | 10/1997 | Tapperson et al. | |
| 5,689,229 A | 11/1997 | Chaco et al. | 340/286.07 |
| 5,699,328 A | 12/1997 | Ishizaki et al. | |
| 5,701,002 A | 12/1997 | Oishi et al. | |
| 5,704,046 A | 12/1997 | Hogan | |
| 5,704,517 A | 1/1998 | Lancaster, Jr. | |
| 5,706,191 A | 1/1998 | Bassett et al. | |
| 5,706,976 A | 1/1998 | Purkey | |
| 5,708,223 A | 1/1998 | Wyss | |
| 5,708,655 A | 1/1998 | Toth | |
| 5,712,619 A | 1/1998 | Simkin | |
| 5,712,980 A | 1/1998 | Beeler et al. | |
| 5,714,931 A | 2/1998 | Petite et al. | |
| 5,717,718 A | 2/1998 | Roswell et al. | |
| 5,726,634 A | 3/1998 | Hess et al. | |
| 5,726,984 A | 3/1998 | Kubler et al. | 370/349 |
| 5,732,074 A | 3/1998 | Spaur et al. | |
| 5,732,078 A | 3/1998 | Arango | |
| 5,736,965 A | 4/1998 | Mosebrook et al. | 343/702 |
| 5,740,232 A | 4/1998 | Pailles et al. | |
| 5,742,509 A | 4/1998 | Goldberg et al. | 364/449.5 |
| 5,745,849 A | 4/1998 | Britton | |
| 5,748,104 A | 5/1998 | Argyroudis et al. | |
| 5,748,619 A | 5/1998 | Meier | |
| 5,754,111 A | 5/1998 | Garcia | 340/573 |
| 5,754,227 A | 5/1998 | Fukuoka | 348/232 |
| 5,757,783 A | 5/1998 | Eng et al. | |
| 5,757,788 A | 5/1998 | Tatsumi et al. | |
| 5,761,083 A | 6/1998 | Brown, Jr. et al. | |
| 5,764,742 A | 6/1998 | Howard et al. | |
| 5,771,274 A | 6/1998 | Harris | |
| 5,774,052 A | 6/1998 | Hamm et al. | 340/540 |
| 5,781,143 A | 7/1998 | Rossin | |
| 5,790,644 A | 8/1998 | Kikinis | |
| 5,790,662 A | 8/1998 | Valerij et al. | |
| 5,790,938 A | 8/1998 | Talarmo | |
| 5,796,727 A | 8/1998 | Harrison et al. | |
| 5,798,964 A | 8/1998 | Shimizu et al. | |
| 5,801,643 A | 9/1998 | Williams et al. | |
| 5,815,505 A | 9/1998 | Mills | |
| 5,818,822 A | 10/1998 | Thomas et al. | |
| 5,822,273 A | 10/1998 | Bary et al. | |
| 5,822,544 A | 10/1998 | Chaco et al. | 395/202 |
| 5,826,195 A | 10/1998 | Westerlage et al. | |
| 5,828,044 A | 10/1998 | Jun et al. | |
| 5,832,057 A | 11/1998 | Furman | |
| 5,838,223 A | 11/1998 | Gallant et al. | 340/286.07 |
| 5,838,237 A | 11/1998 | Revell et al. | 340/573 |
| 5,838,812 A | 11/1998 | Pare, Jr. et al. | |
| 5,841,118 A | 11/1998 | East et al. | |
| 5,841,764 A | 11/1998 | Roderique et al. | |
| 5,842,976 A | 12/1998 | Williamson | |
| 5,844,808 A | 12/1998 | Konsmo et al. | |
| 5,845,230 A | 12/1998 | Lamberson | 702/56 |
| 5,852,658 A | 12/1998 | Knight et al. | |
| 5,854,994 A | 12/1998 | Canada et al. | |
| 5,862,201 A | 1/1999 | Sands | |
| 5,864,772 A | 1/1999 | Alvarado et al. | |
| 5,873,043 A | 2/1999 | Comer | |
| 5,874,903 A | 2/1999 | Shuey et al. | 340/870.02 |
| 5,880,677 A | 3/1999 | Lestician | 340/825.06 |
| 5,884,184 A | 3/1999 | Sheffer | |
| 5,884,271 A | 3/1999 | Pitroda | |
| 5,886,333 A | 3/1999 | Miyake | |
| 5,889,468 A | 3/1999 | Banga | |
| 5,892,690 A | 4/1999 | Boatman et al. | |
| 5,892,758 A | 4/1999 | Argyroudis | |
| 5,892,924 A | 4/1999 | Lyon et al. | |
| 5,896,097 A | 4/1999 | Cardozo | 340/870.03 |

| Patent | Date | Inventor | Class |
|---|---|---|---|
| 5,897,607 A | 4/1999 | Jenney et al. | 702/62 |
| 5,898,369 A | 4/1999 | Godwin | |
| 5,905,438 A | 5/1999 | Weiss et al. | |
| 5,907,291 A | 5/1999 | Chen et al. | |
| 5,907,491 A * | 5/1999 | Canada et al. | 700/108 |
| 5,907,540 A | 5/1999 | Hayashi | |
| 5,907,807 A | 5/1999 | Chavez, Jr. et al. | |
| 5,914,672 A | 6/1999 | Glorioso et al. | |
| 5,914,673 A | 6/1999 | Jennings et al. | 340/870.03 |
| 5,917,405 A | 6/1999 | Joao | 340/426 |
| 5,917,629 A | 6/1999 | Hortensius et al. | 359/136 |
| 5,923,269 A | 7/1999 | Shuey et al. | |
| 5,926,103 A | 7/1999 | Petite | |
| 5,926,529 A | 7/1999 | Hache et al. | |
| 5,926,531 A | 7/1999 | Petite | |
| 5,933,073 A | 8/1999 | Shuey | |
| 5,941,363 A | 8/1999 | Partyka et al. | |
| 5,948,040 A | 9/1999 | DeLorme et al. | |
| 5,949,779 A | 9/1999 | Mostafa et al. | |
| 5,949,799 A | 9/1999 | Grivna et al. | |
| 5,953,371 A | 9/1999 | Roswell et al. | |
| 5,955,718 A | 9/1999 | Levasseur et al. | |
| 5,960,074 A | 9/1999 | Clark | |
| 5,963,146 A | 10/1999 | Johnson et al. | |
| 5,963,452 A | 10/1999 | Etoh et al. | 364/479.06 |
| 5,963,650 A | 10/1999 | Simionescu et al. | 380/49 |
| 5,969,608 A | 10/1999 | Sojdehei et al. | 340/551 |
| 5,973,756 A | 10/1999 | Erlin | |
| 5,978,364 A | 11/1999 | Melnik | |
| 5,978,371 A | 11/1999 | Mason, Jr. et al. | 370/389 |
| 5,986,574 A | 11/1999 | Colton | |
| 5,987,421 A | 11/1999 | Chuang | |
| 5,991,639 A | 11/1999 | Rautiola et al. | |
| 5,994,892 A | 11/1999 | Turino et al. | |
| 5,995,592 A | 11/1999 | Shirai et al. | |
| 5,995,593 A | 11/1999 | Cho | |
| 5,997,170 A | 12/1999 | Brodbeck | |
| 5,999,094 A | 12/1999 | Nilssen | |
| 6,005,759 A | 12/1999 | Hart et al. | |
| 6,005,963 A | 12/1999 | Bolle et al. | |
| 6,021,664 A | 2/2000 | Granato et al. | |
| 6,023,223 A | 2/2000 | Baxter, Jr. | 340/531 |
| 6,028,522 A | 2/2000 | Petite | 340/641 |
| 6,028,857 A | 2/2000 | Poor | |
| 6,031,455 A | 2/2000 | Grube et al. | |
| 6,032,197 A | 2/2000 | Birdwell et al. | 709/247 |
| 6,035,266 A | 3/2000 | Williams et al. | |
| 6,036,086 A | 3/2000 | Sizer, II et al. | |
| 6,038,491 A | 3/2000 | McGarry et al. | 700/231 |
| 6,044,062 A | 3/2000 | Brownrigg et al. | |
| 6,054,920 A | 4/2000 | Smith et al. | |
| 6,060,994 A | 5/2000 | Chen | 340/825.06 |
| 6,061,604 A | 5/2000 | Russ et al. | |
| 6,064,318 A | 5/2000 | Kirchner, III et al. | |
| 6,067,030 A | 5/2000 | Burnett et al. | |
| 6,069,886 A | 5/2000 | Ayerst et al. | |
| 6,073,169 A | 6/2000 | Shuey et al. | 709/217 |
| 6,073,266 A | 6/2000 | Ahmed et al. | |
| 6,073,840 A | 6/2000 | Marion | |
| 6,075,451 A | 6/2000 | Lebowitz et al. | 340/825.06 |
| 6,087,957 A | 7/2000 | Gray | 340/825.54 |
| 6,088,659 A | 7/2000 | Kelley et al. | 702/62 |
| 6,094,622 A | 7/2000 | Hubbard et al. | |
| 6,100,817 A * | 8/2000 | Mason et al. | 340/870.02 |
| 6,101,427 A | 8/2000 | Yang | |
| 6,101,445 A | 8/2000 | Alvarado et al. | |
| 6,112,983 A | 9/2000 | D'Anniballe et al. | |
| 6,119,076 A | 9/2000 | Williams et al. | |
| 6,121,593 A | 9/2000 | Mansbery et al. | |
| 6,121,885 A | 9/2000 | Masone et al. | |
| 6,124,806 A | 9/2000 | Cunningham et al. | |
| 6,127,917 A | 10/2000 | Tuttle | |
| 6,128,551 A | 10/2000 | Davis et al. | |
| 6,130,622 A | 10/2000 | Hussey et al. | |
| 6,133,850 A | 10/2000 | Moore | |
| 6,137,423 A | 10/2000 | Glorioso et al. | |
| 6,140,975 A | 10/2000 | Cohen | |
| 6,141,347 A * | 10/2000 | Shaughnessy et al. | 370/390 |
| 6,150,936 A | 11/2000 | Addy | |
| 6,150,955 A | 11/2000 | Tracy et al. | |
| 6,157,464 A | 12/2000 | Bloomfield et al. | 358/407 |
| 6,157,824 A | 12/2000 | Bailey | |
| 6,163,276 A | 12/2000 | Irving et al. | |
| 6,172,616 B1 | 1/2001 | Johnson et al. | |
| 6,174,205 B1 | 1/2001 | Madsen et al. | 439/638 |
| 6,175,922 B1 | 1/2001 | Wang | |
| 6,177,883 B1 | 1/2001 | Jennetti et al. | |
| 6,181,255 B1 | 1/2001 | Crimmins et al. | |
| 6,181,284 B1 | 1/2001 | Madsen et al. | 343/702 |
| 6,181,981 B1 | 1/2001 | Varga et al. | 700/236 |
| 6,188,354 B1 | 2/2001 | Soliman et al. | 342/387 |
| 6,192,390 B1 | 2/2001 | Berger et al. | |
| 6,198,390 B1 * | 3/2001 | Schlager et al. | 340/540 |
| 6,199,068 B1 | 3/2001 | Carpenter | |
| 6,208,266 B1 | 3/2001 | Lyons et al. | |
| 6,215,404 B1 | 4/2001 | Morales | |
| 6,218,953 B1 | 4/2001 | Petite | 340/641 |
| 6,218,983 B1 | 4/2001 | Kerry et al. | |
| 6,219,409 B1 | 4/2001 | Smith et al. | |
| 6,229,439 B1 | 5/2001 | Tice | |
| 6,233,327 B1 | 5/2001 | Petite | 379/155 |
| 6,234,111 B1 | 5/2001 | Ulman et al. | |
| 6,236,332 B1 | 5/2001 | Conkright et al. | |
| 6,243,010 B1 | 6/2001 | Addy et al. | |
| 6,246,677 B1 | 6/2001 | Nap et al. | 370/346 |
| 6,249,516 B1 | 6/2001 | Brownrigg et al. | |
| 6,259,369 B1 | 7/2001 | Monico | |
| 6,286,756 B1 | 9/2001 | Stinson et al. | |
| 6,288,634 B1 | 9/2001 | Weiss et al. | |
| 6,288,641 B1 * | 9/2001 | Casais | 340/539 |
| 6,295,291 B1 | 9/2001 | Larkins | |
| 6,301,514 B1 | 10/2001 | Canada et al. | |
| 6,305,602 B1 | 10/2001 | Grabowski et al. | |
| 6,308,111 B1 | 10/2001 | Koga | |
| 6,311,167 B1 | 10/2001 | Davis et al. | |
| 6,314,169 B1 | 11/2001 | Schelberg, Jr. et al. | 379/93.12 |
| 6,317,029 B1 | 11/2001 | Fleeter | |
| 6,334,117 B1 | 12/2001 | Covert et al. | |
| 6,351,223 B1 | 2/2002 | DeWeerd et al. | |
| 6,356,205 B1 | 3/2002 | Salvo et al. | |
| 6,357,034 B1 | 3/2002 | Muller et al. | 714/484 |
| 6,362,745 B1 | 3/2002 | Davis | |
| 6,363,057 B1 | 3/2002 | Ardalan et al. | 370/252 |
| 6,366,217 B1 | 4/2002 | Cunningham et al. | 340/870.31 |
| 6,369,769 B1 | 4/2002 | Nap et al. | 343/719 |
| 6,370,489 B1 | 4/2002 | Williams et al. | |
| 6,373,399 B1 | 4/2002 | Johnson et al. | |
| 6,380,851 B1 | 4/2002 | Gilbert et al. | |
| 6,384,722 B1 | 5/2002 | Williams | |
| 6,393,341 B1 | 5/2002 | Lawrence et al. | |
| 6,393,381 B1 | 5/2002 | Williams et al. | |
| 6,393,382 B1 | 5/2002 | Williams et al. | |
| 6,396,839 B1 | 5/2002 | Ardalan et al. | 370/401 |
| 6,400,819 B1 | 6/2002 | Nakano et al. | |
| 6,401,081 B1 | 6/2002 | Montgomery et al. | |
| 6,411,889 B1 * | 6/2002 | Mizunuma et al. | 701/117 |
| 6,415,245 B1 * | 7/2002 | Williams et al. | 702/188 |
| 6,422,464 B1 | 7/2002 | Terranova | |
| 6,424,270 B1 | 7/2002 | Ali | |
| 6,424,931 B1 | 7/2002 | Sigmar et al. | |
| 6,430,268 B1 | 8/2002 | Petite | 379/39 |
| 6,431,439 B1 | 8/2002 | Suer et al. | |
| 6,437,692 B1 | 8/2002 | Petite et al. | |
| 6,438,575 B1 | 8/2002 | Khan et al. | |
| 6,445,291 B1 | 9/2002 | Addy et al. | |
| 6,456,960 B1 | 9/2002 | Williams et al. | |

| | | |
|---|---|---|
| 6,457,038 B1 | 9/2002 | Defosse ................... 709/200 |
| 6,462,644 B1 | 10/2002 | Howell et al. ............. 340/5.92 |
| 6,462,672 B1 | 10/2002 | Besson |
| 6,477,558 B1 | 11/2002 | Irving et al. |
| 6,483,290 B1 | 11/2002 | Hemminger et al. |
| 6,484,939 B1 | 11/2002 | Blaeuer |
| 6,489,884 B1 | 12/2002 | Lamberson et al. |
| 6,491,828 B1 | 12/2002 | Sivavec et al. |
| 6,492,910 B1 | 12/2002 | Ragle et al. |
| 6,504,357 B1 | 1/2003 | Hemminger et al. ........ 324/142 |
| 6,507,794 B1 | 1/2003 | Hubbard et al. |
| 6,509,722 B1 | 1/2003 | Lopata |
| 6,519,568 B1 | 2/2003 | Harvey et al. |
| 6,538,577 B1 | 3/2003 | Ehrke et al. |
| 6,542,076 B1 | 4/2003 | Joao |
| 6,542,077 B1 | 4/2003 | Joao |
| 6,543,690 B1 | 4/2003 | Leydier et al. |
| 6,560,223 B1 | 5/2003 | Egan et al. |
| 6,574,603 B1 | 6/2003 | Dickson et al. |
| 6,600,726 B1 | 7/2003 | Nevo et al. |
| 6,608,551 B1 | 8/2003 | Anderson et al. |
| 6,618,578 B1 | 9/2003 | Petite |
| 6,618,709 B1 | 9/2003 | Sneeringer |
| 6,628,764 B1 | 9/2003 | Petite |
| 6,628,965 B1 | 9/2003 | LaRosa et al. |
| 6,653,945 B1 | 11/2003 | Johnson et al. |
| 6,671,586 B1 | 12/2003 | Davis et al. |
| 6,674,403 B1 | 1/2004 | Gray et al. |
| 6,678,255 B1 | 1/2004 | Kuriyan |
| 6,678,285 B1 | 1/2004 | Garg |
| 6,731,201 B1 | 5/2004 | Bailey et al. |
| 6,735,630 B1 | 5/2004 | Gelvin et al. |
| 6,747,557 B1 | 6/2004 | Petite et al. |
| 6,771,981 B1 | 8/2004 | Zalewski et al. |
| 6,891,838 B1 | 5/2005 | Petite |
| 6,914,533 B1 | 7/2005 | Petite |
| 6,914,893 B1 | 7/2005 | Petite |
| 6,959,550 B1 | 11/2005 | Freeman et al. |
| 2001/0002210 A1 | 5/2001 | Petite |
| 2001/0003479 A1 | 6/2001 | Fujiwara |
| 2001/0021646 A1 | 9/2001 | Antonucci et al. |
| 2001/0024163 A1 | 9/2001 | Petite |
| 2001/0034223 A1 | 10/2001 | Rieser et al. |
| 2001/0038343 A1 | 11/2001 | Meyer et al. |
| 2002/0002444 A1 | 1/2002 | Williams et al. |
| 2002/0012323 A1 | 1/2002 | Petite et al. |
| 2002/0013679 A1 | 1/2002 | Petite |
| 2002/0019725 A1 | 2/2002 | Petite |
| 2002/0027504 A1 | 3/2002 | Petite |
| 2002/0031101 A1 | 3/2002 | Petite |
| 2002/0032746 A1 | 3/2002 | Lazaridis |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0098858 A1 | 7/2002 | Struhsaker |
| 2002/0109607 A1 | 8/2002 | Cumeralto et al. |
| 2002/0158774 A1 | 10/2002 | Johnson et al. |
| 2002/0163442 A1 | 11/2002 | Fischer |
| 2002/0169643 A1 | 11/2002 | Petite |
| 2002/0193144 A1 | 12/2002 | Belski et al. |
| 2003/0001754 A1 | 1/2003 | Johnson et al. |
| 2003/0028632 A1 | 2/2003 | Davis |
| 2003/0030926 A1 | 2/2003 | Aguren et al. |
| 2003/0034900 A1 | 2/2003 | Han |
| 2003/0036822 A1 | 2/2003 | Davis et al. |
| 2003/0046377 A1 | 3/2003 | Daum et al. |
| 2003/0058818 A1 | 3/2003 | Wilkes et al. |
| 2003/0069002 A1 | 4/2003 | Hunter et al. |
| 2003/0078029 A1 | 4/2003 | Petite |
| 2003/0093484 A1 | 5/2003 | Petite |
| 2003/0133473 A1 | 7/2003 | Manis et al. |
| 2003/0169710 A1 | 9/2003 | Fan et al. |
| 2003/0210638 A1 | 11/2003 | Yoo |
| 2004/0053639 A1 | 3/2004 | Petite |
| 2004/0183687 A1 | 9/2004 | Petite |
| 2005/0190055 A1 | 9/2005 | Petite |
| 2005/0195768 A1 | 9/2005 | Petite |
| 2005/0195775 A1 | 9/2005 | Petite |
| 2005/0201397 A1 | 9/2005 | Petite |
| 2005/0243867 A1 | 11/2005 | Petite |

FOREIGN PATENT DOCUMENTS

| | | |
|---|---|---|
| EP | 07144 | 2/1998 |
| EP | 1096454 | 5/2001 |
| FR | 2817110 | 5/2002 |
| FR | 002/052521 | 7/2002 |
| GB | 2229302 | 9/1990 |
| GB | 2247761 | 3/1992 |
| GB | 2262683 | 6/1993 |
| GB | 2297663 | 8/1996 |
| GB | 2310779 | 9/1997 |
| GB | 2326002 | 12/1998 |
| GB | 2336272 | 10/1999 |
| GB | 2352004 | 1/2001 |
| GB | 2352590 | 1/2001 |
| JP | 60261288 | 12/1985 |
| JP | 01255100 | 10/1989 |
| JP | 11353573 | 12/1999 |
| JP | 200113590 | 4/2000 |
| JP | 2001063425 | 3/2001 |
| JP | 2001088401 | 4/2001 |
| JP | 2001309069 | 11/2001 |
| JP | 2001319284 | 11/2001 |
| JP | 2001357483 | 12/2001 |
| JP | 2002007672 | 1/2002 |
| JP | 2002007826 | 1/2002 |
| JP | 2002085354 | 3/2002 |
| JP | 2002171354 | 6/2002 |
| KR | 2001025431 | 4/2001 |
| NO | 03/021877 | 3/2003 |
| WO | WO 90/13197 | 11/1990 |
| WO | WO 98/00056 | 1/1998 |
| WO | WO 98/37528 | 8/1998 |
| WO | WO 99/13426 | 3/1999 |
| WO | WO 01/15114 | 8/2000 |
| WO | WO 01/24109 | 4/2001 |
| WO | WO 02/08725 | 1/2002 |
| WO | WO 02/08866 | 1/2002 |
| WO | WO 02/052521 | 7/2002 |
| WO | WO 03/007264 | 1/2003 |
| WO | WO03/007264 | 1/2003 |
| WO | WO 03/021877 | 3/2003 |

OTHER PUBLICATIONS

"IEEE Standards Board: Project Authoriztion Request (PAR) Form", Mar. 24, 1998, IEEE, http://grouper.ieee.org/groups/802/11/PARs/par80211bapp.html.*

Pending U.S. Patent Application entitled "System and Method for Monitoring the Light Level in a Lighted Area", U.S. Appl. No. 09/812,809, filed Mar. 20, 2001, Inventor: Thomas D. Petite.

Pending U.S. Patent Application entitled "System for Monitoring Conditions in a Residential Living Community", U.S. Appl. No. 09/271,517, filed Mar. 18, 1999, Inventor: Thomas D. Petite.

Pending U.S. Patent Application entitled "System and Method for Monitoring and Controlling Remote Devices", U.S. Appl. No. 09/439,059, filed Nov. 12, 1999, Inventors: Thomas D. Petite and Richard M. Huff.

Westcott, Jil et al., "A Distributed Routing Design For A Broadcast Environment", IEEE 1982, pp. 10.4.0-10.4.5.

Khan, Robert E. et al., "Advances in Packet Radio Technology", IEEE Nov. 1978, vol. 66, No. 11, pp. 1468-1496.

Frankel, Michael S., "Packet Radios Provide Link for Distributed, Survivable C3 in Post-Attack Scenarios", MSN Jun. 1983.

Lauer, Greg et al., "Survivable Protocols for Large Scale Packet Radio Networks", IEEE 1984, pp. 15.1-1 to 15.1-4.

Gower, Neil et al., "Congestion Control Using Pacing in a Packet Radio Network", IEEE 1982, pp. 23.1-1 to 23.1-6.

MacGregor, William et al., "Multiple Control Stations in Packet Radio Networks", IEEE 1982, pp. 10.3-1 to 10.3-5.

Shacham, Nachum et al., "Future Directions in Packet Radio Technology", IEEE 1985, pp. 93-98.

Jubin, John, "Current Packet Radio Network Protocols", IEEE 1985, pp. 86-92.

Westcott, Jill A., Issues in Distributed Routing for Mobile Packet Radio Network, IEEE 1982, pp. 233 238.

Lynch, Clifford A. et al., Packet Radio Networks, "Architectures, Protocols, Technologies and Applications,".

Brownrigg, Edwin, "User Provided Access to the Internet,", Open Access Solutions, http://web.simmons.edu/chen/nit/NIT'92/033-bro.htm, Jun. 8, 2005-Jun. 9, 2005.

Khan, Robert E., "The Organization of Computer Resources into a Packet Radio Network," IEEE Jan. 1977, vol. Com-25 No. 1, pp. 169-178.

Westcott, Jill A., "Issues in Distributed Routing for Mobile Packet Radio Network," IEEE 1982, pp. 233-238.

Khan, Robert E., "The Organization of Computer Resources into a Packet Radio Network," IEEE Transactions on Communications, Jan. 1977, vol. Com-25 No. 1, pp. 169-178.

* cited by examiner

FIG. 5  Message Structure

| To Addr. (1-6) | From Addr. (6) | Pkt. No. (1) | Pkt. Max. (1) | Pkt. Lngth. (1) | Msg. Num. (1) | Cmd. (1) | Data (0-109) | CkH (1) | CkL (1) |
|---|---|---|---|---|---|---|---|---|---|
| 500 | 510 | 520 | 530 | 540 | 550 | 560 | 570 | 580 | 590 |

| "To Address" | Byte Assignment: |
|---|---|
| MSB - Byte 1<br>Device Type | FF-F0 (16) - Broadcast All Devices (1 Byte Address)<br>EF-1F (224) - Device Type Base (2 to 6 Byte Address)<br>0F-00 (16) - Personal Transceiver Identification (6 Byte Address) |
| Byte 2<br>Mfg./Owner ID | FF-F0 (16) - Broadcast all Devices (Byte 1 Type)<br>(2 Byte Broadcast Address)<br>EF-00 (240) - Mfg./Owner Code Identification Number |
| Byte 3<br>Mfg./Owner Extension ID | FF-F0 (16) - Broadcast all Devices (Byte 1 & Byte 2 Type)<br>(3 Byte Broadcast Address)<br>EF-00 (240) - Device Type/Mfg./Owner Code ID Number |
| Byte 4 | FF-F0 (16) - Broadcast all Devices (Byte 1 & Byte 2 Type)<br>(4 Byte Broadcast Address)<br>EF-00 (240) - ID Number |
| Byte 5 | (FF-00) 256 - Identification Number |
| Byte 6 | (FF-00) 256 - Identification Number |

FIG. 6

Sample Messages

Central Server to Personal Transceiver - Broadcast Message - FF (Emergency)

Byte Count = 12

700

| To Addr. (FF) | From Addr. (12345678) | Pkt. No. (00) | Pkt. Max. (00) | Pkt. Lngth. (0C) | Cmd. (FF) | CkH (02) | CkL (9E) |
|---|---|---|---|---|---|---|---|

---

First Transceiver to Repeater (Transceiver)
Broadcast Message - FF (Emergency)

702

Byte Count = 17

| To Addr. (F0) | From Addr. (12345678) | Pkt. No. (00) | Pkt. Max. (00) | Pkt. Lngth. (11) | Cmd. (FF) | | CkH (03) | CkL (A0) |
|---|---|---|---|---|---|---|---|---|

Data (A000123456)

Note: Additional Transceiver Re-Broadcasts do not change the message.
The messages are simply received and re-broadcast.

---

Message to Device "A0" From Device "E1" Command - "08" (Respond to PING)
Response will reverse "To" and "From" Addresses

704

Byte Count = 17

| To Addr. (A012345678) | From Addr. (E112345678) | P # (00) | P Max. (00) | P Lngth. (11) | Cmd. (08) | Data (A5) | CkH (04) | CkL (67) |
|---|---|---|---|---|---|---|---|---|

FIG. 7

WIRELESS COMMUNICATION NETWORKS FOR PROVIDING REMOTE MONITORING OF DEVICES

CROSS-REFERENCE TO RELATED APPLICATIONS

This application is a continuation-in-part of the following U.S. utility patent applications: U.S. patent application Ser. No. 09/812,809, filed Mar. 20, 2001 now abandoned, and entitled "System and Method for Monitoring the Light Level in a Lighted Area," which is a continuation-in-part of U.S. patent application Ser. No. 09/412,895, filed Oct. 5, 1999 now U.S. Pat. No. 6,218,953, and entitled, "System and Method for Monitoring the Light Level Around an ATM," which is a continuation-in-part of U.S. patent application Ser. No. 09/172,554, filed Oct. 14, 1998 now U.S. Pat. No. 6,028,522, and entitled "System for Monitoring the Light Level Around an ATM;" U.S. patent application Ser. No. 09/271,517, filed Mar. 18, 1999 now abandoned, and entitled, "System For Monitoring Conditions in a Residential Living Community;" and U.S. patent application Ser. No. 09/439,059, filed Nov. 12, 1999 now U.S. Pat. No. 6,437,692, and entitled, "System and Method for Monitoring and Controlling Remote Devices." Each of the identified U.S. patent applications is incorporated herein by reference in its entirety.

FIELD OF THE INVENTION

The present invention generally relates to systems for monitoring and/or controlling a plurality of remote devices via a host computer connected to a wide area network (WAN), and more particularly relates to systems and methods for managing communication between the host computer and the plurality of remote devices.

BACKGROUND OF THE INVENTION

There are a variety of systems for monitoring and/or controlling any of a number of systems and/or processes, such as, for example, manufacturing processes, inventory systems, emergency control systems, personal security systems, residential systems, and electric utility meters to name a few. In many of these "automated monitoring systems," a host computer in communication with a wide area network monitors and/or controls a plurality of remote devices arranged within a geographical region. The plurality of remote devices typically use remote sensors and controllers to monitor and respond to various system parameters to reach desired results. A number of automated monitoring systems use computers or dedicated microprocessors in association with appropriate software to process system inputs, model system responses, and control actuators to implement corrections within a system.

Various schemes have been proposed to facilitate communication between the host computer and the remote devices within the system, including RF transmission, light transmission (including infra-red), and control signal modulation over the local power distribution network. For example, U.S. Pat. No. 4,697,166 to Warnagiris et al. describes a power-line carrier backbone for inter-element communications. As recognized in U.S. Pat. No. 5,471,190 to Zimmerman, there is a growing interest in home automation systems and products that facilitate such systems. One system, critically described in the Zimmerman patent, is the X-10 system. Recognizing that consumers will soon demand interoperability between household systems, appliances, and computing devices, the Electronics Industry Association (EIA) has adopted an industry standard, known as the Consumer Electronics Bus (CEBus). The CEBus is designed to provide reliable communications between suitably configured residential devices through a multi-transmission media approach within a single residence.

One problem with expanding the use of control systems technology to distributed systems is the cost associated with developing the local sensor-actuator infrastructure necessary to interconnect the various devices. A typical approach to implementing control system technology is to install a local network of hard-wired sensors and actuators along with a local controller. Not only is there expense associated with developing and installing appropriate sensors and actuators, but the added expense of connecting functional sensors and actuators with the local controller is also problematic. Another prohibitive cost is the expense associated with the installation and operational expense associated with programming the local controller.

Accordingly, an alternative solution for implementing a distributed control system suitable for monitoring and controlling remote devices that overcomes the shortcomings of the prior art is desired.

SUMMARY OF THE INVENTION

The present invention provides wireless communication networks for providing remote monitoring of devices. One embodiment of the present invention is generally directed to a cost-effective automated monitoring system and method for monitoring and controlling a plurality of remote devices via a host computer connected to a communication network, such as a wide area network. The automated monitoring system may include one or more sensors to be read and/or actuators to be controlled, ultimately, through a remote applications server via a site controller. The remote applications server and the site controller may communicate via a communication network, such as a wide area network. The sensors and/or actuators are in communication with a plurality of wireless transceivers, which define a primary wireless communication network. The wireless transceivers may transmit and/or receive encoded data and control signals to and from the site controller. Additional communication devices, such as wireless repeaters, may relay information between the wireless transceivers disposed in connection with the sensors and/or actuators and the site controller.

The present invention may be viewed as a wireless communication network adapted for use in an automated monitoring system for monitoring and controlling a plurality of remote devices via a host computer connected to a wide area network. Briefly, in one embodiment, the wireless communication network may comprise a plurality of wireless transceivers having unique identifiers and a site controller. Each of the plurality of wireless transceivers may be configured to receive a sensor data signal from one of the plurality of remote devices and transmit an original data message using a predefined wireless communication protocol. The original data message may comprise the corresponding unique identifier and sensor data signal. Each of the plurality of wireless transceivers may be further configured to receive the original data message transmitted by one of the other wireless transceivers and transmit a repeated data message using the predefined communication protocol. The repeated data message may include the sensor data signal and the corresponding unique identifier. The site controller in communication with at least one of the plurality of wireless transceivers may be configured to: receive the original data messages and the repeated data messages; identify the remote device associated with the corresponding sensor data signal; and provide information related to the sensor data signal to the wide area network for delivery to the host computer.

The present invention may also be viewed as a wireless communication network for monitoring and controlling a plurality of remote devices. Briefly, in one embodiment, the wireless communication network may comprise a plurality of wireless transceivers having unique identifiers. Each of the plurality of wireless transceivers may be configured to receive a sensor data signal from one of the plurality of remote devices and transmit an original data message using a predefined wireless communication protocol. The original data message may comprise the corresponding unique identifier and sensor data signal. Each of the plurality of wireless transceivers may be configured to receive the original data message transmitted by one of the other wireless transceivers and transmit a repeated data message using the predefined communication protocol. The repeated data message may include the sensor data signal and the corresponding unique identifier. Furthermore, at least one of the plurality of wireless transceivers may be further configured to provide the original data messages and the repeated data messages to a site controller connected to a wide area network. The site controller may be configured to manage communications between the wireless communication network and a host computer connected to the wide area network.

BRIEF DESCRIPTION OF THE DRAWINGS

The accompanying drawings incorporated in and forming a part of the specification, illustrate several aspects of the present invention, and together with the description serve to explain the principles of the invention. The components in the drawings are not necessarily to scale, emphasis instead being placed upon clearly illustrating the principles of the present invention. Moreover, in the drawings, like reference numerals designate corresponding parts throughout the several views.

FIG. 5 is a table illustrating an embodiment of a message structure for a communication protocol according to the present invention that may be used for communicating between the site controller and transceivers of FIG. 1.

FIG. 6 is a table illustrating various values for the "to address" in the message structure of FIG. 5.

FIG. 7 illustrates three sample messages for the message structure of FIG. 5 according to the present invention.

DETAILED DESCRIPTION OF THE PREFERRED EMBODIMENTS

Figure 1:
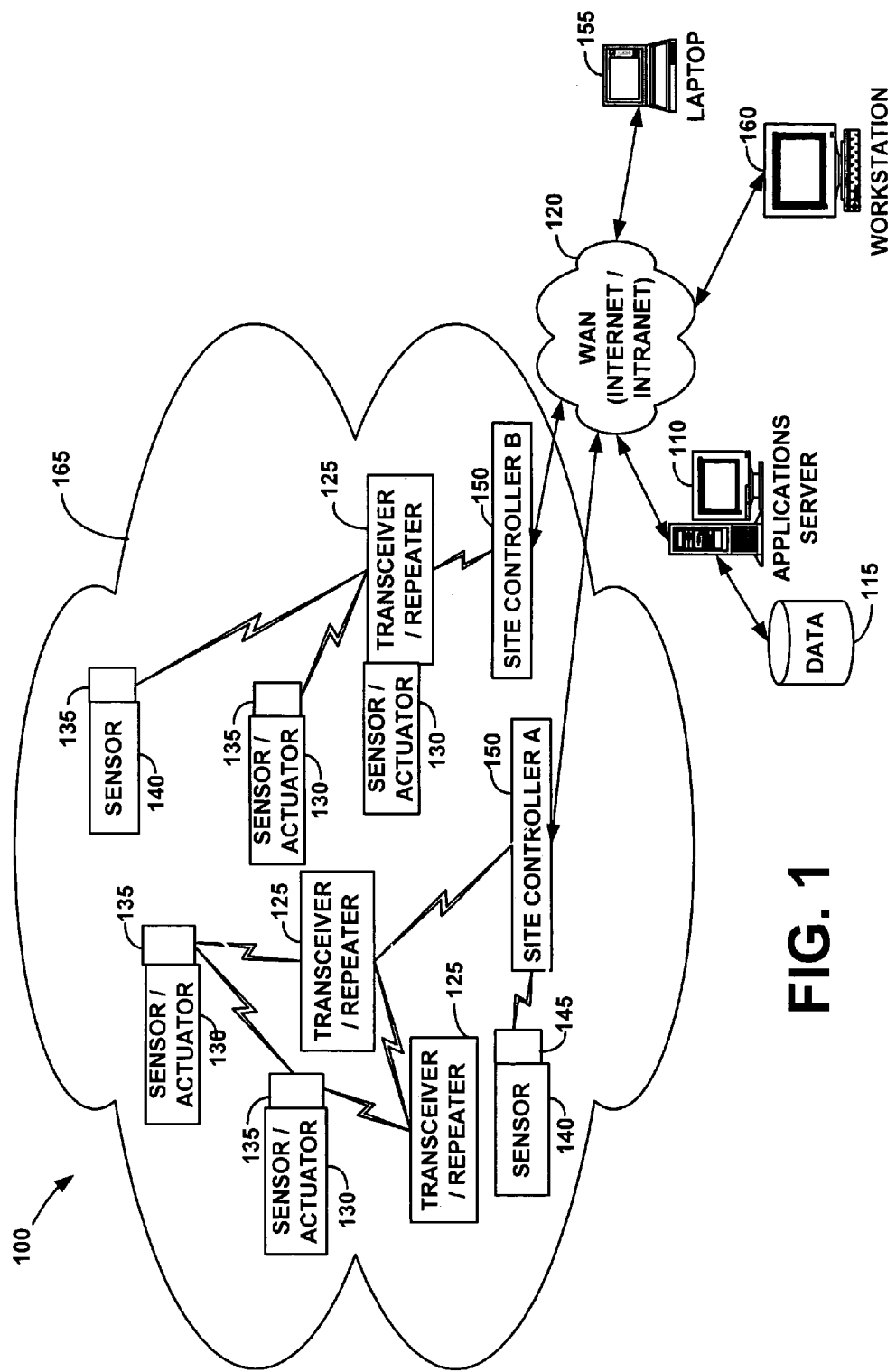
FIG. 1 is a block diagram illustrating an embodiment of an automated monitoring system according to the present invention.

Having summarized the invention above, reference is now made in detail to the description of the invention as illustrated in the drawings. While the invention will be described in connection with these drawings, there is no intent to limit it to the embodiment or embodiments disclosed therein. On the contrary, the intent is to cover all alternatives, modifications and equivalents included within the spirit and scope of the invention as defined by the appended claims.

FIG. 1 is a block diagram illustrating one of a number of possible embodiments of an automated monitoring system 100 according to the present invention. Automated monitoring system 100 may comprise one or more applications servers 110, a database 115, a wide area network (WAN) 120, transceivers/repeaters 125, sensor/actuators 130, transceivers 135, sensors 140, transmitters 145, and at least one site controller 150. Each of the sensor/actuators 130 and sensors 140 is integrated with a suitably configured wireless transceiver/repeater 125, a wireless transceiver 135, or wireless transmitter 145. Within the context of this document, a wireless transceiver/repeater 125, a wireless transceiver 135, and a wireless transmitter 145 will be referred to as "wireless communication devices."

Each of the wireless communication devices in automated monitoring system 100 is preferably small in size and may be configured to transmit a relatively low-power signal, such as, for example a radio frequency (RF) signal. As a result, in some applications, the transmission range of a given RF communication device may be relatively limited. Of course, the transmitter power and range may be appropriately designed for the target operating environment. As will be appreciated from the description that follows, this relatively limited transmission range of the wireless communication devices is advantageous and a desirable characteristic of automated monitoring system 100. Although the wireless communication devices are depicted without a user interface such as a keypad, etc., in certain embodiments the wireless communication devices may be configured with user selectable pushbuttons, switches, an alphanumeric keypad, or any other type of user interface device suitably configured with software and/or firmware to accept operator input. Often the wireless communication device will be in communication with a sensor 140 or with a sensor/actuator 130, such as a smoke detector, a thermostat, a security system, etc., where user selectable inputs may not be needed.

As illustrated in FIG. 1, the wireless communication devices in automated monitoring system 100 are geographically arranged such that the antenna patterns (not shown) associated with each wireless communication device overlap to create a coverage area 165. In this manner, automated monitoring system 100 may enable a site controller 150 associated with coverage area 165 to communicate with each sensor/actuator 130 and each sensor 140 via any of a plurality of possible communication paths. For instance, site controller 150 may communicate with a specific sensor/actuator 130 via a plurality of distinct communication paths, each of which are defined by one or more wireless communication devices involved in the communication between site controller 150 and the specific sensor/actuator 130. By way of example, one of the plurality of possible communication paths may consist of a wireless connection from site controller 150 to a wireless communication device associated with the specific sensor/actuator 130. Another possible communication path may consist of a wireless connection from site controller 150 to an intermediate wireless communication device and then to the wireless communication device associated with the specific sensor/actuator 130. Further communication paths may include multiple intermediate wireless communication devices in the wireless connection between site controller 150 and the wireless communication device associated with the specific sensor/actuator 130.

As illustrated in FIG. 1, one or more sensors 140 may communicate with at least one site controller 150 via a wireless transmitter 145, a wireless transceiver 135, or a wireless transceiver/repeater 125. Furthermore, one or more sensors/actuators 130 may communicate with at least one site controller 150 via a wireless transceiver 135 or a wireless transceiver/repeater 125. One of ordinary skill in the art will appreciate that in order to send a command from the applications server 110 to a sensor/actuator 130, the wireless communication device associated with the sensors/actuators 130 should be a two-way communication device, such as a transceiver. It will also be appreciated that one or more sensors/actuators 130 may be in direct communication with one or more site controllers 150. It will be further appreciated that the communication medium between the one or more sensor/actuators 130 and the one or more site controller 150 may be wireless or, for relatively closely located configurations, a wired communication medium may be used.

As is further illustrated in FIG. 1, automated monitoring system 100 may comprise a plurality of stand-alone wireless transceiver/repeaters 125. Each stand-alone wireless transceiver/repeater 125, as well as each wireless transceiver 135, may be configured to receive one or more incoming transmissions (transmitted by a remote transmitter 145 or transceiver 135) and to transmit an outgoing signal. This outgoing signal may be any wireless transmission signal, such as, for example, a low-power RF transmission signal, or a higher-power RF transmission signal. Alternatively, where a wired configured is employed, the outgoing signal may be transmitted over a conductive wire, fiber optic cable, or other transmission media. One of ordinary skill in the art will appreciate that if an integrated wireless communication device (e.g., a wireless transmitter 145, a wireless transceiver 135, or a wireless transceiver/repeater 125) is located sufficiently close to site controller 150 such that its output signal can be received by at least one site controller 150, the data transmission signal need not be processed and repeated through either a wireless transceiver/repeater 125 or wireless transceivers 135.

One or more site controllers 150 are configured and disposed to receive remote data transmissions from the various stand-alone wireless transceiver/repeaters 125, integrated wireless transmitters 145, or the integrated wireless transceivers 135. The site controllers 150 may be configured to analyze the transmissions received, convert the transmissions into TCP/IP format, and further communicate the remote data signal transmissions via WAN 120 to one or more applications servers 110 or other devices in communication with WAN 120. One of ordinary skill in the art will appreciate that additional site controllers 150 may function as either a back-up site controller in the event of a site controller failure or can function as a primary site controller to expand the potential size of coverage area 165 of automated monitoring system 100. When implemented as a back-up site controller 150, the second site controller 150 may function when the applications server 110 detects a site controller failure. Alternatively, the second site controller 150 may function to expand the capacity of automated monitoring system 100. A single site controller 150 may accommodate a predetermined number of wireless communication devices. While the number of wireless communication devices may vary based upon individual requirements, in one of a number of embodiments there may be approximately 500 wireless communication devices.

By way of example, a second site controller 150 may double the capacity of a single system. Although not shown, additional site controllers 150 may be added depending on the specific implementation of automated monitoring system 100. The number of wireless communication devices managed by a site controller 150 is limited only by technical constraints such as memory, storage space, etc. In addition, the site controller 150 may manage more addresses than devices as some wireless communication devices may have multiple functions such as sensing, repeating, etc. As stated above, automated monitoring system 100 includes an applications server 110 in communication with site controller 150 via WAN 120. Applications server 110 may host any of a variety of application specific software depending on the precise environment in which automated monitoring system 100 is employed. As further described below, the site controller 150 may receive, via WAN 120, information in the form of data and/or control signals from applications server 110, laptop computer 155, workstation 160, and any other device in communication with WAN 120. Site controller 150 may then communicate the data and/or control signals to remote sensor/actuators 130 and/or remote sensors 140. Automated monitoring system 100 may also comprise a database 115 associated with applications server 110. Database 115 may be configured to communicate with applications server 110 and record client specific data or to assist the applications server 110 in deciphering a particular data transmission from a particular sensor 140, sensor/actuator 130, etc.

Figure 2:
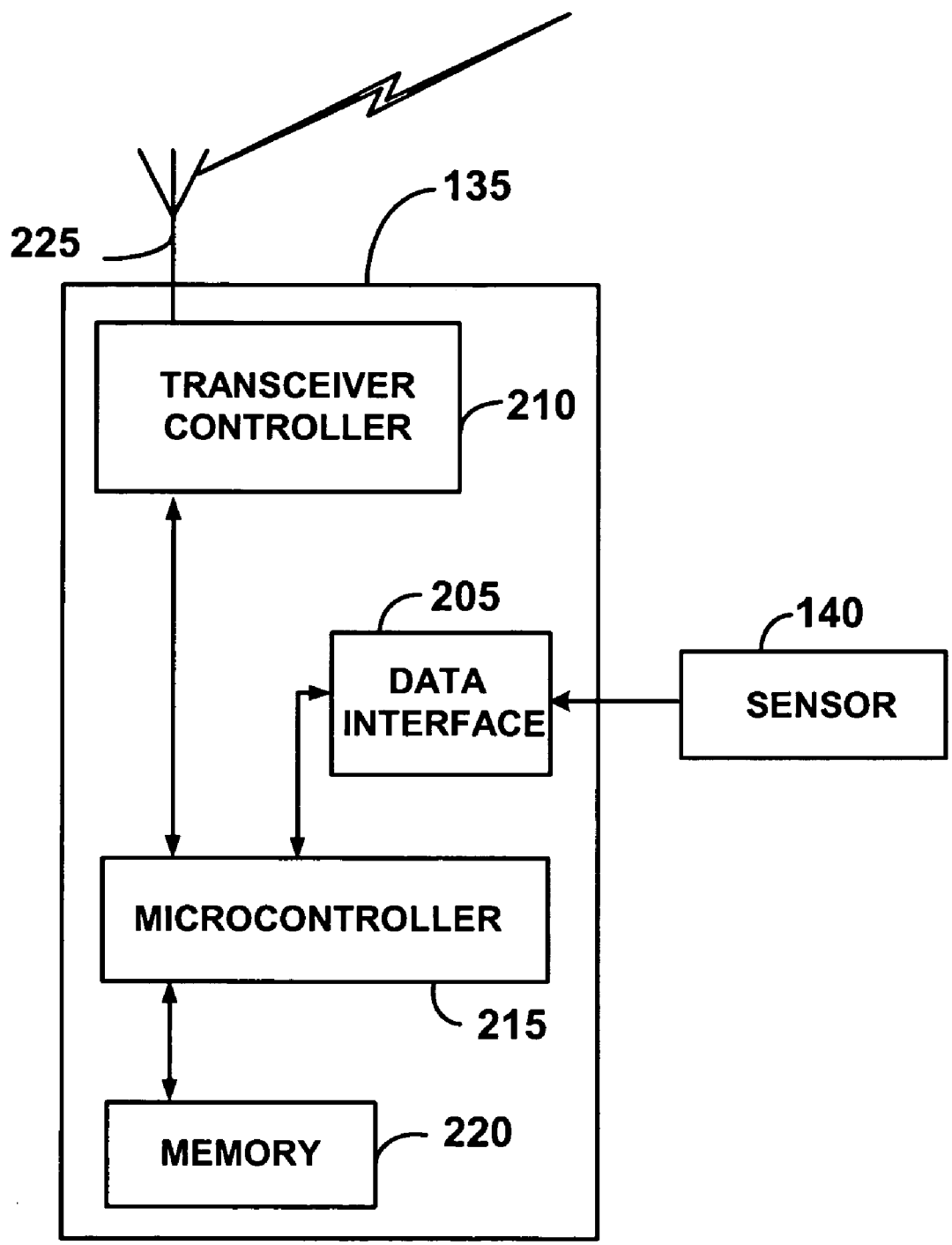
FIG. 2 is a block diagram of one of a number of embodiments of a transceiver of FIG. 1 in communication with a sensor of FIG. 1.

Reference is now made to FIG. 2, which is a block diagram illustrating a transceiver 135 that may be integrated with a sensor 140, sensor/actuator 130, etc. As stated above, the characteristics of sensor 130 may vary depending on the environment in which automated monitoring system 100 is implemented. For example, the sensor 130 may be a two-state device such as a smoke alarm, a thermometer, a utility meter, a personal security system controller, or any other sensor. Regardless the specific characteristics of sensor 130, transceiver 135 may include a data interface 205 configured to receive and/or transmit signal to sensor 130. If the signal output from the sensor 130 is an analog signal, the data interface 205 may include an analog-to-digital converter (not shown) to convert the signals. Alternatively, where transceiver 135 and sensor 130 communicate using digital signals, transceiver 135 may include a digital interface (not shown) that communicates with the data interface 205 and the sensor 130.

As illustrated in FIG. 2, the sensor 140 may be in communication with the transceiver 135. Transceiver 135 may comprise an RF transceiver controller 210, a data interface 205, a microcontroller 215, a memory 220, and an antenna 225. A data signal forwarded from the sensor 140 may be received by the data interface 205. In those situations where the data interface 205 has received an analog data signal, the data interface 205 may be configured to convert the analog signal into a digital signal before forwarding a digital representation of the data signal to the data controller 215. In one embodiment, each transceiver 135 may be configured with a memory 220 that stores a unique transceiver identifier that identifies the RF transceiver 135.

Transceivers 135 that function in automated monitoring system 100 as both a repeater and an integrated transceiver have two unique addresses. One address indicates messages intended for the repeater; the second address indicates messages for the sensor 140. Data controller 215 evaluates the incoming message to determine which address the message contains, which function is desired, and acts accordingly.

In operation, the RF transceiver 135 receives an incoming message via antenna 225. The transceiver controller 210 receives the incoming message, modifies the received signal, and passes the modified signal onto the microcontroller 215. The microcontroller 215 evaluates the message to determine the intended recipient.

If the intended recipient is the integrated transceiver 135, the microcontroller 215 then prepares the appropriate response as discussed below. This response may include data from the sensor 140. If the intended recipient is the repeater, the microcontroller 215 then prepares the message to be repeated onto the intended recipient according to the message protocol discussed below.

Of course, additional and/or alternative configurations may also be provided by a similarly configured transceiver 135. For example, a similar configuration may be provided for a transceiver 135 that is integrated into, for example, a carbon monoxide detector, a door position sensor, etc. Alternatively, system parameters that vary across a range of values may be transmitted by transceiver 135 as long as data interface 205 and microcontroller 215 are configured to apply a specific code that is consistent with the input from sensor 140. Automated monitoring system 100 may enable the target parameter to be monitored. The transceiver 135 may be further integrated with an actuator (not shown). This provides the ability to remotely control systems such as HVAC systems, lighting systems, etc. via the applications server 110 (FIG. 1). Further information regarding use of actuators in automated monitoring system 100 may be found in commonly assigned U.S. patent application Ser. No. 09/811,076, entitled "System and Method for Monitoring and Controlling Remote Devices," and filed Mar. 16, 2001, which is hereby incorporated in its entirety by reference.

One of ordinary skill in the art will appreciate that the various communication devices in automated monitoring system 100 may be configured with a number of optional power supply configurations. For example, a personal mobile transceiver may be powered by a replaceable battery. Similarly, a repeater may be powered by a replaceable battery that may be supplemented and/or periodically charged via a solar panel. These power supply circuits, therefore, may differ between communication device depending upon the devices being monitored, the related actuators to be controlled, the environment, and the quality of service required. In the case of a transceiver acting as both a repeater and a remote monitoring device, the transceiver may be independently powered so as not to drain the sensor or actuator. Those skilled in the art will appreciate how to meet the power requirements of the various communication devices. As a result, it is not necessary to further describe a power supply suitable for each communication device and each application in order to appreciate the concepts and teachings of the present invention.

As stated above, automated monitoring system 100 may be used in a variety of environments to monitor and/or control any of a variety of types of sensors 140 and sensors/actuators 130. Regardless of the particular environment and the type of remote device employed in automated monitoring system 100, transceiver 135 may further comprise logic configured to receive data from sensor 140 and/or sensor/actuator 130, retrieve the unique identifier from memory 220, and generate a transmit message using a predefined communication protocol being implemented by the wireless communication network, which is described in detail below. Nonetheless, one of ordinary skill in the art will appreciate that various other communication protocols may be used in accordance with the present invention.

Depending on the specific implementation of sensor 140 and/or sensor/actuator 130, the data may be formatted in a variety of ways. For example, as stated above, the data received by data interface 205 may be an analog or a digital signal. Regardless the specific configuration of sensor 140 and/or sensor/actuator 130, data interface 205 is configured to receive the sensor data.

The transmit message generated may comprise the unique identifier stored in memory 220 and the sensor data. As described above, the transmit message may be formatted in the message structure described below. More importantly, the transmit message may be configured such that the transmit message may be received by the site controller 150 via the wireless communication network and such that the site controller 150 may identify the sensor 140 and/or sensor/actuator 130 and notify applications server 110 of the transmit message.

One of ordinary skill in the art will appreciate that the logic described above, may be implemented in hardware, software, firmware, or a combination thereof. As illustrated in FIG. 2, in one of a number of possible embodiments, the logic is implemented in software or firmware that is stored in memory 220 and that is executed by microcontroller 215. If implemented in hardware, as in alternative embodiments, the logic may be implemented in any one or combination of volatile memory elements (e.g., random access memory (RAM, such as DRAM, SRAM, SDRAM, etc.)) and non-volatile memory elements (e.g., ROM, hard drive, tape, CDROM, etc.). Memory 220 may incorporate electronic, magnetic, optical, and/or other types of storage media. Memory 220 may also have a distributed architecture, where various components are situated remote from one another. If implemented in hardware, as in alternative embodiments, the logic may be implemented with any or a combination of the following technologies, which are all well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

Furthermore, one of ordinary skill in the art will appreciate that the integration of sensor 140 and/or sensor/actuator 130 and transceiver 135 may be accomplished in a variety of ways. For example, in one embodiment, transceiver 135 may be included within sensor 140 and/or sensor/actuator 130 as part of its internal configuration. In other embodiments, transceiver 135 may be externally attached to sensor 140 and/or sensor/actuator 130. In further embodiments, transceiver 135 may be installed in close proximity to sensor 140 and/or sensor/actuator 130 such that transceiver 135 and sensor 140 and/or sensor/actuator 130 communicate via a wired or wireless connection.

Referring again to FIG. 2, during normal operation, transceiver 135 may receive a command message on antenna 225 via a message protocol. The command message may be initiated from site controller 150, applications server 110, laptop 155, workstation 160, or any other device connected to WAN 120. In this manner, the command message may be used to request data related to the electricity consumption of a particular electric meter (i.e., sensor 104, sensor/actuator 135). Microcontroller 215 may evaluate the received message to determine if the "to" address is its own unique address. If it is, then the microcontroller 215 evaluates the command and prepares a response message.

In response to the command message, microcontroller 215 receives the senosr data related to the sensor 140 and/or sensor/actuator 130. In one embodiment, the sensor data may be retrieved by initiating a request to the sensor 140 and/or sensor/actuator 130. In another embodiment, the data may be stored in memory 220, in which case microcontroller 215 retrieves the data from memory 220. Microcontroller 215 may also retrieve the unique address from memory 220. Then, the microcontroller 215 formats a transmit signal in response to the command message as described above. Microcontroller 215 then communicates the transmit signal to transceiver controller 210, which provides the transmit signal to the wireless communication network. The transmit signal may be delivered to the site controller 150. Depending on where the command message was generated, the transmit signal may be forwarded to applications server 110, laptop 155, workstation 160, a computing device operated by a user, or any other device connected to WAN 120.

Of course, additional and/or alternative configurations may also be provided by a similarly configured transceiver. For example, a similar configuration may be provided for a transceiver that is integrated into, for example, a carbon monoxide detector, a door position sensor, etc. Alternatively, system parameters that vary across a range of values may be transmitted by transceiver 135 as long as data interface 205 and microcontroller 215 are configured to apply a specific code that is consistent with the input from sensor 140. As long as the code is known by the application server 110 or workstation 160, the target parameter may be monitored with the present invention. The RF transceiver 135 may be further integrated with an actuator. This would provide the user with the ability to remotely control systems such as HVAC systems, lighting systems, etc. remotely via the applications server 110. Further information regarding the integration of an actuator can be found in Ser. No. 09/811, 076, "System and Method for Monitoring and Controlling Remote Devices," filed Mar. 16, 2001, commonly assigned and incorporated in its entirety herein by reference.

Figure 3:
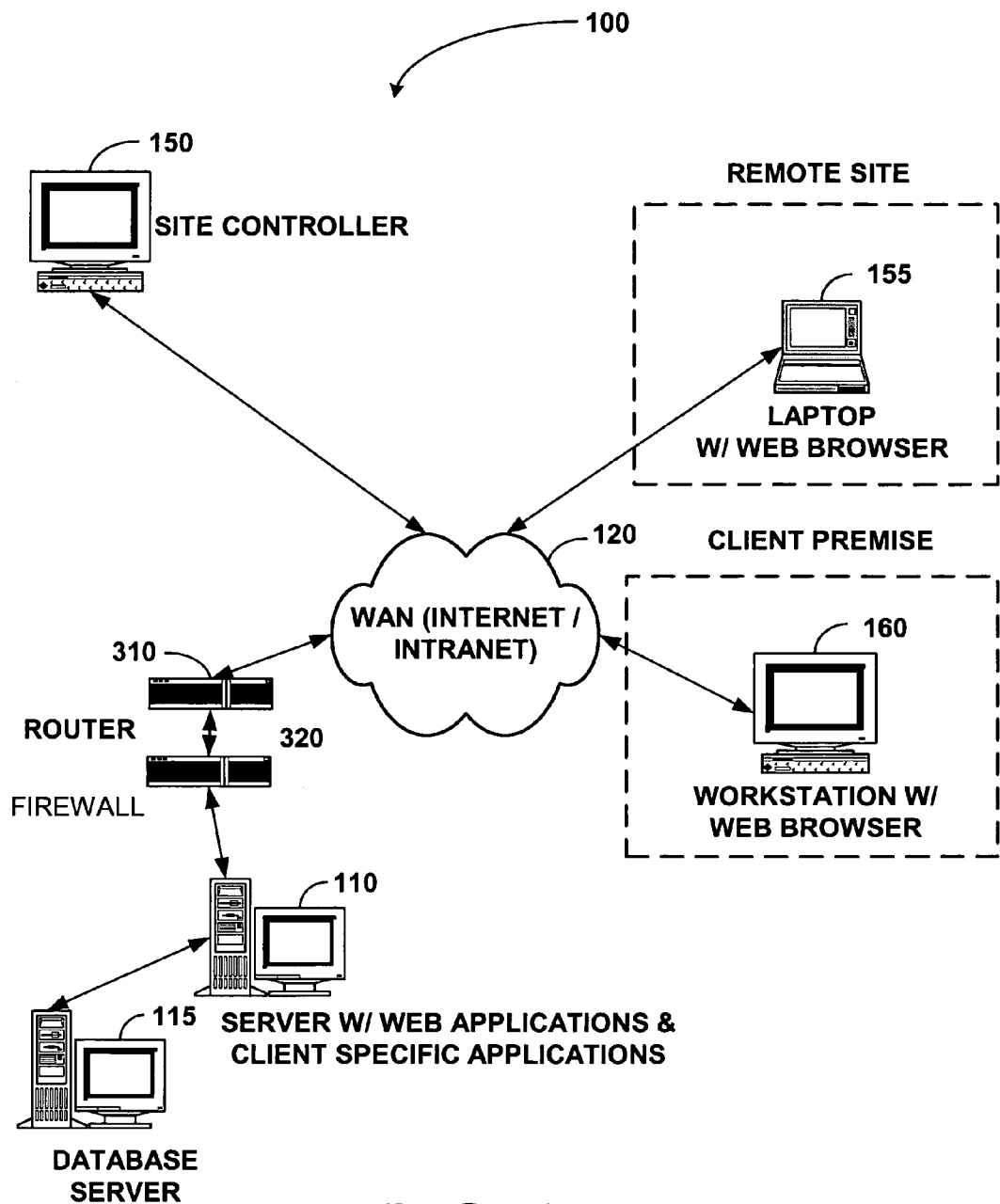
FIG. 3 is a more detailed schematic diagram illustrating the connectivity of the WAN of FIG. 1.

Reference is now made to FIG. 3, which illustrates the external connectivity of WAN 120 of FIG. 1 in accordance with the present invention. Site controller 150 may be configured to transmit control signals and receive data signals using the open data packet protocol described in detail below. Site controller 150 is preferably interconnected permanently on WAN 120 and configured to receive data signals from the wireless communication devices and translate the data signals for transfer to applications servers 110 via WAN 120. Site controller 150 may translate the received data signals into any appropriate protocol for delivery via WAN 120. For example, in one embodiment site controller 150 translates the received data signals into transmission control protocol/Internet protocol (TCP/IP) for delivery via WAN 120. As stated above, applications server 110 may be configured for communication with WAN 120 via, for example, router 310 and further protected and buffered by firewall 320. Applications server 110 may also configured with web applications and client specific applications as needed for operation of automated monitoring system 100. Consistent with the concepts and teachings of the present invention, applications server 110 may be assisted in its task of storing and making available client specific data by database 115.

As further illustrated in FIG. 3, a client workstation 160 may include a Web browser for facilitating communication with applications server 110, database 115, and/or site controller 150. Alternatively, clients may access WAN 120 via a remote laptop 155 or other computing devices (not shown) configured with a compatible Web browser or other user interface. In this way, the applications server 110 may provide client specific data upon demand.

As stated above, communication between site controller 150 and sensors/actuators 130 and sensors 140 is accomplished using an open data packet protocol in accordance with the present invention. Because the wireless communication devices are geographically arranged such that their respective antenna patterns overlap to create a coverage area 165, site controller 150 may communicate with each sensor/actuator 130 and each sensor 140 via any of a plurality of possible communication paths. Each of the communication paths are defined by one or more wireless communication devices involved in the communication between site controller 150 and the target sensor/actuator 130 and/or sensor 140. For instance, site controller 150 may communicate with a specific sensor/actuator 130 via a plurality of distinct communication paths. By way of example, one of the plurality of possible communication paths may consist of a wireless connection from site controller 150 to a wireless communication device associated with the specific sensor/actuator 130. Another possible communication path may consist of a wireless connection from site controller 150 to an intermediate wireless communication device and then to the wireless communication device associated with the specific sensor/actuator 130. Further communication paths may include multiple intermediate wireless communication devices in the wireless connection between site controller 150 and the wireless communication device associated with the specific sensor/actuator 130. In this manner, site controller 150 may communicate with sensors/actuators 130 and/or sensors 140 that are located a greater distance from the site controller 150 by having messages repeated by successive wireless communication devices along one of the communication paths.

Figure 4:
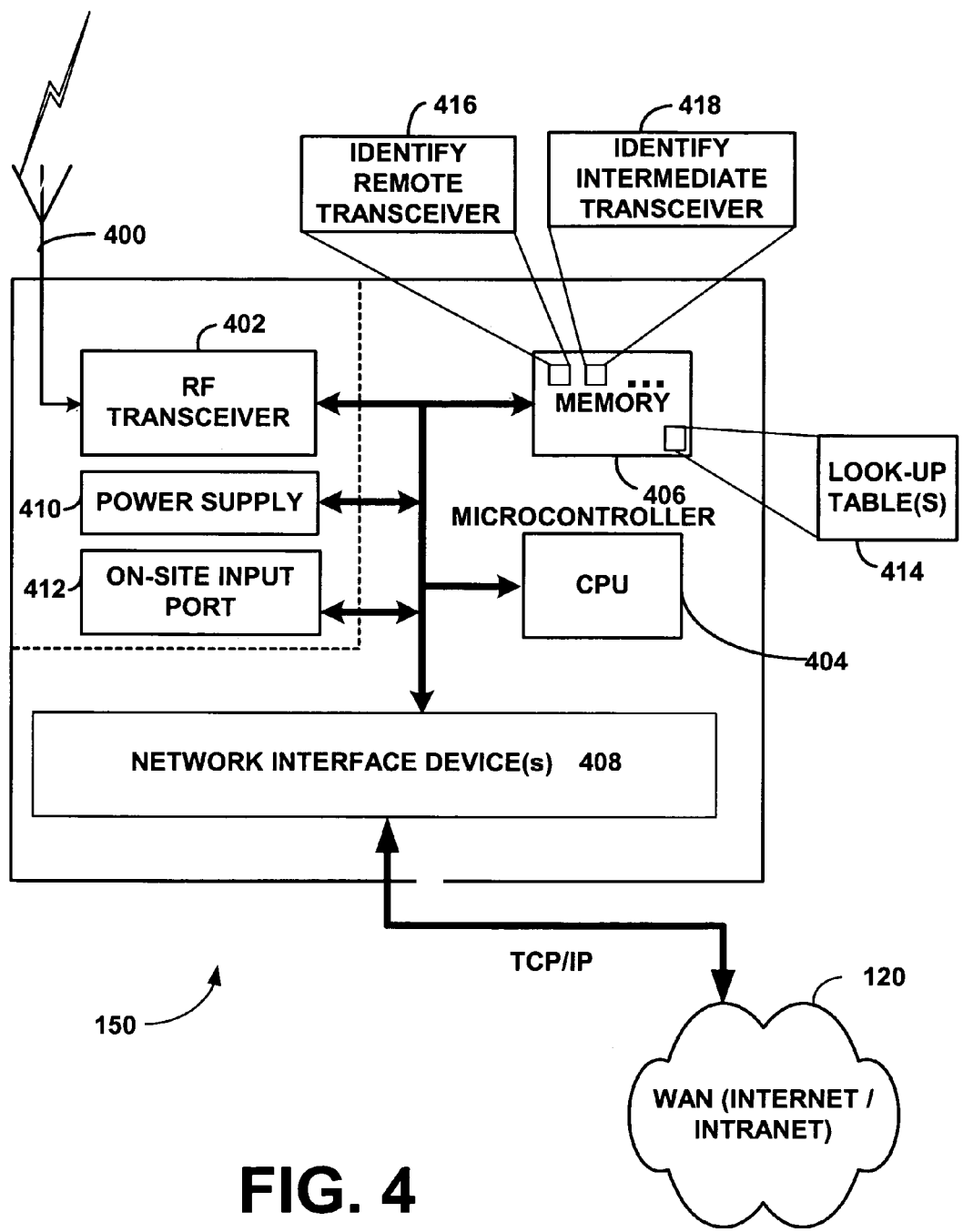
FIG. 4 is a block diagram illustrating one of a number of possible embodiments of the site controller of FIG. 1.

Having illustrated and described the operation of the various combinations of communication devices with the sensor 140 and sensor/actuators 130 (FIG. 1), reference is now made to FIG. 4, which is a block diagram further illustrating one embodiment of a site controller 150. A site controller 150 may comprise an antenna 400, an RF transceiver 402, a central processing unit (CPU) 404, memory 406, a network interface device, such as a network card 425, a digital subscriber line (DSL) modem, an integrated services digital network (ISDN) interface card, as well as other components not illustrated in FIG. 4, which may be configured to enable a TCP/IP connection to the WAN 120 (FIG. 1). Site controller 150 may also include a power supply 410 for powering the site controller 150. The power supply 410 may be one of many known power supplies. In addition, the site controller 150 may include an on-site input port 412, which allows a technician to communicate directly with site controller 150. Further information regarding the function, operation, and architecture of the site controller 150 may be found in commonly assigned U.S. patent application "System and Method for Controlling Communication Between a Host Computer and Communication Devices Associated with Remote Devices in an Automated Monitoring System," (Ser. No. 09/925,786) which is hereby incorporated in its entirety by reference.

The RF transceiver 402 may be configured to receive incoming transmissions via the antenna 400. Each of the incoming transmissions are consistently formatted in the message protocol as described below. The site controller 150 may be configured such that the memory 406 includes a look-up table 414 configured for identifying the various remote and intermediate communication devices used in generating and transmitting the received data transmission. As illustrated in FIG. 4, site controller 150 may include an "Identify Remote Transceiver" memory sector 416 and "Identify Intermediate Transceiver" memory sector 418. Programmed or recognized codes within memory 406 may also be provided and configured for controlling the operation of a CPU 404 to carry out the various functions that are orchestrated and/or controlled by the site controller 150. For example, memory 406 may include program code for controlling the operation of the CPU 404 to evaluate an incoming data packet to determine what action needs to be taken. In this regard, one or more look-up tables 414 may also be stored within the memory 406 to assist in this process. Furthermore, the memory 406 may be configured with program code configured to identify a remote transceiver or identify an intermediate RF transceiver. Function codes and RF transmitter and/or RF transceiver identifiers may all be stored with associated information within the look-up tables 414.

Thus, one look-up table 414 may be provided to associate transceiver identifications with a particular user. Another look-up table 414 may be used to associate function codes associated with the message protocol. For example, a look-up table 414 may include a unique code designating various functions, such as test, temperature, smoke alarm active, security system breach, etc. In connection with the lookup table(s) 414, the memory 406 may also include a plurality of code segments that are executed by the CPU 404, which may in large part control operation of the site controller 150. For example, a first data packet segment may be provided to access a first lookup table 414 to determine the identity of the transceiver that transmitted the received message. A second code segment may be provided to access a second lookup table to determine the proximate location of the transceiver that generated the message. A third code segment may be provided to identify the content of the message transmitted (not shown). Namely, is it a fire alarm, a security alarm, an emergency request by a person, a temperature control setting, etc. In accordance with the present invention, additional, fewer, or different code segments may be provided to carry out different functional operations and data signal transfers.

The site controller 150 may also include one or more network interface devices 408 to facilitate via WAN 120. For example, the site controller 150 may include a network card, which may allow the site controller 150 to communicate across a local area network to a network server. This network server may function as a backup site controller 150 to the WAN 120. Alternatively, the site controller 150 may contain a DSL modem, which may be configured to provide a link to a remote computing system by way of the public switched telephone network (PSTN). In yet another embodiment, the site controller 150 may include an ISDN card configured to communicate via an ISDN connection with a remote system. One of ordinary skill in the art will appreciate that various other communication interfaces may be provided to serve as primary and/or backup links to the WAN 120 (FIG. 1) or to local area networks that might serve to permit local monitoring of the status of the site controller 150 and for data packet control.

Communication between the site controller 150 and the communication devices within coverage area 165 may be implemented using a data packet protocol according to the present invention. FIG. 5 sets forth one embodiment of a message structure for the data packet protocol of the present invention. Messages transmitted within the automated monitoring system 100 may consist of a "to" address 500, a "from" address 510, a packet number 520, a number of packets in a transmission 530, a packet length 540, a message number 550, a command number 560, data 570 (if applicable), and a check sum error detectors (CKH 580 and CKL 590).

The "to" address 500 indicates the intended recipient of the packet. This address can be scalable from one to six bytes based upon the size and complexity of automated monitoring system 100. By way of example, the "to" address 500 may indicate a general message to all transceivers, to only the repeaters, or to a single integrated transceiver. In a six byte "to" address 500, the first byte indicates the transceiver type—to all transceivers, to some transceivers, or a specific transceiver. The second byte may be the identification base, and bytes three through six may be used for the unique transceiver address (either stand-alone or integrated). The "to" address 500 may be scalable from one byte to six bytes depending upon the intended recipient(s).

The "from" address 510 identifies the transceiver originating the transmission and may be a six-byte unique address. The "from" address 510 may be the address of the site controller 150 (FIG. 1) when the site controller 150 (FIG. 1) requests data, or this may be the address of the integrated transceiver responding to a request for information from the site controller 150 (FIG. 1).

The packet number 520, the packet maximum 530, and the packet length 540 may be used to concatenate messages that are greater than a predetermined length. The packet maximum 530 indicates the number of packets in the message. The packet number 520 may be used to indicate a packet sequence number for a multiple-packet message.

The message number 550 may be assigned by the site controller 150. Messages originating from the site controller 150 may be assigned an even number, while responses to the site controller 150 may have a message number equal to the original message number plus one. Thus, the site controller 150 may increments the message number 550 by two for each new originating message. This may enable the site controller 150 to coordinate the incoming responses to the appropriate command message.

The command number 560 may designate a specific data request from the receiving device. One of ordinary skill in the art will appreciate that, depending on the specific implementation of automate monitoring system 100, the types of commands may differ. In one embodiment, there may be two types of commands: device specific and non-device specific. Device specific commands may control a specific device such as a data request or a change in current actuator settings. Commands that are not device specific may include, but are not limited to, a ping, an acknowledge, a non-acknowledgement, downstream repeat, upstream repeat, read status, emergency message, and a request for general data to name a few. General data may include a software version number, the number of power failures, the number of resets, etc.

The data field 570 may contain data as requested by a specific command. The requested data may be any value. By way of example, test data can preferably be encoded in ASCII (American Standard Code for Information Interchange) or other known encoding systems as known in the art. The data field 570 of a single packet may be scalable up to a predetermined length. When the requested data exceeds the predetermined length, the data controller of transceiver 135 may divide the data into an appropriate number of sections and concatenates the series of packets for one message using the packet identifiers as discussed above.

While specific byte lengths for sections of the message are being set forth, it would be obvious to one of ordinary skill in the art to vary the byte lengths based upon system needs. Less complex systems, etc. could use smaller sized sections, whereas more complex systems could increase the byte lengths.

Checksum fields 580 and 590 may be used to detect errors in the transmissions. In one embodiment, any error can be detected via cyclic redundancy check sum methodology. This methodology treats the message as a large binary number and divides the binary number by a generating polynomial (such as CRC-16). The remainder of this division is then sent with the message as the checksum. The receiver then calculates a checksum using the same methodology and compares the two checksums. If the checksums do not match, the packet or message will be ignored. While this error detection methodology is preferred, one of ordinary skill in the art will appreciate that other error detection systems may be implemented.

As stated above, automated monitoring system 100 may employ wireless and/or wired communication technologies for communication between site controller 150 and the various communication devices. In one embodiment, communication between site controller 150 and the communication devices may be implemented via an RF link at a basic rate of 4,800 bits per second (bps) and a data rate of 2400 bps. All the data may be encoded in the Manchester format such that a high to low transition at the bit center point represents a logic zero and a low to high transition represents a logic one. One of ordinary skill in the art will appreciate that other RF formats may be used depending upon design needs. By way of example, a quadature phase shift encoding method may be used, thereby enabling automated monitoring system 100 to communicate via hexadecimal instead of binary.

While the message indicates specific byte length for each section, only the order of the specific information within the message is constant. The byte position number in individual transmissions may vary because of the scalability of the "to" address 500, the command byte 560, and the scalability of the data 570.

The message may further include a preface and a postscript (not shown). The preface and postscripts are not part of the message body but rather serve to synchronize the control system and to frame each packet of the message. The packet begins with the preface and ends with a postscript. The preface may be a series of twenty-four logic ones followed by two bit times of high voltage with no transition. The first byte of the packet can then follow immediately. The postscript may be a transition of the transmit data line from a high voltage to a low voltage, if necessary. It may be less desirable to not leave the transmit data line high after the message is sent. It would be obvious to one of ordinary skill in the art to modify the preface and the postscript as necessary based on specific design needs.

FIG. 6 illustrates one embodiment of a byte assignment for the "to" address 500 of FIG. 5. One of ordinary skill in the art will appreciate that various byte assignments may be used within "to" address field 500. For example, in one embodiment, "to" address 500 consists of six bytes. The first byte (Byte 1) may indicate the device type. The second byte (Byte 2) may indicate the manufacturer or the owner. The third byte (Byte 3) may be a further indication of the manufacturer or owner. The fourth byte (Byte 4) may indicate either that the message is for all devices or that the message is for a particular device. If the message is for all devices, the fourth by may be a particular code. If the message is for a particular device, the fourth, fifth, and sixth bytes (Byte 5 and Byte 6) may include the unique identifier for that particular device.

FIG. 7 illustrates three sample messages using the open data packet protocol described above. The first message 700 illustrates the broadcast of an emergency message "FF" from a central server with an address "0012345678" to a integrated transceiver with an address of "FF."

The second message 702 illustrates how the first message 700 may be sent to a stand-alone wireless communication device. In this manner, emergency message "FF" from a central server with address "00123456578" is first sent to stand-alone wireless device "FO." The second message 702, further contains additional command data "A000123456" that may be used by the wireless communication device to identify further wireless communication devices to send the signal through on the way to the destination device.

The third message 704 illustrates how the open data packet protocol of the present invention may be used to "ping" a remote wireless communication device in order to determine the status of the wireless communication device. In this manner, source unit "E112345678" originates a ping request by sending command "08" to a transceiver identified as "A012345678." The response to the ping request may be as simple as reversing the "to address" and the "from address" of the command such that a healthy wireless communication device may send a ping message back to the originating device. Automated monitoring system 100 may be configured to expect a return ping within a specific time period. Operators of automated monitoring system 100 may use the delay between the ping request and the ping response to model system loads and to determine if specific system parameters might be adequately monitored and controlled with the expected feedback transmission delay.

Returning to FIG. 1, the repeater 125 acts as a communications bridge between a remote device and the site controller 150 when the remote device cannot reliably communicate directly with the site controller 150. In this manner, the repeater 125 may communicate in two or more modes: normal, emergency, etc.

Figure 8:
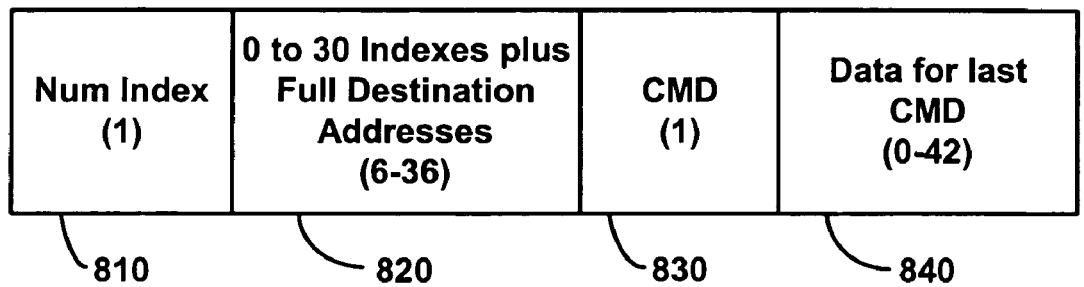
FIG. 8 is a table illustrating the data section of a downstream message in accordance with the message protocol of FIG. 5.

For example, during normal communication, the repeater 125 may have two functions: repeating messages (including repeating upstream messages) and repeating downstream messages. Upstream messages are transmissions to another repeater 125 or remote device. Downstream messages are transmissions to another repeater 125 or site controller 150. Responding to common messages involves taking the appropriate action and sending a response to the site controller 150. The repeater 125 may modify the message depending upon the stream direction. An exemplary format for the data field 570 (FIG. 5) for a downstream repeated message is set forth in FIG. 8. For instance, the data field 570 may have a "Num Index" 810, which may identify the number of indexes being sent with the downstream repeat. The indexes 820 may contain the downstream path including the intended recipient address. The "CMD" field 830 may identify the particular command for the intended receiving device. The "Data for last CMD" field 840 may include either an index table of downstream addresses or upstream addresses.

Figure 9:
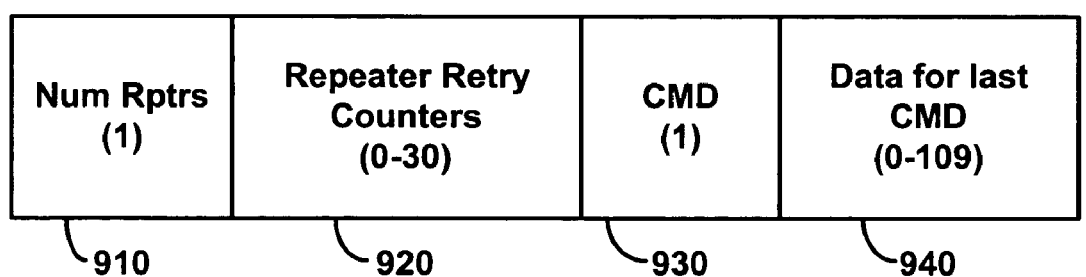
FIG. 9 is a table illustrating the data section of an upstream message in accordance with the message protocol of FIG. 5.

FIG. 9 sets forth an example of the structure for the data field 570 (FIG. 5) of an upstream message. The "number of repeaters" 910 may indicate the number of upstream repeaters. The "Repeater Retry Counters" 920 may indicate the number of retries by each repeater in the upstream. The "CMD" field 930 may indicate the command sent to the intended remote device. The "Data for last CMD" 940 may indicate the data in response to the original command from the intended remote device.

Examples of commands that are sent directly from the site controller 150 to the repeater 125 include load upstream addresses. This command causes the repeater 125 to store the addresses to which the repeater 125 sends messages when communicating upstream. The loading of the upstream addresses also initiates a transceiver functioning as a repeater 125. The response to a load command may be a status message that is sent to the site controller 150.

Another example of a communication mode is emergency mode. In this mode, emergency messages are automatically transmitted upstream regardless of what other actions may be taking place. Unlike normal communications, emergency messages are sent unsolicited from the integrated transceiver 135 to the site controller 150.

During all modes of communication, each of the communication devices may expect a response message to all messages sent. There may be at least two acknowledgements: a positive acknowledgement, a negative acknowledgement, etc. The positive acknowledgement may be sent whenever a message is received and understood. A negative acknowledgement may be sent whenever the message is not received and understood correctly or whenever an expected message is not received. A negative acknowledgment may be followed by a predetermined number of retries.

Further information regarding the structure and operation of the data packet protocol implemented in automated monitoring system 100 may be found in commonly assigned U.S. patent application "System and Method for Interconnecting Remote Devices in an Automated Monitoring System," Ser. No. 09/925,445 which is hereby incorporated in its entirety by reference.

Referring again to FIG. 1, during normal operations, the site controller 150 acts as the communications master. Thus, the site controller 150 may initiate all communications with the wireless communications devices, except emergency messages described below. In addition to initiating command messages, the site controller 150 also tracks response messages. This tracking allows the site controller 150 to monitor the operational status of the wireless communication devices.

In addition to orchestrating communications with the wireless communication devices, the site controller 150 maintains current databases of information regarding the automated monitoring system 100, such as, for example, the function of the wireless communication devices, the unique address for each of the wireless communication devices, and current data contained in response messages. One of ordinary skill in the art will appreciate that site controller 150 may contain information related to any of a variety of other aspects of automated monitoring system 100.

As stated above, the site controller 150 also controls communications with the applications server 110. When communicating with the applications server 110, the site controller 150 receives requests for information, commands, etc. and sends the appropriate response. The applications server 110 maintains the requested information and/or commands in such a way that a user can access the information via a remote desktop 155, remote laptop 160, or any other device configured for communication with WAN 120.

Furthermore, the site controller 150 may be configured to maintain a database of the wireless communication devices and their unique addresses. The unique addresses may be assigned such that the site controller 150 may easily send messages to one wireless communication device, a group of wireless communication devices, or all of the wireless communication devices.

Using the site controller 150 as a communications master and maintaining individual device information at the site controller 150 enables the wireless communication devices to be simplified. The simplification of the wireless communication devices has two main advantages: (1) simplifying the construction of the wireless communication device and (2) decreasing cost. The wireless communication device may be simplified because of a reduced need for large memory and/or storage devices. As well-known in the art, memory and storage devices increase in cost as they increase in size. Therefore, decreasing the size of the memory and/or storage reduces the construction and operating costs of the wireless communication devices.

The site controller 150 sends messages to the wireless communication devices using the open data packet protocol described above. Initially, the site controller 150 maps all of the wireless communication devices so as to "learn" all the unique addresses and the necessary communication paths. To do this mapping, the site controller 150 issues a command to document the down-stream addresses and the up-stream addresses for each communication path associated with a wireless communication device. The site controller 150 logs the response data from the wireless communication devices into the appropriate databases. Messages from the site controller 150 travel downstream to the intended wireless communication device(s). Messages from the wireless communication devices(s) travel upstream to the site controller 150. When mapping the communication paths for each of the wireless communication devices, the site controller 150 "learns" the unique address of each wireless communication device, the addresses of each wireless communication device that can directly and reliably communicate with each transceiver/repeater(s) 125 in a downstream path, the unique address of each transceiver/repeater(s) 125 in a downstream path, the upstream addresses for the wireless communication device, and the downstream addresses for the wireless communication device.

When sending command messages, the site controller 150 expects an acknowledgement to each command. A command is considered to be not acknowledged when either the site controller 150 fails to receive a positive acknowledgement from the addressed wireless communication device within a first time period, fails to detect the re-transmission of the command message by a transceiver/repeater 125 within a second time period, or receives a negative acknowledgement from a transceiver/repeater 125 in the communication path of the wireless communication device. If the site controller 150 receives a negative acknowledgement, the site controller 150 can then log the failed message and retransmit the message. This re-transmission can occur a predetermined number of times. It should be noted the first time period may be longer than the second time period. In the above cases, the first time period is long enough to ensure receipt of the preamble of the response message when there are multiple transceiver/repeater(s) 125 in the communications path. The second time period is long enough to either receive the preamble of the response message (if no repeaters are in the communications path) or to hear the preamble of the command message being re-transmitted by the first transceiver/repeater 125 in the communication path of the wireless communication device.

After initializing and during normal operation, the site controller 150 may poll each of the remote sensor/actuators according to a predetermined schedule. During this process, the site controller 150 requests the current operating status of each of the sensors/actuators 135. The status of a sensor/actuator device 135 depends upon the type of device. For example, a smoke detector's status may be operational/non-operational. In contrast, a utility meter's status may be the utility usage that has occurred since the last polling. A thermostat's status response may be the actual temperature and the desired temperature. The information sent in response to a status poll may vary depending upon the particular configuration of the sensor/actuator 135. This information is maintained by the site controller 150 and may be sent to the applications server 110 upon request. The predetermined schedule has flexibility based upon the number of failed attempts and any emergency messages. To poll the device, the site controller 150 sends a "read status" message. The command message is considered complete upon receipt of the response message. The command message is considered failed upon receipt of a negative acknowledgement. After a negative acknowledgement, the site controller 150 retries the command six more times and logs all failed attempts.

To facilitate communications with the applications server 110, the site controller 150 may maintain database files of information. The site controller 150 may maintain communication databases that store the device failures, as discussed above, and that store the emergency messages. These database stored logs can contain the unique address of the wireless communication device, a code representing a present condition, and a date/time stamp. Any failures to communicate with the applications server 110 are also logged into the appropriate database. These databases may have a predetermined size and may be forwarded to the applications server 110 when the databases are a specific percentage full or upon request by the applications server 110. Once forwarded to and acknowledged by the applications server 110, the entries in the communications databases are deleted. One of ordinary skill in the art will appreciate that the contents, size, and scheduling of database entries may be varied in a variety of ways.

After mapping the wireless communication devices, the site controller 150 develops and maintains a database that includes the unique address for each wireless communication device, the number of transceiver/repeaters 125 in the downstream path, the address of each transceiver/repeater 125 in the downstream path, the upstream addresses, and the downstream addresses. The site controller 150 does not necessarily respond to the messages from wireless communication devices not listed in this database.

In addition to mapping the wireless communication devices, the site controller 150 may update the device database via the applications server 110. This update may add/delete wireless communication devices from the automated monitoring system 100, change the communications path of any or all of the wireless communication devices, or change the unique addresses of any or all of the wireless communication devices. Upon request of the applications server 110, the site controller 150 may transmit the device database to the applications server 110.

It should be noted that the databases enumerated above are merely exemplary, and other databases may be included as would be obvious to one of ordinary skill in the art.

The "normal" operating procedure described above is continued unless the site controller 150 receives an emergency message from a wireless communication device. The emergency message is transmitted unsolicited. The emergency message can be received by the site controller 150 either directly, via a repeater, or via a plurality of repeaters. Upon receipt of an emergency message, the site controller 150 immediately notifies the applications server 110 of the emergency message. In addition, the site controller 150 suspends the above polling for a predetermined time period. This suspension insures the receipt of any additional emergency messages. After the time period expires with no additional messages, the site controller 150 resumes polling.

To facilitate communications between the applications server 110 and the site controller 150, the site controller 110 maintains a database of contact information. By way of example, if the site controller 150 communicates via a network interface device 408, the site controller 150 can maintain a database of telephone numbers and IP addresses of the applications server 110.

During normal communications, the applications server 110 sends response messages. As stated above, one of ordinary skill in the art will appreciate that the applications server 110 and the site controller 150 may communicate via TCP/IP protocol or any other protocol. Exemplary requests include a "get file" request of the database and a "put file" request, which sends a file to the site controller 150.

Normal communications between the site controller 150 and the applications server 110 may also be interrupted by an emergency message. The emergency message originates at the site controller 150 and may include an emergency message from a remote device, a "file too large" message, and a site controller status change message to name a few. In the case of safety and security system devices such as smoke detectors, glass break alarms, etc., the site controller 150 may immediately generate an emergency message to the applications server 110 in the event a safety/security device fails to respond to a poll message.

Figure 10:
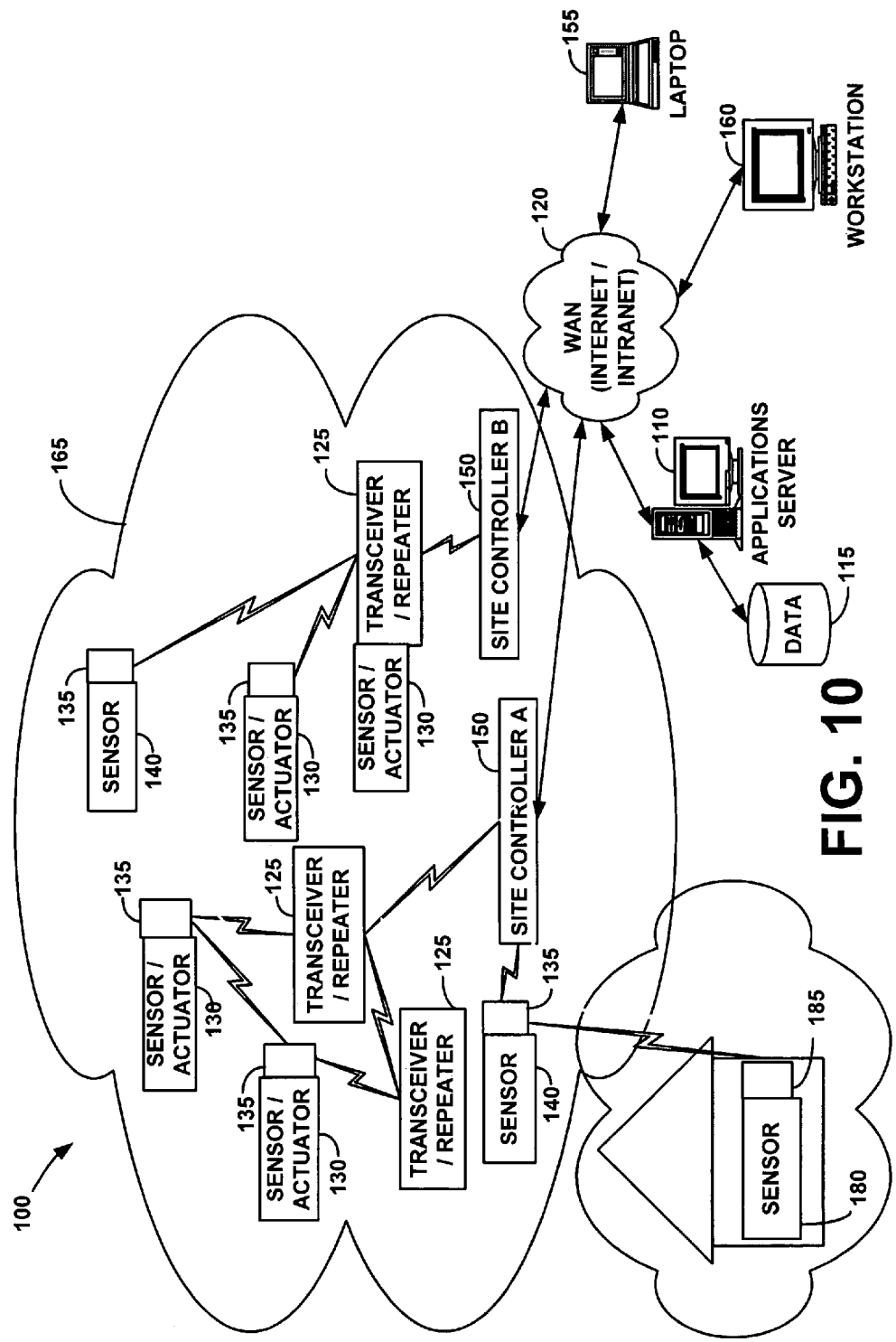
FIG. 10 is a block diagram illustrating another embodiment of the automated monitoring system according to the present invention.

FIG. 10 sets forth an alternate embodiment of an automated monitoring system 100. Automated monitoring system 100 of FIG. 1 is shown with an additional sensor 180 and transceiver 185. The additional sensor 180 and transceiver 185 are shown to be communicating with, but outside of, the coverage area 165. In this example, the additional sensor 180 and transceiver 185 may be placed outside of the original control system. In order to communicate, the coverage area of transceiver 185 need only overlap the coverage area 165. By way of example only, the original installation may be an automated monitoring system 100 that monitors electricity usage via the utility meters in an apartment complex. Later a neighbor in a single family residence nearby the apartment complex may remotely monitor and control their thermostat by installing a sensor/actuator transceiver according to the present invention. The transceiver 185 then communicates with the site controller 150 of the apartment complex. If necessary, repeaters (not shown) can also be installed to communicate between the transceiver 185 and the apartment complex site controller 150. Without having the cost of the site controller 150, the neighbor may enjoy the benefits of the control system.

Figure 11:
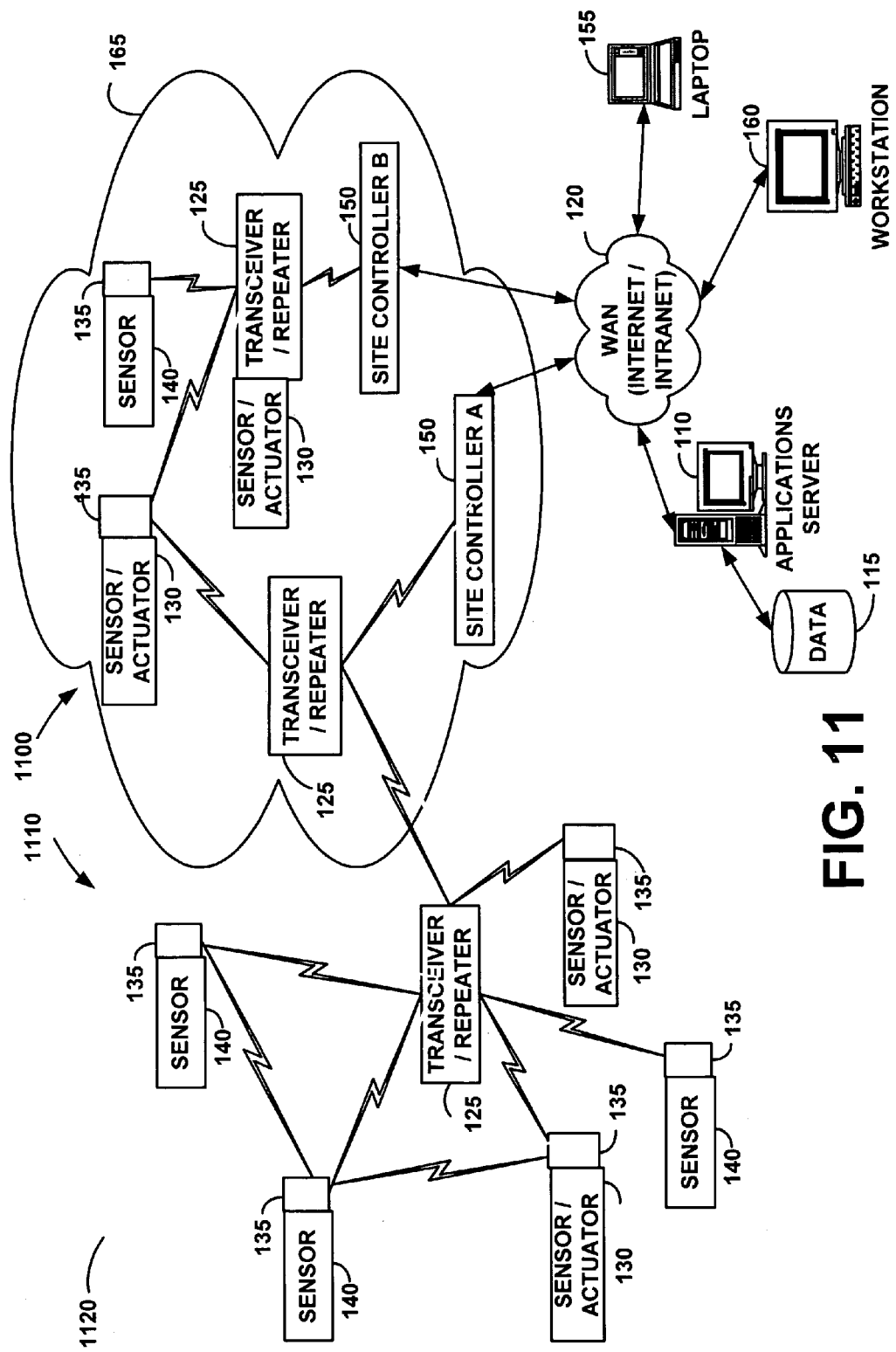
FIG. 11 illustrates an automated monitoring network 1100 according to the present invention for enabling multiple groups of remote devices associated with multiple wireless communication networks to be monitored and/or controlled via a common connection to a wide area network.

FIG. 11 illustrates an automated monitoring network 1100 according to the present invention for enabling multiple groups of remote devices associated with multiple wireless communication networks to be monitored and/or controlled via a common connection to a wide area network, such as a WAN 120. As illustrated in FIG. 11, automated monitoring network 1100 comprises a primary automated monitoring system, such as automated monitoring system 100, and a secondary wireless communication network 1110 in communication with automated monitoring system 100. Automated monitoring system 100 may operate and be configured as described above.

For example, automated monitoring system 100 may comprise a plurality of remote devices to be monitored and/or controlled, a plurality of communication devices, such as transceivers 125 and 135, a site controller 150, a WAN 120, and a host computer, such as an applications server 110, a laptop 155, or a workstation 160. Each of the plurality of remote devices may be in communication with one of the plurality of communication devices such that a primary wireless communication network is defined within coverage area 165. In this manner, the primary wireless communication network associated with automated monitoring system 100 provides communication between each of the remote devices within coverage area 165 and the site controller 150. Hereinafter, the remote devices associated with automated monitoring system 100 will be referred to as the first group of remote devices.

Secondary wireless communication network 1110 may comprise a second group of remote devices to be monitored and/or controlled and a plurality of communication devices, such as transceivers 125 and 135. Each of the second group of remote devices in secondary wireless communication network 1110 may be in communication with one of the plurality of communication devices such that the secondary wireless communication network 1110 is defined within coverage area 1120. Secondary wireless communication network 1110 may operate and be configured in a manner similar to the primary wireless communication network of automated monitoring system 100. For example, secondary wireless communication network 1110 may employ transceivers 125 and 135 as described above. Secondary wireless communication network 1110 may also employ the communication protocol described above. Nonetheless, one of ordinary skill in the art will appreciate that other transceivers and other communication protocols may be employed.

As illustrated in FIG. 11, automated monitoring system 100 includes one or more site controllers 150 that manage communications with applications server 110 via WAN 120. Significantly, automated monitoring network 1100 according to the present invention enables the secondary wireless communication network 1110 to access WAN 120 via the primary wireless communications network. Thus, the secondary wireless communication network 1110 does not have to use a separate site controller 150 in order to communicate with applications servers 110, laptop 155, workstation 160, or other computing devices connected to WAN 120. Instead, the secondary wireless communication network 1110 may access the site controller 150 in automated monitoring system 100 via the primary wireless communication network. For example, at least one of the communication devices in the secondary wireless communication network 1110 may communicate with at least one of the communication devices in automated monitoring system 100. In this manner, messages may be exchanged between the site controller 150 of the primary wireless communication network and the second group of remote devices, thereby enabling the second group of remote devices to be monitored and/or controlled via the site controller 150 and/or the various computing devices connected to WAN 120.

The transceivers in automated monitoring system 100 and secondary wireless communication network 1110 may be configured to receive data signals from other devices and/or appliances via other wireless technologies, such as Bluetooth and the 802.11 (b) standard adopted by the Institute of Electrical and Electronics Engineers (IEEE), which is hereby incorporated by reference in its entirety. For instance, the transceivers may be configured to implement the technology described in "Specification of the Bluetooth System: Specification Volume 1," Feb. 22, 2001, which is hereby incorporated by reference in its entirety. In addition, infrared, ultrasonic, and other types of wireless transceivers may be employed as one of ordinary skill in the art will appreciate.

One of ordinary skill in the art will appreciate that automated monitoring network 1100 provides a number of advantages for monitoring and/or controlling remote devices. For example, automated monitoring network 1100 reduces the expense associated with monitoring and/or controlling the second group of remote devices in the secondary wireless communication network 1110. Specifically, the automated monitoring network 1100 according to the present invention eliminates the need for a separate site controller 150 and separate access to WAN 120. Furthermore, automated monitoring network 1100 promotes cooperative relationships between organizations providing remote monitoring.

By way of example, automated monitoring system 100 may be used by an organization to enable customers to monitor and/or control a first group of remote devices. For instance, automated monitoring system 100 may be used to provide individual residences in a managed apartment complex with the ability to remotely monitor and/or control a residential application, such as a residential security system. As described above and illustrated in FIG. 1, in this example automated monitoring system 100 may enable residents of the apartment complex to monitor and/or control the status of their residential security system via a laptop 155, workstation 160, or other computing device in communication with WAN 120.

Automated monitoring network 1100 enables a second group of remote devices associated with secondary wireless communication network 1110 to be monitored and/or controlled without obtaining a separate site controller 150 and separate access to WAN 120. As stated above, the secondary wireless communication network 1110 may access WAN 120 via the primary automated monitoring system 100. For example, in the above example, the second group of remote devices associated with secondary wireless communication network 1110 may be the electric meters for each of the residences in the managed apartment complex. The electric utility company that provides service to the managed apartment complex may desire to provide remote monitoring to the residents. Automated monitoring network 1100 according to the present invention enables the electric utility company to easily provide remote monitoring of the electric meters to the residents.

For instance, the electric utility company does not have to establish an independent automated monitoring system 100. Rather, the electric utility company only needs to establish a secondary wireless communication network 1110 as described above. Each of the electric meters may be communicatively coupled to a wireless transceiver, such as a transceiver 125 and transceiver 135 described above. In order to ensure communication throughout the entire coverage area 1120 of the electric meters associated with the secondary wireless communication network 1110, it may be necessary to implement additional wireless transceivers and/or repeaters as described above. In this manner, the collection of wireless transceivers associated with the electric meters defines the secondary wireless communication network 1110. As mentioned above, secondary wireless communication network 1110 may operate and be configured in a manner similar to the primary wireless communication network of automated monitoring system 100.

Given the existence of the secondary wireless communication network 1110, the electric utility company may provide remote monitoring of the electric meters to the residents via the automated monitoring system 100 for monitoring and/or controlling the residential security systems. The only requirement is that at least one of the wireless transceivers associated with the electric meters is in communication with at least one of the wireless transceivers associated with the residential security systems. Data messages related to the secondary wireless communication system 1110 may be passed through the primary wireless communication network to the site controller 150 and on to applications server 110 via WAN 120, thereby enabling the electric meters to be monitored and/or controlled via the site controller 150 and/or the various computing devices connected to WAN 120.

One of ordinary skill in the art will appreciate that the secondary wireless communication network 1110 and the automated monitoring system 100 may employ any of a variety of types of remote devices. Accordingly, the specific needs of the secondary wireless communication network 1110 and the automated monitoring system 100 may differ. For example, secondary wireless communication network 1110 and the automated monitoring system 100 may differ only in the type of devices being monitored and/or controlled. As in the above example of one of many possible embodiments, coverage area 165 of automated monitoring system 100 and coverage area 1120 of secondary wireless communication network 1110 may be substantially overlapping. However, in other embodiments of automated monitoring network 1100, coverage area 165 and coverage area 1120 only have to overlap such that at least one transceiver from both secondary wireless communication network 1110 and automated monitoring system 100 communicate.

One of ordinary skill in the art will appreciate that what has been described herein is a very top-level illustration of a system constructed in accordance with the automated monitoring system 100 and the automated monitoring network 1100 of the present invention. In accordance with the invention, a variety of remote devices, such as utility meter devices, personal security devices, household devices and appliances, and other remote devices employing a sensor and/or an actuator, may be monitored and/or controlled from a remote location via a computing device connected to WAN 120. The data and command transmissions may be transmitted and received by the site controller 150 connected to WAN 120. Site controller 150 is further in communication with the wireless communication devices within coverage area 165. The data and command transmissions may be relayed via the various wireless communication devices defining the communication path until they reach a designated destination or the site controller 150.

It will be further appreciated that automated monitoring system 100 in accordance with the present invention may be used in a variety of environments. In one embodiment, automated monitoring system 100 may be employed to monitor and record utility usage by residential and industrial customers, to transfer vehicle diagnostics from an automobile via a wireless transceiver integrated with the vehicle diagnostics bus to a local transceiver that further transmits the vehicle information through a local gateway onto a WAN, to monitor and control an irrigation system, to automate a parking facility, to monitor and control a residential security system, etc, which are described in more detail in the commonly assigned U.S. patent application entitled, "System and Method for Monitoring and Controlling Residential Devices," issued Ser. No. 09/704,150.

Automated monitoring system 100 may be adapted to monitor and apply control signals in an unlimited number of applications. By way of example only, the wireless communication devices may be adapted for use with any associated device, such as, for example, pay type publicly located telephones, cable television set top boxes, utility meters, and residential appliances and/or devices to enable a remote controllable home automation and security system.

In a geographic area appropriately networked with permanently located stand-alone transceivers 125, personal transceivers (not shown) may be used to monitor and control personnel access and egress from specific rooms or portions thereof within a controlled facility. Personal transceivers may further be configured to transfer personal information to public emergency response personnel, to transfer personal billing information to vending machines, or to monitor individuals within an assisted living community.

Wireless communication devices using the open data packet protocol of the present invention may be integrated to monitor and control a host of industrial and business applications as well. By way of example only, building automation systems, fire control systems, alarm systems, industrial trash compactors, and building elevators may be monitored and controlled. In addition, courier drop boxes, time clock systems, automated teller machines, self-service copy machines, and other self-service devices may be monitored and controlled as appropriate. By way of further example, a number of environment variables that require monitoring may be integrated with automated monitoring system 100 to permit remote monitoring and control. For instance, light levels in the area adjacent to automated teller machines must meet minimum federal standards. Also, the water volume transferred by water treatment plant pumps, smokestack emissions from a coal burning power plant, or a coke fueled steel plant oven may be remotely monitored.

The wireless communication devices using the open data packet protocol of the present invention may be further integrated with a voice-band transceiver having multiple function buttons. As a result, when a person presses, for example, the emergency button on his/her transmitter, medical personnel, staff members, or others may respond by communicating via two-way radio with the party in distress. In this regard, each transceiver may be equipped with a microphone and a speaker that would allow a person to communicate information such as their present emergency situation, their specific location, etc.

The foregoing description has been presented for purposes of illustration and description. It is not intended to be exhaustive or to limit the invention to the precise forms disclosed. Obvious modifications or variations are possible in light of the above teachings. For example, it should be appreciated that, in some implementations, the transceiver unique address is not necessary to identify the location of the transceiver. Indeed, in implementations where the transceiver is permanently integrated into an alarm sensor other stationary device within a system, then the applications server 110 and/or the site controller 150 may be configured to identify the transmitter location by the transmitter unique address alone. It will be appreciated that, in embodiments that do not utilize wireless transceiver/repeaters 125, the wireless transmitters 145 and/or wireless transceivers 135 may be configured to transmit at a higher power level, in order to effectively communicate with the site controller 150.

The embodiment or embodiments discussed were chosen and described to illustrate the principles of the invention and its practical application to enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly and legally entitled.

The invention claimed is:

1. A wireless communication network adapted for use in an automated monitoring system for monitoring and controlling a plurality of remote devices via a host computer connected to a wide area network, the wireless communication network comprising:
   a plurality of wireless transceivers having unique identifiers, each of the plurality of wireless transceivers configured to receive a sensor data signal from one of the plurality of remote devices and transmit an original data message using a predefined wireless communication protocol, the original data message comprising the corresponding unique identifier and sensor data signal, and further configured to receive the original data message transmitted by one of the other wireless transceivers and transmit a repeated data message using the predefined communication protocol, the repeated data message including the sensor data signal and the corresponding unique identifier; and
   a site controller in communication with at least one of the plurality of wireless transceivers, the site controller configured to receive the original data messages and the repeated data messages, identify the remote device associated with the corresponding sensor data signal, and provide information related to the sensor data signal to the wide area network for delivery to the host computer.

2. The wireless communication network of claim 1, further comprising a plurality of repeaters having unique identifiers, each of the plurality of repeaters in communication with at least one of the plurality of wireless transceivers and configured to receive the original data message transmitted by the at least one of the plurality of wireless transceivers and transmit a repeated data message using the predefined communication protocol, the repeated data message including the sensor data signal from the original data message and the unique identifier corresponding to the repeater.

3. The wireless communication network of claim 1, wherein the site controller is further configured to provide a command message to one of the plurality of wireless transceivers and each of the plurality of wireless transceivers are further configured to transmit, in response to the command message, the original data message, wherein the original data message corresponds to the command message.

4. The wireless communication network of claim 1, wherein the predefined communication protocol comprises a data packet comprising:

a receiver address identifying the receiver of the data packet;
   a sender address identifying the sender of the data packet; and
   a command indicator specifying a predefined command code.

5. The wireless communication network of claim 4, wherein the data packet further comprises:
   a packet length indicator which indicates a total number of bytes in the current packet;
   a total packet indicator which indicates the total number of packets in the current message;
   a current packet indicator which identifies the current packet; and
   a message number identifying the current message.

6. The wireless communication network of claim 1, wherein the plurality of wireless transceivers are further configured to receive signals via Bluetooth technology.

7. The wireless communication network of claim 1, wherein the plurality of wireless transceivers are further configured to receive signals via IEEE standard 802.11(b).

8. A wireless communication network adapted for use in an automated monitoring system for monitoring and controlling a plurality of remote devices via a host computer connected to a wide area network, the wireless communication network comprising:
   a plurality of wireless communication means having unique identifiers, each of the plurality of wireless communication means configured to receive a sensor data signal from one of the plurality of remote devices and transmit an original data message using a predefined wireless communication protocol, the original data message comprising the corresponding unique identifier and sensor data signal, and further configured to receive the original data message transmitted by one of the other wireless transceivers and transmit a repeated data message using the predefined communication protocol, the repeated data message including the sensor data signal and the corresponding unique identifier;
   a means for receiving each of the original data messages and the repeated data messages;
   a means for identifying, for each received message, the remote device associated with the corresponding sensor data signal; and
   a means for providing information related to the sensor data signal to the wide area network for delivery to the host computer.

9. The wireless communication network of claim 8, further comprising a plurality of repeating means having unique identifiers, each of the plurality of repeating means in communication with at least one of the plurality of wireless communication means and comprising a means for receiving the original data message transmitted by the at least one of the plurality of wireless transceivers and a means for transmitting a repeated data message using the predefined communication protocol, the repeated data message including the sensor data signal from the original data message and the unique identifier corresponding to the repeater.

10. The wireless communication network of claim 8, further comprising a means for providing a command message to one of the plurality of wireless communication means, wherein each of the wireless communication means further comprise a means for transmitting, in response to the command message, the original data message, wherein the original data message corresponds to the command message.

11. The wireless communication network of claim 8, wherein the predefined communication protocol comprises a data packet comprising:
- a means for identifying the receiver of the data packet;
- a means for identifying the sender of the data packet; and
- a command means for specifying a predefined command code.

12. The wireless communication network of claim 11, wherein the data packet further comprises:
- a means for indicating a total number of bytes in the current packet;
- a means for indicating the total number of packets in the current message;
- a means for identifying the current packet; and
- a means for identifying the current message.

13. A wireless communication network for monitoring and controlling a plurality of remote devices via a host computer connected to a wide area network, the wireless communication network comprising:
- a plurality of wireless transceivers having unique identifiers, each of the plurality of wireless transceivers configured to receive a sensor data signal from one of the plurality of remote devices and transmit an original data message using a predefined wireless communication protocol, the original data message comprising the corresponding unique identifier and sensor data signal, and further configured to receive the original data message transmitted by one of the other wireless transceivers and transmit a repeated data message using the predefined communication protocol, the repeated data message including the sensor data signal and the corresponding unique identifier;
- wherein at least one of the plurality of wireless transceivers is further configured to provide the original data messages and the repeated data messages to a site controller connected to the wide area network.

14. The wireless communication network of claim 13, further comprising a plurality of repeaters having unique identifiers, each of the plurality of repeaters in communication with at least one of the plurality of wireless transceivers and configured to receive the original data message transmitted by the at least one of the plurality of wireless transceivers and transmit a repeated data message using the predefined communication protocol, the repeated data message including the sensor data signal from the original data message and the unique identifier corresponding to the repeater.

15. The wireless communication network of claim 13, wherein the at least one of the plurality of wireless transceivers is further configured to receive a command message for one of the plurality of wireless transceivers from the site controller and transmit the command message to the one of the plurality of wireless transceivers.

16. The wireless communication network of claim 13, wherein the predefined communication protocol comprises a data packet comprising:
- a receiver address identifying the receiver of the data packet;
- a sender address identifying the sender of the data packet; and
- a command indicator specifying a predefined command code.

17. The wireless communication network of claim 16, wherein the data packet further comprises:
- a packet length indicator which indicates a total number of bytes in the current packet;
- a total packet indicator which indicates the total number of packets in the current message; and
- a current packet indicator which identifies the current packet; and
- a message number identifying the current message.

18. The wireless communication network of claim 13, wherein the plurality of wireless transceivers are further configured to receive signals via Bluetooth technology.

19. The wireless communication network of claim 13, wherein the plurality of wireless transceivers are further configured to receive signals via IEEE standard 802.11(b).

20. A wireless communication network for monitoring and controlling a plurality of remote devices via a host computer connected to a wide area network, the wireless communication network comprising:
- a plurality of wireless transceivers having unique identifiers, each of the plurality of wireless transceivers configured to receive a sensor data signal from one of the plurality of remote devices and transmit an original data message using a predefined wireless communication protocol, the original data message comprising the corresponding unique identifier and sensor data signal, and further configured to receive the original data message transmitted by one of the other wireless transceivers and transmit a repeated data message using the predefined communication protocol, the repeated data message including the sensor data signal and the corresponding unique identifier;
- wherein at least one of the plurality of wireless transceivers is further configured to provide the original data messages and the repeated data messages to a primary wireless communication network associated with an automated monitoring system.

21. The wireless communication network of claim 20, further comprising a plurality of repeaters having unique identifiers, each of the plurality of repeaters in communication with at least one of the plurality of wireless transceivers and configured to receive the original data message transmitted by the at least one of the plurality of wireless transceivers and transmit a repeated data message using the predefined communication protocol, the repeated data message including the sensor data signal from the original data message and the unique identifier corresponding to the repeater.

22. The wireless communication network of claim 20, wherein the at least one of the plurality of wireless transceivers is further configured to receive a command message for one of the plurality of wireless transceivers from the primary wireless communication network and transmit the command message to the one of the plurality of wireless transceivers.

23. The wireless communication network of claim 20, wherein the predefined communication protocol comprises a data packet comprising:
- a receiver address identifying the receiver of the data packet;
- a sender address identifying the sender of the data packet; and
- a command indicator specifying a predefined command code.

24. The wireless communication network of claim 23, wherein the data packet further comprises:
- a packet length indicator which indicates a total number of bytes in the current packet;
- a total packet indicator which indicates the total number of packets in the current message;

a current packet indicator which identifies the current packet; and a message number identifying the current message.

25. The wireless communication network of claim 20, wherein the plurality of wireless transceivers are further configured to receive signals via Bluetooth technology.

26. The wireless communication network of claim 20, wherein the plurality of wireless transceivers are further configured to receive signals via IEEE standard 802.11(b).

27. A method for enabling customers to monitor remote devices via a wide area network (WAN), the method comprising the steps of:

establishing a wireless communication network that enables each of a plurality of customers to monitor at least one remote device via a wide area network, the wireless communication network comprising:

a plurality of wireless transceivers each integrated with one of the plurality of remote devices and having a unique identifier and configured to receive a sensor data signal from the remote device and transmit an original data message using a predefined wireless communication protocol, the original data message comprising the corresponding unique identifier for the originating wireless transceiver, each wireless transceiver further configured to receive the original data message transmitted by one of the other wireless transceivers and transmit a repeated data messaging using the predefined communication protocol, the repeated data message including the original sensor data signal and the corresponding unique identifiers for the originating wireless transceiver and the repeating wireless transceiver; and a site controller in communication with at least one of the plurality of wireless transceivers, the site controller configured to receive the original data messages and the repeated data messages, identify the remote device associated with the corresponding sensor data signal, and provide information related to the sensor data signal to a WAN for delivery to a host computer; and providing an organization access to the wireless communication network.

28. The method of claim 27, further comprising the step of receiving compensation for providing the organization access to the wireless communication network.

29. The method of claim 28, wherein the step of providing the organization access to the wireless communication network comprises enabling at least one remote device corresponding to a customer of the organization to communicate with the wireless communication network so that the remote device may be monitored via the WAN.

* * * * *

UNITED STATES PATENT AND TRADEMARK OFFICE
CERTIFICATE OF CORRECTION

| | | Page 1 of 1 |
|---|---|---|
| PATENT NO. | : 7,103,511 C1 | |
| APPLICATION NO. | : 90/010505 | |
| DATED | : October 25, 2011 | |
| INVENTOR(S) | : Thomas D. Petite | |

It is certified that error appears in the above-identified patent and that said Letters Patent is hereby corrected as shown below:

In the Claims:

Column 2, line 26 should read,
    44. A wireless communication network adapted for use in an automated monitoring system for monitoring and controlling a plurality of remote devices via a host computer connected to a wide area network, the wireless communication network comprising:

Signed and Sealed this
Sixth Day of May, 2014

Michelle K. Lee
*Deputy Director of the United States Patent and Trademark Office*

US007103511C1

(12) EX PARTE REEXAMINATION CERTIFICATE (8639th)

United States Patent
Petite

(10) Number: US 7,103,511 C1
(45) Certificate Issued: Oct. 25, 2011

(54) WIRELESS COMMUNICATION NETWORKS FOR PROVIDING REMOTE MONITORING OF DEVICES

(75) Inventor: Thomas D. Petite, Douglasville, GA (US)

(73) Assignee: Sipco, LLC, Atlanta, GA (US)

Reexamination Request:
No. 90/010,507, May 13, 2009
No. 90/010,508, May 13, 2009
No. 90/010,509, May 13, 2009
No. 90/010,505, May 13, 2009

Reexamination Certificate for:
Patent No.: 7,103,511
Issued: Sep. 5, 2006
Appl. No.: 09/925,269
Filed: Aug. 9, 2001

Related U.S. Application Data

(63) Continuation-in-part of application No. 09/812,809, filed on Mar. 20, 2001, now abandoned, which is a continuation-in-part of application No. 09/412,895, filed on Oct. 5, 1999, now Pat. No. 6,218,953, which is a continuation-in-part of application No. 09/172,554, filed on Oct. 14, 1998, now Pat. No. 6,028,522, and a continuation-in-part of application No. 09/271,517, filed on Mar. 18, 1999, now abandoned, and a continuation-in-part of application No. 09/439,059, filed on Nov. 12, 1999, now Pat. No. 6,437,692.

(51) Int. Cl.
*G06F 15/00* (2006.01)

(52) U.S. Cl. ............ 702/188; 340/870.06; 455/423
(58) Field of Classification Search .......... None
See application file for complete search history.

(56) References Cited

U.S. PATENT DOCUMENTS

| 3,575,558 A | 4/1971 | Leyburn et al. |
| 3,665,475 A | 5/1972 | Gram |
| 3,705,385 A | 12/1972 | Batz |
| 3,723,876 A | 3/1973 | Seaborn, Jr. |
| 3,742,142 A | 6/1973 | Martin |

(Continued)

FOREIGN PATENT DOCUMENTS

| EP | 0 483 547 A1 | 5/1992 |
| EP | 0 578 041 B1 | 1/1994 |
| EP | 0 663 746 B1 | 7/1995 |
| EP | 0718954 A1 | 6/1996 |
| EP | 0 740 873 B1 | 11/1996 |

(Continued)

OTHER PUBLICATIONS

*ABB Kent–Taylor Interfacing*, Author: unknown, *Engineering Report*, No. 93–011, Jun. 18, 1996, pp. 1–9.

(Continued)

*Primary Examiner* — Matthew Heneghan

(57) ABSTRACT

Wireless communication networks for monitoring and controlling a plurality of remote devices are provided. Briefly, one embodiment of a wireless communication network may comprise a plurality of wireless transceivers having unique identifiers. Each of the plurality of wireless transceivers may be configured to receive a sensor data signal from one of the plurality of remote devices and transmit an original data message using a predefined wireless communication protocol. The original data message may comprise the corresponding unique identifier and sensor data signal. Each of the plurality of wireless transceivers may be configured to receive the original data message transmitted by one of the other wireless transceivers and transmit a repeated data message using the predefined communication protocol. The repeated data message may include the sensor data signal and the corresponding unique identifier. Furthermore, at least one of the plurality of wireless transceivers may be further configured to provide the original messages and the repeated data messages to a site controller connected to a wide area network. The site controller may be configured to manage communications between the wireless communication network and a host computer connected to the wide area network.

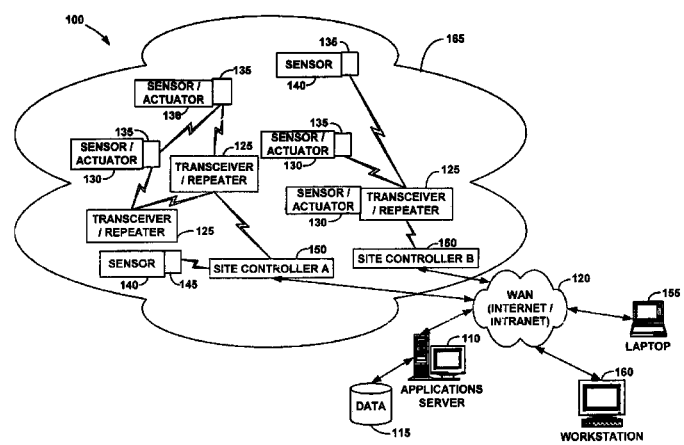

U.S. PATENT DOCUMENTS

| | | |
|---|---|---|
| 3,848,231 A | 11/1974 | Wootton |
| 3,892,948 A | 7/1975 | Constable |
| 3,906,460 A | 9/1975 | Halpern |
| 3,914,692 A | 10/1975 | Seaborn, Jr. |
| 3,922,492 A | 11/1975 | Lumsden |
| 3,925,763 A | 12/1975 | Wadhwani et al. |
| 4,025,315 A | 5/1977 | Mazelli |
| 4,056,684 A | 11/1977 | Lindstrom |
| 4,058,672 A | 11/1977 | Crager et al. |
| 4,083,003 A | 4/1978 | Haemmig |
| 4,120,452 A | 10/1978 | Kimura et al. |
| 4,124,839 A | 11/1978 | Cohen |
| 4,135,181 A | 1/1979 | Bogacki et al. |
| 4,204,195 A | 5/1980 | Bogacki |
| 4,213,119 A | 7/1980 | Ward et al. |
| 4,277,837 A | 7/1981 | Stuckert |
| 4,278,975 A | 7/1981 | Kimura et al. |
| 4,284,852 A | 8/1981 | Szybicki et al. |
| 4,336,524 A | 6/1982 | Levine |
| 4,345,116 A | 8/1982 | Ash et al. |
| 4,354,181 A | 10/1982 | Spletzer |
| 4,396,910 A | 8/1983 | Enemark et al. |
| 4,396,915 A | 8/1983 | Farnsworth et al. |
| 4,399,531 A | 8/1983 | Grande et al. |
| 4,406,016 A | 9/1983 | Abrams et al. |
| 4,417,450 A | 11/1983 | Morgan, Jr. et al. |
| 4,436,957 A | 3/1984 | Mazza et al. |
| 4,446,454 A | 5/1984 | Pyle |
| 4,446,458 A | 5/1984 | Cook |
| 4,454,414 A | 6/1984 | Benton |
| 4,468,656 A | 8/1984 | Clifford et al. |
| 4,488,152 A | 12/1984 | Arnason et al. |
| 4,495,496 A | 1/1985 | Miller, III |
| 4,551,719 A | 11/1985 | Carlin et al. |
| 4,611,198 A | 9/1986 | Levinson et al. |
| 4,621,263 A | 11/1986 | Takenaka et al. |
| 4,630,035 A | 12/1986 | Stahl et al. |
| 4,631,357 A | 12/1986 | Grunig |
| 4,669,113 A | 5/1987 | Ash et al. |
| 4,670,739 A | 6/1987 | Kelly, Jr. |
| 4,704,724 A | 11/1987 | Krishnan et al. |
| 4,707,852 A | 11/1987 | Jahr et al. |
| 4,731,810 A | 3/1988 | Watkins |
| 4,742,296 A | 5/1988 | Petr et al. |
| 4,757,185 A | 7/1988 | Onishi |
| 4,788,721 A | 11/1988 | Krishnan et al. |
| 4,792,946 A | 12/1988 | Mayo |
| 4,800,543 A | 1/1989 | Lyndon-James et al. |
| 4,814,763 A | 3/1989 | Nelson et al. |
| 4,825,457 A | 4/1989 | Lebowitz |
| 4,829,561 A | 5/1989 | Matheny |
| 4,833,618 A | 5/1989 | Verma et al. |
| 4,849,815 A | 7/1989 | Streck |
| 4,851,654 A | 7/1989 | Nitta |
| 4,856,046 A | 8/1989 | Streck et al. |
| 4,857,912 A | 8/1989 | Everett, Jr. et al. |
| 4,864,559 A | 9/1989 | Perlman |
| 4,875,231 A | 10/1989 | Hara et al. |
| 4,884,132 A | 11/1989 | Morris et al. |
| 4,897,644 A | 1/1990 | Hirano |
| 4,906,828 A | 3/1990 | Halpern |
| 4,908,769 A | 3/1990 | Vaughan et al. |
| 4,912,656 A | 3/1990 | Cain et al. |
| 4,918,432 A | 4/1990 | Pauley et al. |
| 4,918,690 A | 4/1990 | Markkula, Jr. et al. |
| 4,918,995 A | 4/1990 | Pearman et al. |
| 4,924,462 A | 5/1990 | Sojka |
| 4,928,299 A | 5/1990 | Tansky et al. |
| 4,939,726 A | 7/1990 | Flammer et al. |
| 4,940,976 A | 7/1990 | Gastouniotis et al. |
| 4,949,077 A | 8/1990 | Smith |
| 4,952,928 A | 8/1990 | Carroll et al. |
| 4,962,496 A | 10/1990 | Vercellotti et al. |
| 4,967,366 A | 10/1990 | Kaehler |
| 4,968,970 A | 11/1990 | LaPorte |
| 4,968,978 A | 11/1990 | Stolarczyk |
| 4,972,504 A | 11/1990 | Daniel, Jr. et al. |
| 4,973,957 A | 11/1990 | Shimizu et al. |
| 4,973,970 A | 11/1990 | Reeser |
| 4,977,612 A | 12/1990 | Wilson |
| 4,980,907 A | 12/1990 | Raith et al. |
| 4,987,536 A | 1/1991 | Humblet |
| 4,989,230 A | 1/1991 | Gillig et al. |
| 4,993,059 A | 2/1991 | Smith et al. |
| 5,007,052 A | 4/1991 | Flammer |
| 5,079,768 A | 1/1992 | Flammer |
| 5,088,032 A | 2/1992 | Bosack |
| 5,115,433 A | 5/1992 | Baran et al. |
| 5,117,422 A | 5/1992 | Hauptschein et al. |
| 5,130,987 A | 7/1992 | Flammer |
| 5,138,615 A | 8/1992 | Lamport et al. |
| 5,142,694 A | 8/1992 | Jackson et al. |
| 5,159,592 A | 10/1992 | Perkins |
| 5,170,393 A | 12/1992 | Peterson et al. |
| 5,216,502 A | 6/1993 | Katz |
| 5,221,838 A | 6/1993 | Gutman et al. |
| 5,223,844 A | 6/1993 | Mansell et al. |
| 5,231,658 A | 7/1993 | Eftechiou |
| 5,235,630 A | 8/1993 | Moody et al. |
| 5,239,294 A | 8/1993 | Flanders et al. |
| 5,239,575 A | 8/1993 | White et al. |
| 5,241,410 A | 8/1993 | Streck et al. |
| 5,243,338 A | 9/1993 | Brennan, Jr. et al. |
| 5,245,633 A | 9/1993 | Schwartz et al. |
| 5,252,967 A | 10/1993 | Brennan et al. |
| 5,253,167 A | 10/1993 | Yoshida et al. |
| 5,265,150 A | 11/1993 | Helmkamp et al. |
| 5,265,162 A | 11/1993 | Bush et al. |
| 5,266,782 A | 11/1993 | Alanara et al. |
| 5,272,747 A | 12/1993 | Meads |
| 5,276,680 A | 1/1994 | Messenger |
| 5,282,204 A | 1/1994 | Shpancer et al. |
| 5,282,250 A | 1/1994 | Dent et al. |
| 5,289,165 A | 2/1994 | Belin |
| 5,289,362 A | 2/1994 | Liebl et al. |
| 5,291,516 A | 3/1994 | Dixon et al. |
| 5,295,154 A | 3/1994 | Meier et al. |
| 5,305,370 A | 4/1994 | Kearns et al. |
| 5,309,501 A | 5/1994 | Kozik et al. |
| 5,315,645 A | 5/1994 | Matheny |
| 5,317,309 A | 5/1994 | Vercellotti et al. |
| 5,319,364 A | 6/1994 | Waraksa et al. |
| 5,319,698 A | 6/1994 | Glidewell et al. |
| 5,319,711 A | 6/1994 | Servi |
| 5,323,384 A | 6/1994 | Norwood et al. |
| 5,325,429 A | 6/1994 | Kurgan |
| 5,329,394 A | 7/1994 | Calvani et al. |
| 5,331,318 A | 7/1994 | Montgomery |
| 5,334,974 A | 8/1994 | Simms et al. |
| 5,335,265 A | 8/1994 | Cooper et al. |
| 5,343,493 A | 8/1994 | Karimullah |
| 5,345,231 A | 9/1994 | Koo et al. |
| 5,345,595 A | 9/1994 | Johnson et al. |
| 5,347,263 A | 9/1994 | Carroll et al. |
| 5,352,278 A | 10/1994 | Korver et al. |
| 5,354,974 A | 10/1994 | Eisenberg |
| 5,355,513 A | 10/1994 | Clarke et al. |
| 5,365,217 A | 11/1994 | Toner |
| 5,371,736 A | 12/1994 | Evan |
| 5,382,778 A | 1/1995 | Takahira et al. |
| 5,383,134 A | 1/1995 | Wrzesinski |

| | | | | | |
|---|---|---|---|---|---|
| 5,390,206 A | 2/1995 | Rein et al. | 5,592,491 A | 1/1997 | Dinkins |
| 5,406,619 A | 4/1995 | Akhteruzzaman et al. | 5,596,719 A | 1/1997 | Ramakrishnan et al. |
| 5,412,192 A | 5/1995 | Hoss | 5,596,722 A | 1/1997 | Rahnema |
| 5,412,654 A | 5/1995 | Perkins | 5,602,843 A | 2/1997 | Gray |
| 5,412,760 A | 5/1995 | Peitz | 5,604,414 A | 2/1997 | Milligan et al. |
| 5,416,475 A | 5/1995 | Tolbert et al. | 5,604,869 A | 2/1997 | Mincher et al. |
| 5,418,812 A | 5/1995 | Reyes et al. | 5,606,361 A | 2/1997 | Davidsohn et al. |
| 5,420,910 A | 5/1995 | Rudokas et al. | 5,608,721 A | 3/1997 | Natarajan et al. |
| 5,424,708 A | 6/1995 | Ballesty et al. | 5,608,786 A | 3/1997 | Gordon |
| 5,430,729 A | 7/1995 | Rahnema | 5,613,620 A | 3/1997 | Center et al. |
| 5,432,507 A | 7/1995 | Mussino et al. | 5,615,227 A | 3/1997 | Schumacher, Jr. et al. |
| 5,438,329 A | 8/1995 | Gastouniotis et al. | 5,617,084 A | 4/1997 | Sears |
| 5,439,414 A | 8/1995 | Jacob | 5,623,495 A | 4/1997 | Eng et al. |
| 5,440,545 A | 8/1995 | Buchholz et al. | 5,625,410 A | 4/1997 | Washino et al. |
| 5,442,553 A | 8/1995 | Parrillo | 5,628,050 A | 5/1997 | McGraw et al. |
| 5,442,633 A | 8/1995 | Perkins et al. | 5,629,687 A | 5/1997 | Sutton et al. |
| 5,445,287 A | 8/1995 | Center et al. | 5,629,875 A | 5/1997 | Adair, Jr. |
| 5,445,347 A | 8/1995 | Ng | 5,630,209 A | 5/1997 | Wizgall et al. |
| 5,451,929 A | 9/1995 | Adelman et al. | 5,631,554 A | 5/1997 | Briese et al. |
| 5,451,938 A | 9/1995 | Brennan, Jr. | 5,636,216 A | 6/1997 | Fox et al. |
| 5,452,344 A | 9/1995 | Larson | 5,640,002 A | 6/1997 | Ruppert et al. |
| 5,454,024 A | 9/1995 | Lebowitz | 5,644,294 A | 7/1997 | Ness |
| 5,455,569 A | 10/1995 | Sherman et al. | 5,657,389 A | 8/1997 | Houvener |
| 5,465,401 A | 11/1995 | Thompson | 5,659,300 A | 8/1997 | Dresselhuys et al. |
| 5,467,074 A | 11/1995 | Pedtke | 5,659,303 A | 8/1997 | Adair, Jr. |
| 5,467,082 A | 11/1995 | Sanderson | 5,668,876 A | 9/1997 | Falk et al. |
| 5,467,345 A | 11/1995 | Cutler, Jr. et al. | 5,673,252 A | 9/1997 | Johnson et al. |
| 5,468,948 A | 11/1995 | Koenck et al. | 5,673,304 A | 9/1997 | Connor et al. |
| 5,471,201 A | 11/1995 | Cerami et al. | 5,673,305 A | 9/1997 | Ross |
| 5,473,322 A | 12/1995 | Carney | 5,682,139 A | 10/1997 | Pradeep et al. |
| 5,475,689 A | 12/1995 | Kay et al. | 5,682,476 A | 10/1997 | Tapperson et al. |
| 5,479,400 A | 12/1995 | Dilworth et al. | 5,689,229 A | 11/1997 | Chaco et al. |
| 5,481,259 A | 1/1996 | Bane | 5,696,695 A | 12/1997 | Ehlers et al. |
| 5,481,532 A | 1/1996 | Hassan et al. | 5,699,328 A | 12/1997 | Ishizaki et al. |
| 5,484,997 A | 1/1996 | Haynes | 5,701,002 A | 12/1997 | Oishi et al. |
| 5,488,608 A | 1/1996 | Flammer, III | 5,702,059 A | 12/1997 | Chu et al. |
| 5,493,273 A | 2/1996 | Smurlo et al. | 5,704,046 A | 12/1997 | Hogan |
| 5,493,287 A | 2/1996 | Bane | 5,704,517 A | 1/1998 | Lancaster, Jr. |
| 5,502,726 A | 3/1996 | Fischer | 5,706,976 A | 1/1998 | Purkey |
| 5,504,746 A | 4/1996 | Meier | 5,708,223 A | 1/1998 | Wyss |
| 5,506,837 A | 4/1996 | Sollner et al. | 5,708,655 A | 1/1998 | Toth et al. |
| 5,509,073 A | 4/1996 | Monnin | 5,712,619 A | 1/1998 | Simkin |
| 5,513,244 A | 4/1996 | Joao et al. | 5,712,980 A | 1/1998 | Beeler et al. |
| 5,515,419 A | 5/1996 | Sheffer | 5,714,931 A | 2/1998 | Petite et al. |
| 5,517,188 A | 5/1996 | Carroll et al. | 5,717,718 A | 2/1998 | Rowsell et al. |
| 5,522,089 A | 5/1996 | Kikinis et al. | 5,726,534 A | 3/1998 | Seo |
| 5,528,215 A | 6/1996 | Siu et al. | 5,726,544 A | 3/1998 | Lee |
| 5,528,507 A | 6/1996 | McNamara et al. | 5,726,644 A | 3/1998 | Jednacz et al. |
| 5,539,825 A | 7/1996 | Akiyama et al. | 5,726,984 A | 3/1998 | Kubler et al. |
| 5,541,938 A | 7/1996 | Di Zenzo et al. | 5,732,074 A | 3/1998 | Spaur et al. |
| 5,542,100 A | 7/1996 | Hatakeyama | 5,732,078 A | 3/1998 | Arango |
| 5,544,784 A | 8/1996 | Malaspina | 5,736,965 A | 4/1998 | Mosebrook et al. |
| 5,548,632 A | 8/1996 | Walsh et al. | 5,737,318 A | 4/1998 | Melnik |
| 5,550,358 A | 8/1996 | Tait et al. | 5,740,232 A | 4/1998 | Pailles et al. |
| 5,550,359 A | 8/1996 | Bennett | 5,740,366 A | 4/1998 | Mahany et al. |
| 5,550,535 A | 8/1996 | Park | 5,742,509 A | 4/1998 | Goldberg et al. |
| 5,553,094 A | 9/1996 | Johnson et al. | 5,745,849 A | 4/1998 | Britton |
| 5,555,258 A | 9/1996 | Snelling et al. | 5,748,619 A | 5/1998 | Meier |
| 5,555,286 A | 9/1996 | Tendler | 5,754,111 A | 5/1998 | Garcia |
| 5,557,320 A | 9/1996 | Krebs | 5,754,227 A | 5/1998 | Fukuoka |
| 5,557,748 A | 9/1996 | Norris | 5,757,783 A | 5/1998 | Eng et al. |
| 5,562,537 A | 10/1996 | Zver et al. | 5,757,788 A | 5/1998 | Tatsumi et al. |
| 5,565,857 A | 10/1996 | Lee | 5,760,742 A | 6/1998 | Branch et al. |
| 5,568,535 A | 10/1996 | Sheffer et al. | 5,761,083 A | 6/1998 | Brown, Jr. et al. |
| 5,570,084 A | 10/1996 | Ritter et al. | 5,764,742 A | 6/1998 | Howard et al. |
| 5,572,528 A | 11/1996 | Shuen | 5,767,791 A | 6/1998 | Stoop et al. |
| 5,573,181 A | 11/1996 | Ahmed | 5,771,274 A | 6/1998 | Harris |
| 5,574,111 A | 11/1996 | Brichta et al. | 5,774,052 A | 6/1998 | Hamm et al. |
| 5,583,914 A | 12/1996 | Chang et al. | 5,781,143 A | 7/1998 | Rossin |
| 5,589,878 A | 12/1996 | Cortjens et al. | 5,790,644 A | 8/1998 | Kikinis |
| 5,590,038 A | 12/1996 | Pitroda | 5,790,662 A | 8/1998 | Valerij et al. |

| Patent No. | Date | Inventor |
|---|---|---|
| 5,790,938 A | 8/1998 | Talarmo |
| 5,796,727 A | 8/1998 | Harrison et al. |
| 5,798,964 A | 8/1998 | Shimizu et al. |
| 5,801,643 A | 9/1998 | Williams et al. |
| 5,812,531 A | 9/1998 | Cheung et al. |
| 5,815,505 A | 9/1998 | Mills |
| 5,818,822 A | 10/1998 | Thomas et al. |
| 5,822,273 A | 10/1998 | Bary et al. |
| 5,822,309 A | 10/1998 | Ayanoglu et al. |
| 5,822,544 A | 10/1998 | Chaco et al. |
| 5,825,772 A | 10/1998 | Dobbins et al. |
| 5,826,195 A | 10/1998 | Westerlage et al. |
| 5,828,044 A | 10/1998 | Jun et al. |
| 5,832,057 A | 11/1998 | Furman |
| 5,838,223 A | 11/1998 | Gallant et al. |
| 5,838,237 A | 11/1998 | Revell et al. |
| 5,838,812 A | 11/1998 | Pare, Jr. et al. |
| 5,841,118 A | 11/1998 | East et al. |
| 5,841,764 A | 11/1998 | Roderique et al. |
| 5,842,976 A | 12/1998 | Williamson |
| 5,844,808 A | 12/1998 | Konsmo et al. |
| 5,845,230 A | 12/1998 | Lamberson |
| 5,848,054 A | 12/1998 | Mosebrook et al. |
| 5,852,658 A | 12/1998 | Knight et al. |
| 5,854,994 A | 12/1998 | Canada et al. |
| 5,856,974 A | 1/1999 | Gervais et al. |
| 5,862,201 A | 1/1999 | Sands |
| 5,864,772 A | 1/1999 | Alvarado et al. |
| 5,870,686 A | 2/1999 | Monson |
| 5,872,773 A | 2/1999 | Katzela et al. |
| 5,873,043 A | 2/1999 | Comer |
| 5,874,903 A | 2/1999 | Shuey et al. |
| 5,875,185 A | 2/1999 | Wang et al. |
| 5,880,677 A | 3/1999 | Lestician |
| 5,884,184 A | 3/1999 | Sheffer |
| 5,884,271 A | 3/1999 | Pitroda |
| 5,886,333 A | 3/1999 | Miyake |
| 5,889,468 A | 3/1999 | Banga |
| 5,892,690 A | 4/1999 | Boatman et al. |
| 5,892,924 A | 4/1999 | Lyon et al. |
| 5,896,097 A | 4/1999 | Cardozo |
| 5,898,369 A | 4/1999 | Godwin |
| 5,898,733 A | 4/1999 | Satyanarayana |
| 5,905,438 A | 5/1999 | Weiss et al. |
| 5,905,442 A | 5/1999 | Mosebrook et al. |
| 5,907,291 A | 5/1999 | Chen et al. |
| 5,907,491 A | 5/1999 | Canada et al. |
| 5,907,540 A | 5/1999 | Hayashi |
| 5,907,807 A | 5/1999 | Chavez, Jr. et al. |
| 5,909,429 A | 6/1999 | Satyanarayana et al. |
| 5,914,673 A | 6/1999 | Jennings et al. |
| 5,917,405 A | 6/1999 | Joao |
| 5,917,629 A | 6/1999 | Hortensius et al. |
| 5,923,269 A | 7/1999 | Shuey et al. |
| 5,926,101 A | 7/1999 | Dasgupta |
| 5,926,103 A | 7/1999 | Petite |
| 5,926,529 A | 7/1999 | Hache et al. |
| 5,926,531 A | 7/1999 | Petite |
| 5,933,073 A | 8/1999 | Shuey |
| 5,940,771 A | 8/1999 | Gollnick et al. |
| 5,941,363 A | 8/1999 | Partyka et al. |
| 5,941,955 A | 8/1999 | Wilby et al. |
| 5,948,040 A | 9/1999 | DeLorme et al. |
| 5,949,799 A | 9/1999 | Grivna et al. |
| 5,953,319 A | 9/1999 | Dutta et al. |
| 5,953,371 A | 9/1999 | Rowsell et al. |
| 5,953,507 A | 9/1999 | Cheung et al. |
| 5,957,718 A | 9/1999 | Cheng et al. |
| 5,960,074 A | 9/1999 | Clark |
| 5,963,146 A | 10/1999 | Johnson et al. |
| 5,963,452 A | 10/1999 | Etoh et al. |
| 5,966,658 A | 10/1999 | Kennedy, III et al. |
| 5,969,608 A | 10/1999 | Sojdehei et al. |
| 5,973,756 A | 10/1999 | Erlin |
| 5,974,236 A | 10/1999 | Sherman |
| 5,978,364 A | 11/1999 | Melnik |
| 5,978,578 A | 11/1999 | Azarya et al. |
| 5,987,011 A | 11/1999 | Toh |
| 5,987,421 A | 11/1999 | Chuang |
| 5,991,625 A | 11/1999 | Vanderpool |
| 5,991,639 A | 11/1999 | Rautiola et al. |
| 5,995,022 A | 11/1999 | Plis et al. |
| 5,995,592 A | 11/1999 | Shirai et al. |
| 5,995,593 A | 11/1999 | Cho |
| 5,997,170 A | 12/1999 | Brodbeck |
| 5,999,094 A | 12/1999 | Nilssen |
| 6,005,759 A | 12/1999 | Hart et al. |
| 6,005,963 A | 12/1999 | Bolle et al. |
| 6,018,659 A | 1/2000 | Ayyagari et al. |
| 6,021,664 A | 2/2000 | Granato et al. |
| 6,023,223 A | 2/2000 | Baxter, Jr. |
| 6,028,522 A | 2/2000 | Petite |
| 6,028,857 A | 2/2000 | Poor |
| 6,031,455 A | 2/2000 | Grube et al. |
| 6,032,197 A | 2/2000 | Birdwell et al. |
| 6,035,213 A | 3/2000 | Tokuda et al. |
| 6,035,266 A | 3/2000 | Williams et al. |
| 6,036,086 A | 3/2000 | Sizer, II et al. |
| 6,038,491 A | 3/2000 | McGarry et al. |
| 6,044,062 A | 3/2000 | Brownrigg et al. |
| 6,054,920 A | 4/2000 | Smith et al. |
| 6,055,561 A | 4/2000 | Feldman et al. |
| 6,060,994 A | 5/2000 | Chen |
| 6,064,318 A | 5/2000 | Kirchner et al. |
| 6,067,017 A | 5/2000 | Stewart et al. |
| 6,067,030 A | 5/2000 | Burnett et al. |
| 6,069,886 A | 5/2000 | Ayerst et al. |
| 6,073,169 A | 6/2000 | Shuey et al. |
| 6,073,840 A | 6/2000 | Marion |
| 6,075,451 A | 6/2000 | Lebowitz et al. |
| 6,078,251 A | 6/2000 | Landt et al. |
| 6,084,867 A | 7/2000 | Meier |
| 6,094,622 A | 7/2000 | Hubbard et al. |
| 6,097,703 A | 8/2000 | Larsen et al. |
| 6,100,817 A | 8/2000 | Mason, Jr. et al. |
| 6,101,427 A | 8/2000 | Yang |
| 6,101,455 A | 8/2000 | Davis |
| 6,112,983 A | 9/2000 | D'Anniballe et al. |
| 6,115,393 A | 9/2000 | Engel et al. |
| 6,115,580 A | 9/2000 | Chuprun et al. |
| 6,119,076 A | 9/2000 | Williams et al. |
| 6,121,885 A | 9/2000 | Masone et al. |
| 6,122,759 A | 9/2000 | Ayanoglu et al. |
| 6,124,806 A | 9/2000 | Cunningham et al. |
| 6,127,917 A | 10/2000 | Tuttle |
| 6,128,551 A | 10/2000 | Davis et al. |
| 6,130,622 A | 10/2000 | Hussey et al. |
| 6,137,423 A | 10/2000 | Glorioso et al. |
| 6,140,975 A | 10/2000 | Cohen |
| 6,141,347 A | 10/2000 | Shaughnessy et al. |
| 6,150,936 A | 11/2000 | Addy |
| 6,150,955 A | 11/2000 | Tracy et al. |
| 6,157,464 A | 12/2000 | Bloomfield et al. |
| 6,157,824 A | 12/2000 | Bailey |
| 6,172,616 B1 | 1/2001 | Johnson et al. |
| 6,174,205 B1 | 1/2001 | Madsen et al. |
| 6,175,922 B1 | 1/2001 | Wang |
| 6,177,883 B1 | 1/2001 | Jennetti et al. |
| 6,181,255 B1 | 1/2001 | Crimmins et al. |
| 6,181,284 B1 | 1/2001 | Madsen et al. |
| 6,181,981 B1 | 1/2001 | Varga et al. |
| 6,188,354 B1 | 2/2001 | Soliman et al. |

| | | | | | | |
|---|---|---|---|---|---|---|
| 6,188,675 | B1 | 2/2001 | Casper et al. | 6,462,672 B1 | 10/2002 | Besson |
| 6,192,282 | B1 | 2/2001 | Smith et al. | 6,477,558 B1 | 11/2002 | Irving et al. |
| 6,192,390 | B1 | 2/2001 | Berger et al. | 6,483,290 B1 | 11/2002 | Hemminger et al. |
| 6,195,018 | B1 | 2/2001 | Ragle et al. | 6,484,939 B1 | 11/2002 | Blaeuer |
| 6,198,390 | B1 | 3/2001 | Schlager et al. | 6,489,884 B1 | 12/2002 | Lamberson et al. |
| 6,199,068 | B1 | 3/2001 | Carpenter | 6,491,828 B1 | 12/2002 | Sivavec et al. |
| 6,201,962 | B1 | 3/2001 | Sturniolo et al. | 6,492,910 B1 | 12/2002 | Ragle et al. |
| 6,208,247 | B1 | 3/2001 | Agre et al. | 6,504,357 B1 | 1/2003 | Hemminger et al. |
| 6,208,266 | B1 | 3/2001 | Lyons et al. | 6,504,834 B1 | 1/2003 | Fifield |
| 6,212,175 | B1 | 4/2001 | Harsch | 6,507,794 B1 | 1/2003 | Hubbard et al. |
| 6,218,953 | B1 | 4/2001 | Petite | 6,509,722 B2 | 1/2003 | Lopata |
| 6,218,958 | B1 | 4/2001 | Eichstaedt | 6,513,060 B1 | 1/2003 | Nixon et al. |
| 6,218,983 | B1 | 4/2001 | Kerry et al. | 6,515,586 B1 | 2/2003 | Wymore |
| 6,233,327 | B1 | 5/2001 | Petite | 6,519,568 B1 | 2/2003 | Harvey et al. |
| 6,234,111 | B1 | 5/2001 | Ulman et al. | 6,542,076 B1 | 4/2003 | Joao |
| 6,236,332 | B1 | 5/2001 | Conkright et al. | 6,542,077 B2 | 4/2003 | Joao |
| 6,243,010 | B1 | 6/2001 | Addy et al. | 6,543,690 B2 | 4/2003 | Leydier et al. |
| 6,246,886 | B1 | 6/2001 | Oliva | 6,560,223 B1 | 5/2003 | Egan et al. |
| 6,249,516 | B1 | 6/2001 | Brownrigg et al. | 6,574,234 B1 | 6/2003 | Myer et al. |
| 6,259,369 | B1 | 7/2001 | Monico | 6,574,603 B1 | 6/2003 | Dickson et al. |
| 6,271,752 | B1 | 8/2001 | Vaios | 6,584,080 B1 | 6/2003 | Ganz et al. |
| 6,275,707 | B1 | 8/2001 | Reed et al. | 6,600,726 B1 | 7/2003 | Nevo et al. |
| 6,286,050 | B1 | 9/2001 | Pullen et al. | 6,608,551 B1 | 8/2003 | Anderson et al. |
| 6,286,756 | B1 | 9/2001 | Stinson et al. | 6,618,578 B1 | 9/2003 | Petite |
| 6,288,634 | B1 | 9/2001 | Weiss et al. | 6,618,709 B1 | 9/2003 | Sneeringer |
| 6,288,641 | B1 | 9/2001 | Casais | 6,628,764 B1 | 9/2003 | Petite |
| 6,295,291 | B1 | 9/2001 | Larkins | 6,628,965 B1 | 9/2003 | LaRosa et al. |
| 6,301,514 | B1 | 10/2001 | Canada et al. | 6,653,945 B2 | 11/2003 | Johnson et al. |
| 6,304,556 | B1 | 10/2001 | Haas | 6,665,278 B2 | 12/2003 | Grayson |
| 6,305,602 | B1 | 10/2001 | Grabowski et al. | 6,671,586 B2 | 12/2003 | Davis et al. |
| 6,307,843 | B1 | 10/2001 | Okanoue | 6,674,403 B2 | 1/2004 | Gray et al. |
| 6,308,111 | B1 | 10/2001 | Koga | 6,678,255 B1 | 1/2004 | Kuriyan |
| 6,311,167 | B1 | 10/2001 | Davis et al. | 6,678,285 B1 | 1/2004 | Garg |
| 6,314,169 | B1 | 11/2001 | Schelberg, Jr. et al. | 6,691,173 B2 | 2/2004 | Morris et al. |
| 6,317,029 | B1 | 11/2001 | Fleeter | 6,731,201 B1 | 5/2004 | Bailey et al. |
| 6,329,902 | B1 | 12/2001 | Lee et al. | 6,735,630 B1 | 5/2004 | Gelvin et al. |
| 6,334,117 | B1 | 12/2001 | Covert et al. | 6,747,557 B1 | 6/2004 | Petite et al. |
| 6,351,223 | B1 | 2/2002 | DeWeerd et al. | 6,771,981 B1 | 8/2004 | Zalewski et al. |
| 6,356,205 | B1 | 3/2002 | Salvo et al. | 6,775,258 B1 | 8/2004 | van Valkenburg et al. |
| 6,357,034 | B1 | 3/2002 | Muller et al. | 6,804,532 B1 | 10/2004 | Moon et al. |
| 6,362,745 | B1 | 3/2002 | Davis | 6,826,607 B1 | 11/2004 | Gelvin et al. |
| 6,363,057 | B1 | 3/2002 | Ardalan et al. | 6,832,251 B1 | 12/2004 | Gelvin et al. |
| 6,366,217 | B1 | 4/2002 | Cunningham et al. | 6,842,430 B1 | 1/2005 | Melnik |
| 6,366,622 | B1 | 4/2002 | Brown et al. | 6,859,831 B1 | 2/2005 | Gelvin et al. |
| 6,369,769 | B1 | 4/2002 | Nap et al. | 6,891,838 B1 | 5/2005 | Petite et al. |
| 6,370,489 | B1 | 4/2002 | Williams et al. | 6,900,737 B1 | 5/2005 | Ardalan et al. |
| 6,373,399 | B1 | 4/2002 | Johnson et al. | 6,914,533 B2 | 7/2005 | Petite |
| 6,380,851 | B1 | 4/2002 | Gilbert et al. | 6,914,893 B2 | 7/2005 | Petite |
| 6,384,722 | B1 | 5/2002 | Williams | 6,922,558 B2 | 7/2005 | Delp et al. |
| 6,392,692 | B1 | 5/2002 | Monroe | 6,959,550 B2 | 11/2005 | Freeman et al. |
| 6,393,341 | B1 | 5/2002 | Lawrence et al. | 6,970,434 B1 | 11/2005 | Mahany et al. |
| 6,393,381 | B1 | 5/2002 | Williams et al. | 7,020,701 B1 | 3/2006 | Gelvin et al. |
| 6,393,382 | B1 | 5/2002 | Williams et al. | 7,027,416 B1 | 4/2006 | Kriz |
| 6,400,819 | B1 | 6/2002 | Nakano et al. | 7,054,271 B2 | 5/2006 | Brownrigg et al. |
| 6,401,081 | B1 | 6/2002 | Montgomery et al. | 7,064,679 B2 | 6/2006 | Ehrke et al. |
| 6,405,018 | B1 | 6/2002 | Reudink et al. | 7,103,511 B2 | 9/2006 | Petite |
| 6,411,889 | B1 | 6/2002 | Mizunuma et al. | 7,137,550 B1 | 11/2006 | Petite |
| 6,415,245 | B2 | 7/2002 | Williams et al. | 7,349,682 B1 | 3/2008 | Bennett, III et al. |
| 6,421,354 | B1 | 7/2002 | Godlewski | 7,468,661 B2 | 12/2008 | Petite et al. |
| 6,421,731 | B1 | 7/2002 | Ciotti, Jr. et al. | 7,484,008 B1 | 1/2009 | Gelvin et al. |
| 6,422,464 | B1 | 7/2002 | Terranova | 2001/0002210 A1 | 5/2001 | Petite |
| 6,424,270 | B1 | 7/2002 | Ali | 2001/0003479 A1 | 6/2001 | Fujiwara |
| 6,424,931 | B1 | 7/2002 | Sigmar et al. | 2001/0021646 A1 | 9/2001 | Antonucci et al. |
| 6,430,268 | B1 | 8/2002 | Petite | 2001/0024163 A1 | 9/2001 | Petite |
| 6,431,439 | B1 | 8/2002 | Suer et al. | 2001/0034223 A1 | 10/2001 | Rieser et al. |
| 6,437,692 | B1 | 8/2002 | Petite et al. | 2001/0038343 A1 | 11/2001 | Meyer et al. |
| 6,438,575 | B1 | 8/2002 | Khan et al. | 2002/0002444 A1 | 1/2002 | Williams et al. |
| 6,445,291 | B2 | 9/2002 | Addy et al. | 2002/0012323 A1 | 1/2002 | Petite et al. |
| 6,456,960 | B1 | 9/2002 | Williams et al. | 2002/0013679 A1 | 1/2002 | Petite |
| 6,457,038 | B1 | 9/2002 | Defosse | 2002/0019725 A1 | 2/2002 | Petite |
| 6,462,644 | B1 | 10/2002 | Howell et al. | 2002/0027504 A1 | 3/2002 | Davis et al. |

| | | |
|---|---|---|
| 2002/0031101 A1 | 3/2002 | Petite et al. |
| 2002/0032746 A1 | 3/2002 | Lazaridis |
| 2002/0061031 A1 | 5/2002 | Sugar et al. |
| 2002/0072348 A1 | 6/2002 | Wheeler et al. |
| 2002/0089428 A1 | 7/2002 | Walden et al. |
| 2002/0095399 A1 | 7/2002 | Devine et al. |
| 2002/0098858 A1 | 7/2002 | Struhsaker |
| 2002/0109607 A1 | 8/2002 | Cumeralto et al. |
| 2002/0136233 A1 | 9/2002 | Chen et al. |
| 2002/0158774 A1 | 10/2002 | Johnson et al. |
| 2002/0163442 A1 | 11/2002 | Fischer |
| 2002/0169643 A1 | 11/2002 | Petite et al. |
| 2002/0193144 A1 | 12/2002 | Belski et al. |
| 2003/0001754 A1 | 1/2003 | Johnson et al. |
| 2003/0028632 A1 | 2/2003 | Davis |
| 2003/0030926 A1 | 2/2003 | Aguren et al. |
| 2003/0034900 A1 | 2/2003 | Han |
| 2003/0036822 A1 | 2/2003 | Davis et al. |
| 2003/0046377 A1 | 3/2003 | Daum et al. |
| 2003/0058818 A1 | 3/2003 | Wilkes et al. |
| 2003/0069002 A1 | 4/2003 | Hunter et al. |
| 2003/0073406 A1 | 4/2003 | Benjamin et al. |
| 2003/0093484 A1 | 5/2003 | Petite |
| 2003/0133473 A1 | 7/2003 | Manis et al. |
| 2003/0169710 A1 | 9/2003 | Fan et al. |
| 2003/0185204 A1 | 10/2003 | Murdock |
| 2003/0210638 A1 | 11/2003 | Yoo et al. |
| 2004/0047324 A1 | 3/2004 | Diener |
| 2004/0053639 A1 | 3/2004 | Petite et al. |
| 2004/0131125 A1 | 7/2004 | Sanderford et al. |
| 2004/0183687 A1 | 9/2004 | Petite et al. |
| 2004/0228330 A1 | 11/2004 | Kubler et al. |
| 2005/0190055 A1 | 9/2005 | Petite |
| 2005/0195768 A1 | 9/2005 | Petite |
| 2005/0195775 A1 | 9/2005 | Petite et al. |
| 2005/0201397 A1 | 9/2005 | Petite |
| 2005/0243867 A1 | 11/2005 | Petite |
| 2006/0095876 A1 | 5/2006 | Chandra et al. |

FOREIGN PATENT DOCUMENTS

| | | |
|---|---|---|
| EP | 0 749 259 A2 | 12/1996 |
| EP | 0 749 260 A2 | 12/1996 |
| EP | 0 766 489 A2 | 4/1997 |
| EP | 0 768 777 A2 | 4/1997 |
| EP | 0 812 502 B1 | 12/1997 |
| EP | 0825577 A1 | 2/1998 |
| EP | 0 999 717 A2 | 5/2000 |
| EP | 1096454 A2 | 5/2001 |
| FR | 2817110 A1 | 5/2002 |
| GB | 2229302 A | 9/1990 |
| GB | 2247761 A | 3/1992 |
| GB | 2262683 A | 6/1993 |
| GB | 2297663 A | 8/1996 |
| GB | 2310779 A | 9/1997 |
| GB | 2326002 A | 12/1998 |
| GB | 2336272 A | 10/1999 |
| GB | 2352004 A | 1/2001 |
| GB | 2352590 A | 1/2001 |
| JP | 60261288 A | 12/1985 |
| JP | 01255100 A | 10/1989 |
| JP | 11353573 A | 12/1999 |
| JP | 2000113590 A | 4/2000 |
| JP | 2001063425 A | 3/2001 |
| JP | 2001088401 A | 4/2001 |
| JP | 2001309069 A | 11/2001 |
| JP | 2001319284 A | 11/2001 |
| JP | 2001357483 A | 12/2001 |
| JP | 2002007672 A | 1/2002 |
| JP | 2002007826 A | 1/2002 |
| JP | 2002085354 A | 3/2002 |
| JP | 2002171354 A | 6/2002 |
| KR | 2001025431 A | 4/2001 |
| WO | WO 90/13197 | 11/1990 |
| WO | WO 95/12942 | 5/1995 |
| WO | WO 95/24177 | 9/1995 |
| WO | WO 95/34177 | 12/1995 |
| WO | WO 96/10307 | 4/1996 |
| WO | WO 98/00056 | 1/1998 |
| WO | WO 98/37528 | 8/1998 |
| WO | WO 99/13426 | 3/1999 |
| WO | WO 00/23956 | 4/2000 |
| WO | WO 01/15114 | 3/2001 |
| WO | WO 01/24109 | 4/2001 |
| WO | WO 02/08725 | 1/2002 |
| WO | WO 02/08866 | 1/2002 |
| WO | WO 02/052521 | 7/2002 |
| WO | WO 03/007264 | 1/2003 |
| WO | WO 03/021877 | 3/2003 |
| WO | WO 04/002014 | 12/2003 |

OTHER PUBLICATIONS

Abbott et al., *Wireless Product Applications for Utilities, Electric Power Research Institute*, Feb. 1996, pp. 1–137.

Allen–Bradley Interfacing, Author: unknown, *Engineering Report*, No. 90–023, Jul. 21, 1999, pp. 1–11.

American National Standards Institute, Inc., *ANSI C12.18–1996: Protocol Specification for ANSI Type 2 Optical Port, National Electrical Manufactures Association*, 1996.

American National Standards Institute, Inc. *ANSI C12.19–1997: Utility Industry End Device Data Tables, National Electrical Manufactures Association*, 1997.

Amir, *The Ricochet System Architecture*, available at http://www.lariate.org/B erkeley/node2.html, on May 1996, pp. 1–5.

*AN/TSQ–129 Position Location Reporting System (PLRS)*, Author: unknown, available at http://www.fas.org/man/dod–101/sys/land/plrs.htm on Feb. 22, 2010, pp. 1–3.

Asada et al., *Wireless Integrated Network Sensors: Low Power Systems on a Chip, UCLA*, 1998, pp. 1–16.

*Barrington Interface*, Author: unknown, *Engineering Report*, No. 90–013, Revised: Oct. 1994, pp. 1.

Beech et al., *AX.25 Link Access Protocol for Amateur Packet Radio, Version 2.2, American Relay & Tucson Amateur Packet Radio Corporation*, Jul. 1993, Revised Jul. 1998, pp. 1–143.

Brain, *How Motes Work: Ad hoc Networks*, available at http://computer.howstuffworks.com/mote3.htm on Feb. 25, 2010, pp. 1–3.

Brain, *How Motes Work*, available at http://computer.howstuffworks.com/mote.htm, on Feb. 25, 2010, pp. 1–2.

Brain, *How Motes Work: The Basic Idea*, available at http://computer.howstuffworks.com/mote1.htm, on Feb. 25, 2010, pp. 1–2.

Brain, *How Motes Work: Typical Applications*, available at http://computer.howstuffworks.com/mote2.htm, on Feb. 25, 2010, pp. 1–2.

Brain, *How Motes Work: A Typical Mote*, available at http://computer.howstuffworks.com/mote4.htm, on Feb. 25, 2010, pp. 1–2.

Bristol Babcock Interfacing, Author: unknown, *Engineering Report*, No. 95–001, Revised: Apr. 17, 1996, pp. 1–4.

Bult et al., *A Distributed, Wireless MEMS Technology for Condition Based Maintenance*, Publisher: unknown; Nov. 1997, pp. 1–8.

Bult et al., *Low Power Systems for Wireless Microsensors, ILSPEAD*, 1996, pp. 1–5.

Carlisle, *Edison's NetComm Project, Proceedings of the 33rd Annual Rural Electric Power Conference, IEEE*, Apr. 1989, pp. B5/1–B5/4.

Clement, SCADA System Using Packet Radios Helps to Lower Cincinnati's Telemetry Costs, *Water/ Engineering & Management*, Aug. 1996, pp. 18–20.

*Clever Solutions—Metricom offers wireless data networks—includes related articles on Metricom's technology and the SONeTech company—Company Profile*, available at http://findarticles.com/p/articles/mi_m0REL/is_n11_v93/ai_147 70465/?tag=content;col1, on Nov. 22, 1993 (3 pages).

Corcoran et al., *CEBus Network Access via the World–Wide–Web, IEEE*, 1996.

Deering et al., *Internet Protocol, Version 6 (IPv6) Specification*, RFC 2460, *The Internet Security*, Dec. 1998 (40 pages).

*DSC–3500 Meeting the Control and Conservation Challenge, Johnson Controls*, 1984, pp. 1–6.

*Enhanced Position Location Reporting System (EPLRS)*, Author: unknown, available at http://www.globalsecurity.org/military/systems/ground/eplrs.htm on Feb. 22, 2010, pp. 1–3.

*ESTeem Engineering Report, Johnson Controls Interface No. 91–102*, Author: unknown, Publisher: unknown, Nov. 1994.

*ESTeem Model 96F*, Author: unknown, *ESTeem Radios*; Sep. 6, 1996 (2 pages).

*Foxboro Interfacing*, Author: unknown, *Engineering Report*, No. 91–023, Revised: Jun. 19, 1996, pp. 1–5.

*GE Fanuc Interfacing*, Author unknown, *Engineering Report*, No. 91–010, Revised: Apr. 11, 1996, pp. 1–8.

*General PLC/RTU Interfacing*; Author: unknown, *Engineering Report*, No. 92–010, Revised: Jun. 18, 1996, pp. 1–5.

Goldman et al., *Impact of Information and Communications Technologies on Residential Customer Energy Services*, Paper, *Berkeley: UCLA*, Oct. 196, pp. 1–89.

Grady et al., *Telemetry Options for Small Water Systems*, Special Report SR14–1999, Publisher: unknown, Sep. 1999, pp. 1–23.

Haartsen, *Bluetooth—The Universal Radio Interface for Ad Hoc, Wireless Connectivity, Ericsson Review*, No. 3, 1998, pp. 110–117.

Holtsville et al., *Symbol Technologies, Telxon and Aironet Commit to Future Interoperability of Their Wireless Local Area Networks Based on the IEEE 802.11 Specification, Business Wire*, Jun. 24, 1996, available at http://www.thefreelibrary.com m/_/print/PrintArticle.aspx?id=18414624, pp. 1–3.

Hsu et al., *Wireless Communications for Smart Dust, Berkeley: UCLA*, Jan. 30, 1998, pp. 1–20.

Humpal, *Extended Timers for Fort Riley*, Publisher: unknown; Mar. 1993.

Humpal, *Modified Download Files for Fort Riley*, Publisher: unknown; Apr. 1994.

*IIS—Contract Detail, Project Name: Ft. Riley Radio Expansion*, Author: unknown, *Johnson Controls*, Sep. 1998.

*Industrial Communicatons*, Author: unknown, available at http://web.archive.org/web/19990222162354/www.metricom.com/industrial/ on May 10, 2010, pp. 1–3.

*Information Technology—Telecommunications and Information Exchange Between Systems—Local and Metropolitan Area Networks—Specific Requirements—Part II: Wireless LAN Medium Access Control (MAC) and Physical Layer (PHY) Specifications*, author: unknown, *IEEE*, Std. 802.11–1997, 1997, pp. 1–445.

Information Sciences Institute (UCLA), *Internet Protocol (IPv4), Defense Advanced Research Projects Agency*, Sep. 1981.

*JC/83RF System: Multiple Facility Management by Radio Network, Johnson Controls*, Publication No. 2161, 1983, pp. 1–4.

*Johnson Controls Interface*, Author: unknown, *Engineering Report*, No. 91–012, Revised: Nov. 1994, pp. 1–14.

Lacoss, *Distributed Sensor Networks*, Final Report, *Lincoln Laboratory at Massachusetts Institute of Technology*, Sep. 30, 1986, pp. 1–225.

Leiner et al., *Goals and Challenges of the DARPA GloMo Program, IEEE Personal Communications*, Dec. 1996, pp. 34–43.

*M100 Series Motor Actuator*, Author: unknown, *Johnson Controls, Inc.*, Apr. 1993, pp. 1–20.

*M100C Series Actuator with Digital Control Signal Input and R81CAA–2 Interface Board*, Installation Bulletin, *Johnson Controls*, 2000, pp. 1–12.

Mak et al., *Design Considerations for Implementation of Large Scale Automatic Meter Reading Systems, IEEE Transactions of Power Delivery*, vol. 10, No. 1, Jan. 1995, pp. 97–103.

Maltz et al., *Experiences Designing and Building a Multi–Hop Wireless Ad hoc Network Testbed*, Publisher: unknown; Mar. 5, 1999, pp. 1–20.

*Man–Portable Networked Sensor System (1997–)*, Author: unknown, available at http://www.spawar.navy.mil/depts/d30/d37/d371/mpnss/mpnss.html on May 20, 2010, pp. 1–4.

*March of the Motes*, Author: unknown, *New Scientist*, vol. 179, issue 2409, Aug. 23, 2003, pp. 26.

*Metasys Compatible Products*, Author: unknown; *Johnson Controls, Inc.*, 1997 (9 pages).

*Metasys Extended System Architecture*, vol. II, Author: unknown, Publisher: unknown, Sep. 1999.

*Metasys N2 System Protocol Specification for Vendors*, Author: unknown, Publisher: unknown, Jun. 1996.

*Modicon Interfacing*, Author: unknown, *Engineering Report*, No. 90–022, Revised: Apr. 12, 1996, pp. 1–9.

*Moore Products—Hart Protocol Interfacing*, Author: unknown, *Engineering Report*, No. 94–007, Revised: Mar. 1, 1996, pp. 1–3.

Moorman, *Packet Radio Used in a Cost–Effective Automated Weather Meso–Net*, available at http://www.wrh.noaa.gov/wrh/96TAs/TA9631/ta96–31.html, Dec. 3, 1996 (5 pages).

Network Working Group, *Internet Protocol (IPv6), Internet Engineering Task Force*, 1998.

*Omron Interfacing*, Author: unknown, *Engineering Report*, No. 95–003, Revised: Apr. 17, 1996, pp. 1–4.

Ondo, *PLRS/JTIDS Hybrid, Filled Artillery Journal*, Jan.–Feb. 1981, pp. 20–25.

*Opto–22 Protocol*, Author: unknown, *Engineering Report*, No. 93–010, Revised: May 31, 1996, pp. 1–8.

*Phoenix Contact Interfacing*, Author: unknown, *Engineering Report*, No. 94–001, Revised: Jun. 20, 1996, pp. 1–7.

*PLC Direct (Koyo) Interfacing*, Author unknown, *Engineering Report*, No. 96–001, Revised: Apr. 10, 1996, pp. 1–8.

Postel (ed.), *Internet Protocol*, RFC 791, Publisher: unknown, Sep. 1981, pp. 1–45.

Postel (ed.), *Transmission Control Protocol, Version 4*, RFC793, available at http://www.faqs.org/rfcs/rfc793.html, Sep. 1981, pp. 1–85.

Pottie et al., *Wireless Integrated Network Sensors, Communications of the ACM*, vol. 43, No. 5, May 2000, pp. 51–58.

Power/Perfect Energy Management Systems, Author: unknown, *Johnson Controls*, 1983, pp. 1–4.

Ritter et al., *The Architecture of Metricom's Microcellular Data Network™ (MCDN) and Details of its Implementation as the Second and Third Generation Ricochet™ Wide–Area Mobile Data Service*, IEEE, 2001 pp. 143–152.

Salkintzisa et al., *Design and implementation of a low–cost wireless network for remote control and monitoring applications*, Elservier, Microprocessors and Microsystems, 1997, pp. 79–88.

*Special Poll Feature*, Author: unknown, *Engineering Report*, No. 93–008, Sep. 1993, pp. 1–5.

*Square D Interfacing*, Author: unknown, *Engineering Report*, No. 88–010, Revised: Apr. 18, 1996, pp. 1–9.

*Technology Review: Metricom's Ricochet Packet Radio Network*Author: unknown, *Virtual publishing*, 1996, available at http://www.hamradio–online.com/1996/jan/met ricom.html on May 4, 2010, pp. 1–3.

*Texas Instruments Interface*, Author: unknown, *Engineering Report*, No. 91–021, Revised: Nov. 1994, pp. 1–3.

The Institute of Electrical and Electronics Engineers, Inc., *IEEE Std 820.11–1997*, available at www.ieee.org on Jun. 26, 1997.

Theodorides, *Wireless Integrated Network Sensors*, Power Point Presentation, Publisher: unknown, Apr. 15, 2003, pp. 1–19.

*Toshiba Interfacing*, Author: unknown, *Engineering Report*, No. 91–011, Revised: Jun. 19, 1996, pp. 1–4.

*TranstexT® Advanced Energy Management System*, Brochure, Author: unknown, *Integrated Communication Systems, Inc.*, 1990, pp. 1–8.

*Westinghouse Numa Logic Interface*, Author: unknown, *Engineering Report*, No. 91–013, Date: unknown, pp. 1–7.

Iwata et al., *Scalable Routing Strategies for Ad Hoc Wireless Networks*, IEEE Journal on Selected Areas in Communications, vol. 17, No. 8, Aug. 1999, pp. 1369–1379.

Warrock, *School Give Report on Radio–Based FMS, Energy User News*, Nov. 7, 1983, pp. 1.

*Welcome to UtiliNet: A Wireless Data Communications Solution from Metricom, Inc.*, Author: unknown, available at http://web.archive.org/web/199806028045812/www.metricom.com/industrial/utilinet.html on May 10, 2010, pp. 1–10.

*What's Behind Ricochet: A Network Overview*, Author: unknown, available at http://web.archive.org/web/20000815090824/www.ricochet.com/ricochet_advantage/tech_overview.html, Aug. 15, 2000, pp. 1–4.

Agre et al., *Development Platform for Self–Organizing Wireless Sensor Networks*, SPIE, vol. 3713, Apr. 1999, pp. 257–268.

Corcoran et al., *CEBus Network Access via the World–Wide–Web*, IEEE, 1996, pp. 236–237.

Deering et al., *Internet Protocol, Version 6 (IPv6)*, RFC1883, Publisher: unknown, Dec. 1995, pp. 1–37.

Deering et al., *Internet Protocol, Version 6 (IPv6)*, RFC2460, The Internet Society, Dec. 1998, pp. 1–39.

Dong et al., *Low Power Signal Processing Architectures for Network Microsensors*, ACM, 1997, pp. 173–177.

Estrin et al., *Next Century Challenges: Scallable Coordination in Sensor Networks*, ACM, 1999, pp. 263–270.

Postel (ed.), *Internet Protocol: DARPA Internet Program*, RFC 791, Publisher: unknown, Sep. 1981, pp. 1–45.

Pottie, *Hierarchical Information Processing in Distributed Sensor Networks*, ISIT, Aug. 16–21, 1998, IEEE, 1998, pp. 163.

Pottie, *Wireless Sensor Networks*, ITW, Jun. 22–26, 1998, IEEE, 1998, pp. 139–140.

Theordorides, *Wireless Integrated Network Sensors*, Power Point Presentation, Publisher: unknown, Apr. 15, 2003, pp. 1–19.

Will et al., *Wireless Networking for Control and Automation of Off–road Equipment*, ASAE, Jul. 18–21, 1999, pp. 1–10.

Yu, *Target Identification Processor for Wireless Sensor Network*, Dissertation, Los Angeles: University of California, 1999, pp. 1–110.

3Com Invests in Coactive Networks, *Coactive* (press release), Author: unknown, Dec. 14, 1999, pp. 1–4.

5808 Photoelectric Smoke/Heat Detector with Built–in Wireless Transmitter Installation Instructions, *ADEMCO;* Author: unknown; 1998.

About AES Corporation, *AES IntelliNet*, Author: unknown, available at http://web.archive.org/web/19990127093116/www.aes–intellinet.com/ae, on Mar. 5, 2009, pp. 1–2.

ADEMCO Group, 4110DL Security System, Installation Instructions, Oct. 1996, *ADEMCO Group,* Author: unknown, pp. 1–15.

ADEMCO Group, 4110XM Security System, Installation Instructions, Jul. 1996, *ADEMCO Group,* Author: unknown, pp. 1–20.

ADEMCO Group, 4120EC Security System, Installation Instructions, Nov. 1990, *ADEMCO Group,* Author: unknown, pp. 1–17.

ADEMCO Group, 4120XM Security System, Installation Instructions, Oct. 1993, *ADEMCO Group,* Author: unknown, pp. 1–80.

ADEMCO Group, 4140XMPT2 Partitioned Security System with Scheduling User's Manual, May 1993, *ADEMCO Group,* Author: unknown; pp. 1–54.

ADEMCO Group, 4281, 5881 and 5882 Series RF Receivers Installation Instructions, Oct. 1996, *ADEMCO Group,* Author: unknown; pp. 1–6.

ADEMCO Group, 5330 Alpha Console, Installation Instructions, May 90, *ADEMCO Group,* Author: unknown, pp. 1–24.

ADEMCO Group, 5706 Smoke Detector with Built–in Wireless Transmitter, Installation Instructions, Dec. 1991, *ADEMCO Group,* Author: unknown, pp. 1–8.

ADEMCO Group, 5707 Smoke Detector with Built–in Wireless Transmitter, Installation Instructions, Aug. 1992, *ADEMCO Group,* Author: unknown, pp. 1–12.

ADEMCO Group, 5715 Universal Transmitter, Installation Instructions, Mar. 1989, *ADEMCO Group,* Author: unknown, pp. 1–4.

ADEMCO Group, 5775 Passive Infrared Motion Detector/Transmittter, Installation Instructions, Jul. 1991, *ADEMCO Group;* Author: unknown; pp. 1–4.

ADEMCO Group, 58008C Photoelectronic Smoke/Detector with Built–In Wireless Transmitter Installation Instructions, 1998, *ADEMCO Group,* Author: unknown; pp. 1–4.

ADEMCO Group, 5800TM Transmitter Module Installation Instructions, Apr. 1994, *ADEMCO Group,* Author: unknown; pp. 1.

ADEMCO Group, 5801 Remote Wireless Panic Transmitter Installation Instructions, Apr. 1994, *ADEMCO Group,* Author: unknown; pp. 2.

ADEMCO Group, 5802CP Belt Clip Transmitter Installation Instructions, Nov. 1994, *ADEMCO Group,* Author: unknown; pp. 1.

ADEMCO Group, 5802MN Supervised Miniature Transmitter Installation Instructions, Jan. 1995, *ADEMCO Group,* Author: unknown; pp. 1.

ADEMCO Group, 5802MN2 Supervised Miniature Transmitter Installation Instructions, Jun. 1997, *ADEMCO Group,* Author: unknown; pp. 1.

ADEMCO Group, 5803 Wireless Key Transmitter Installation Instructions, Nov. 1994, *ADEMCO Group,* Author: unknown; pp. 2.

ADEMCO Group, 5804 Wireless Key Transmitter Installation Instructions, Jul. 1995, *ADEMCO Group,* Author: unknown; pp. 3.

ADEMCO Group, 5804BD Bi–Directional Wireless Key Installation Instructions, Apr. 1997, *ADEMCO Group,* Author: unknown; pp. 4.

ADEMCO Group, 5806 Smoke Detector with Built–In Wireless Transmitter Installation Instructions, May 1998, *ADEMCO Group,* Author: unknown; pp. 1–4.

ADEMCO Group, 5807 Smoke Detector with Built–In Wireless Transmitter Installation Instructions, May 1998, *ADEMCO Group,* Author: unknown; pp. 1–6.

ADEMCO Group, 5808 Photoelectronic Smoke/Heat Detector with Built–In Wireless Transmitter Installation Instructions, 1998, *ADEMCO Group,* Author: unknown; pp. 1–8.

ADEMCO Group, 5808 Wireless Smoke Detector, 1999, available at http://web.archive.org/web/20000118015507/wwww.ademco.com/ademco on Mar. 5, 2009, pp. 1–4.

ADEMCO Group, 5809 Rate–of–Rise Heat Detector/Transmitter Installation Instructions, May 1995, *ADEMCO Group,* Author: unknown; pp. 1–2.

ADEMCO Group, 5816 Door/Window Transmitter Installation Instructions, Nov. 1994, *ADEMCO Group,* Author: unknown; pp. 1–2.

ADEMCO Group, 5816TEMP Low Temperature Transmitter Installation Instructions, May 1998, *ADEMCO Group,* Author: unknown; pp. 1–2.

ADEMCO Group, 5818 Recessed Transmitter, Installation Instructions, Jan. 1994, *ADEMCO Group,* Author: unknown; pp. 1–2.

ADEMCO Group, 5819 Shock Processor Transmitter Installation Instructions, May 1998, *ADEMCO Group,* Author: unknown; pp. 1–2.

ADEMCO Group, 5819WHS Wireless Shock Sensor and Processor, 1997, available at http://web.archive.org/web/19990428164624/www.ademco.com/ademco on Mar. 5, 2009, pp. 1–1.

ADEMCO Group, 5819WHS/5819BRS Shock Processor Transmitter Installation Instructions, May 1998, *ADEMCO Group,* Author: unknown; pp. 1–2.

ADEMCO Group, 5827 Remote Wireless Keypad/Transmitter Installation Instructions, Apr. 1994, *ADEMCO Group,* Author: unknown; pp. 1.

ADEMCO Group, 5827BD and 5827BDE Wireless Bi–Directional Keypads Installation Instructions and Operating Guide, Mar. 1996, *ADEMCO Group,* Author: unknown; pp. 1–6.

ADEMCO Group, 5849 Glass Break Detector/Transmitter Installation Instructions, Oct. 1997, *ADEMCO Group,* Author: unknown; pp. 1–4.

ADEMCO Group, 5850 Glass Break Detector/Transmitter Installation Instructions, May 1998, *ADEMCO Group,* Author: unknown; pp. 1–4.

ADEMCO Group, 5890 Passive Infrared Motion Detector/Transmitter Installation Instructions, May 1998, *ADEMCO Group,* Author: unknown; pp. 1–8.

ADEMCO Group, 5890 Wireless PIR Motion Detector, 1997, available at http://web.archive.org/web/19990429054256/www.ademco.com/asc/ on Mar. 5, 2009, pp. 1–3.

ADEMCO Group, 5890PI Passive Infrared Motion Detector/Transmitter Installation Instructions, Mar. 1998, *ADEMCO Group,* Author: unknown; pp. 1–4.

ADEMCO Group, 6128RF Keypad/Receiver—full wireless capability, 1997, *ADEMCO Group,* Author: unknown, available at http://web.archive.org/web/19981206111450/www.ademco.com/ademco on Mar. 5, 2009, pp. 1–2.

ADEMCO Group, 6128RF Keypad/Transceiver, Installation Instructions, Jul. 1998, *ADEMCO Group,* Author: unknown, pp. 1–8.

ADEMCO Group, 6128RF Keypad/Transceiver, User Guide, May 1998, *ADEMCO Group,* Author: unknown, pp. 1.

ADEMCO Group, 6128WL Keypad/Receiver, Installation Instructions, Oct. 1998, *ADEMCO Group,* Author: unknown, pp. 1–8.

ADEMCO Group, 6128WL Keypad/Receiver, User Guide, Oct. 1998, *ADEMCO Group,* Author: unknown, pp. 1.

ADEMCO Group, 7715DF MicroFAST Installation Tool, User Manual, Feb. 1998, *ADEMCO Group,* Author: unknown, pp. 1–32.

ADEMCO Group, 7720 Subscriber Radio, Installation Instructions, Jan. 1992, *ADEMCO Group,* Author: unknown, available at http://www/guardian alarms.net, pp. 1–18.

ADEMCO Group, 7720NX Network Extender, 1997, *ADEMCO Group,* Author: unknown, available at http://web.archive.org/web/19990220035932/www.ademco.com/ademco on Mar. 5, 2009, pp. 1–3.

ADEMCO Group, 7720NX Network Extender, *ADEMCO Group,* Author: unknown, 1998, pp. 1–2.

ADEMCO Group, 7720P Programming Tool, User Guide, Mar. 1992, *ADEMCO Group,* Author: unknown, available at http://www.guardianalarms.net, pp. 1–8.

ADEMCO Group, 7720Plus Subscriber Radio, Installation Instructions, Oct. 1996, *ADEMCO Group,* Author: unknown, available at http://www.guardian alarms.net, pp. 1–100.

ADEMCO Group, 7720ULF Combination Fire Control and Long Range Radio Transmitter, 1997, *ADEMCO Group,* Author: unknown, available at http://web.archive.org/web/19990501 210612/www.ademco.com/ademco on Mar. 5, 2009, pp. 1–1.

ADEMCO Group, 7720ULF Subscriber Radio, Installation Instructions, Mar. 1995, *ADEMCO Group*, Author: unknown, available at http://www.guardian alarms.net, pp. 1–20.

ADEMCO Group, 7720V2 Self–Contained Long Range Radio Transmitter, 1997, *ADEMCO Group*, Author: unknown, available at http://web.archive.org/ web/19990501212349/www.ademco.com/ademco on Mar. 5, 2009, pp. 1–4.

ADEMCO Group, 7720V2 Subscriber Radio, Installation Instructions, Jun. 1996, *ADEMCO Group*, Author: unknown, available at http://www.guardian alarms.net, pp. 1–24.

ADEMCO Group, 7810iR Internet Receiver, Installation and Setup Guide, May 2002, *ADEMCO Group*, Author: unknown, available at http://www.guardian alarms.net, pp. 1–58.

ADEMCO Group, 7820 Appendices, *ADEMCO Group*, Author: unknown, Date: unknown, available at http://www.guardian alarms.net, pp. 1–2.

ADEMCO Group, 7820 Integrated Radio Transmitter, Installation Instructions, Aug. 1995, *ADEMCO Group*, Author: unknown, available at http://www.guardian alarms.net, pp.1–52.

ADEMCO Group, 7825 Outdoor Antenna with Bracket, Installation Instructions, Feb. 1995, *ADEMCO Group*, Author: unknown, available at http://www.guardian alarms.net, pp. 1–2.

ADEMCO Group, 7830R SafetyNet Subscriber Radio, Installation Instructions, Jun. 1996, *ADEMCO Group*, Author: unknown, available at http://www.guardian alarms.net, pp. 1–32.

ADEMCO Group, 7830R Subscriber Transmitter, 1997, available at http://web.archive.org/web/19990501215427/www.ademco.com/ademco on Mar. 5, 2009, pp. 1–3.

ADEMCO Group, 7835C Cellular Control Channel Transceiver, Installation and Setup Guide, Sep. 1998, *ADEMCO Group*, Author: unknown, available at http://www.guardian alarms.net, pp. 1–32.

ADEMCO Group, 7835C Cellular Safety Net Subscriber Radio Transceiver, 1997, *ADEMCO Group*, Author: unknown, available at http://web.archive.org/web/19990801221202/www.ademco.com/ on Mar. 5, 2009, pp. 1–3.

ADEMCO Group, 7845C Cellular Control Channel Transceiver, Installation and Setup Guide, Sep. 1990, *ADEMCO Group*, Author: unknown, available at http://www.guardian alarms.net, pp. 1–104.

ADEMCO Group, 7845CZ Seven Zone Cellular Control Channel Transceiver, Installation and Setup Guide, Sep. 201, *ADEMCO Group*, Author: unknown, available at http://www.guardian alarms.net, pp. 1–64.

ADEMCO Group, 7845i Internet Communications Module, Installation and Setup Guide, May 2002, *ADEMCO Group*, Author: unknown, available at http://www.guardian alarms.net, pp. 1–42.

ADEMCO Group, 7920SE 900MHz Fully Synthesized Transceiver, 1997, *ADEMCO Group*, Author: unknown, available at http:web.archive.org/web/19990501222639/www.ademco.com/ on Mar. 5, 2009, pp. 1–3.

ADEMCO Group, 7920SE Transceiver, Installation Instructions, Apr. 1995, *ADEMCO Group*, Author: unknown, available at http://www.guardian alarms.net, pp. 1–80.

ADEMCO Group, ADEMCO World Leader in Home Security Products, 1997, *ADEMCO Group*, Author: unknown, available at http://web.archive.org/web/19990428164624/www.ademco.com /ademco on Mar. 5, 2009, pp. 1–2.

ADEMCO Group, AlarmNet Introduces Control Channel Cellular for Commercial Fire/Burglary Applications, *ADEMCO Group* (press release), Aug. 31, 1999, available at http://web.arquive.org/web/20000119053724/www.ademco/pr0831 on Mar. 31, 2009, pp. 1.

ADEMCO Group, AlarmNet, 1997, *ADEMCO Group*, Author: unknown, available at http://web.archive.org/web/19990420234130/www.ademco.com/ademco on Mar. 5, 2009, pp. 1–3.

ADEMCO Group, Alpha Vista No. 5130XT Security System, Installation Instructions, Mar. 1989, *ADEMCO Group*, Author: unknown, pp. 1–96.

ADEMCO Group, Compass Network Downloader, *ADEMCO Group*, Author: unknown, Date: unknown, available at http://www.guardianalarms.net pp. 1–109.

ADEMCO Group, Compass, 1997, *ADEMCO Group*, Author: unknown, available at http://web.archive.org/web/19990209094401/www.ademco.com/ademco on Mar. 5, 2009, pp. 1–3.

ADEMCO Group, Control/Communicator 5110XM, Installation Instructions, Apr. 1996, *ADEMCO Group*, Author: unknown, pp. 1–76.

ADEMCO Group, Fire Alarm Control/Communicator Model 5110XM User's Manual, Apr. 1996, *ADEMCO Group*, Author: unknown; pp. 1–30.

ADEMCO Group, Fire and Burglary System Model 5120XM User's Manual, Jun. 1996, *ADEMCO Group*, Author: unknown; pp. 1–40.

ADEMCO Group, Home Page, *ADEMCO Group*, Author: unknown, available at http://web.archive.org/web/19961023204954/http://ademco.com/ on Mar. 5, 2009, pp. 1.

ADEMCO Group, LYNX—Quick Install Security System, 1997, *ADEMCO Group*, Author: unknown, available at http://web.archive.org/web/19990116225005/www.ademco.com/ademco on Mar. 5, 2009, pp. 1–3.

ADEMCO Group, Lynx Quick Star Guide, Oct. 1998, *ADEMCO Group*, Author: unknown, pp. 1–4.

ADEMCO Group, Lynx Security System Programming Form & Summary of Connections, Oct. 1998, *ADEMCO Group*, Author: unknown, pp. 1–16.

ADEMCO Group, Lynx Security System User Guide, Oct. 1998, *ADEMCO Group*, Author: unknown; pp. 1–40.

ADEMCO Group, Lynx Security System, Installation and Setup Guide, Oct. 1998, *ADEMCO Group*, Author: unknown, pp. 1–48.

ADEMCO Group, Powerline Carrier Device Modules, 1997, *ADEMCO Group*, Author: unknown, available at http://web.archive.org/web/19990218035115/www.ademco.com/ademco on Mar. 5, 2009, pp. 1–2.

ADEMCO Group, Remote Keypads 6128, 6137, 6137R, 6138, 6139 & 6139R, Installation Guide, Aug. 1998, *ADEMCO Group*, Author: unknown, pp. 1–2.

ADEMCO Group, Security System Model 4110DL Programming Form, Oct. 1996, *ADEMCO Group*, Author: unknown, pp. 1–8.

ADEMCO Group, Security System Model 4110XM Programming Form, Jul. 1996, *ADEMCO Group*, Author: unknown, pp. 1–4.

ADEMCO Group, Security System Model 4120EC Programming Form, Sep. 1993, *ADEMCO Group*, Author: unknown, pp. 1–2.

ADEMCO Group, Security System Model 4120XM Programming Form, Sep. 1992, *ADEMCO Group*, Author: unknown, pp. 1–4.

ADEMCO Group, Security System Model 4130XT/4140/5130XT Programming Form, Jul. 1989, *ADEMCO Group*, Author: unknown, pp. 1–2.

ADEMCO Group, Security System Model 4140XMP Programming Form, Jan. 1992, *ADEMCO Group*, Author: unknown, pp. 1–4.

ADEMCO Group, Security System Model 4140XMPT Programming Form, *ADEMCO Group*, Author: unknown, Date: unknown, pp. 1.

ADEMCO Group, Security System Model 4140XMPT2 Programming Form, Apr. 1996, *ADEMCO Group*, Author: unknown, pp. 1–4.

ADEMCO Group, Security System Model 5110XM Programming Form, Apr. 1996, *ADEMCO Group*, Author: unknown, pp. 1–4.

ADEMCO Group, Security System Model 5120XM Programming Form, Jun. 1996, *ADEMCO Group*, Author: unknown, pp. 1–4.

ADEMCO Group, Security System Model 5140XM Programming Form, Jun. 1993, *ADEMCO Group*, Author: unknown, pp. 1–4.

ADEMCO Group, Security System Model Vista–10 Programming Form, Sep. 1994, *ADEMCO Group*, Author: unknown, pp. 1–4.

ADEMCO Group, Security System Model Vista–10$_{SE}$ Programming Guide, Apr. 1997, *ADEMCO Group*, Author: unknown, pp. 1–24.

ADEMCO Group, Security System Model Vista–128B Commercial Burglary Partitioned Security System with Scheduling, Quick Start Guide, Jul. 1998, *ADEMCO Group*, Author: unknown, pp. 1–39.

ADEMCO Group, Security System User's Manual, Sep. 1996, *ADEMCO Group*, Author: unknown; pp. 1–88.

ADEMCO Group, The Vista–100 Series, 1997, *ADEMCO Group*, Author: unknown, available at http://web.archive.org/web/19970620010543/www.ademco.com/ademco on Mar. 5, 2009, pp. 1–7.

ADEMCO Group, The Vista–10SE, 1997, *ADEMCO Group*, Author: unknown, available at http://web.archive.org/web/19990502214402/www.ademco.com/ademco on Mar. 5, 2009, pp. 1–4.

ADEMCO Group, via16 Programming Form, Jul. 1993, *ADEMCO Group*, Author: unknown, pp. 1–2.

ADEMCO Group, Via–16 Security System, Installation Instructions, Jan. 1992, *ADEMCO Group*, Author: unknown, pp. 1–24.

ADEMCO Group, Via–30+, Vista 10, 4111XM Security System User's Manual, Jul. 1994, *ADEMCO Group*, Author: unknown, pp. 1–44.

ADEMCO Group, Via–30PSE and VISTA–10$_{SE}$ Security System User's Manual, Jan. 1997, *ADEMCO Group*, Author: unknown; pp. 1–88.

ADEMCO Group, Via–30P$_{SE}$ Security System, Programming Guide, Apr. 1997, *ADEMCO Group*, Author: unknown, pp. 1–24.

ADEMCO Group, Vista 4120XM and 4140XMP Security System User's Manual, Jan. 1994, *ADEMCO Group*, Author: unknown; pp. 1–60.

ADEMCO Group, Vista 4130XT Security System, Installation Instructions, Oct. 1988, *ADEMCO Group*, Author: unknown, pp. 1–84.

ADEMCO Group, Vista 4140XMPT2 Partitioned Security System with Scheduling, Installation Instructions, May 1993, *ADEMCO Group*, Author: unknown, pp. 1–68.

ADEMCO Group, Vista 5140XM Commercial Fire and Burglary Alarm System, Installation Instructions, Jun. 1993, *ADEMCO Group*, Author: unknown, pp. 1–74.

ADEMCO Group, Vista AT 4140 Security System Installation Instructions, Sep. 1988, *ADEMCO Group*, Author: unknown, pp. 1–68.

ADEMCO Group, Vista Series 4120EC Security System User's Manual, Sep. 1992, *ADEMCO Group*, Author: unknown; pp. 1–28.

ADEMCO Group, Vista Series 4130XM, 5130XM, 4140XMP Security System User's Manual, Feb. 1992, *ADEMCO Group*, Author: unknown; pp. 1–32.

ADEMCO Group, Vista Series 4140XMP, Installation Instructions, Jan. 1992, *ADEMCO Group*, Author: unknown, pp. 1–52.

ADEMCO Group, Vista Series 4140XMPT/4140XMPT–UL Partitioned Security System User's Manual, Jun. 1993, *ADEMCO Group*, Author: unknown; pp. 1–32.

ADEMCO Group, Vista Series 5140XM User's Manual, Aug. 1992, *ADEMCO Group*, Author: unknown; pp. 1–28.

ADEMCO Group, Vista Series Partitioned Security Systems Model 4140XMPT, Installation Instructions, Feb. 1992, *ADEMCO Group*, Author: unknown, pp. 1–60.

ADEMCO Group, Vista XM Series 4140XM, 5130XM, 4130XM, Installation Instructions, Jul. 1990, *ADEMCO Group*, Author: unknown, pp. 1–26.

ADEMCO Group, Vista XM Series, Installation Instructions, *ADEMCO Group*, Author: unknown, Oct. 1991, pp. 1–16.

ADEMCO Group, Vista–10 Security System, Installation Instructions, Sep. 1994, *ADEMCO Group*, Author: unknown, pp. 1–56.

ADEMCO Group, Vista–100 Commercial Fire & Burglary Alarm System User's Manual, Nov. 1995, *ADEMCO Group*, Author: unknown; pp. 1–66.

ADEMCO Group, Vista–100 Commerical Fire & Burglary Alarm System with Scheduling Quick Start, Apr. 1996, *ADEMCO Group*, Author: unknown; pp. 1–24.

ADEMCO Group, Vista–100 Commercial Fire and Burglary Partitioned Security System with Scheduling, Installation Instructions and Programming Guide, Jan. 1998, *ADEMCO Group*, Author: unknown, pp 1–233.

ADEMCO Group, Vista–10$_{SE}$, Installation Instructions, May 1997, *ADEMCO Group*, Author: unknown, pp. 1–88.

ADEMCO Group, Vista–128B Commercial Burglary Partitioned Security System with Scheduling, Installation and Setup Guide, Jul. 1998, *ADEMCO Group*, Author: unknown, pp. 1–252.

ADEMCO Group, Vista–128FB Commercial Fire and Burglary Partitioned Security System User Guide, Oct. 1998, *ADEMCO Group*, Author: unknown; pp. 1–80.

ADEMCO Group, Vista–128FB Commercial Fire and Burglary Partitioned Security System with Scheduling, Installation and Setup Guide, Oct. 1998, *ADEMCO Group*, Author: unknown, pp. 1–220.

ADEMCO Group, Vista–20 2–Partitioned Security System, Installation Instructions, Nov. 1995, *ADEMCO Group*, Author: unknown, pp. 1–120.

ADEMCO Group, Vista–20 2–Partitioned Security System, Programming Form, Apr. 1996, *ADEMCO Group*, Author: unknown, pp. 1–8.

ADEMCO Group, Vista–20 Security System User's Manual, Apr. 1995, *ADEMCO Group*, Author: unknown; pp. 1–52.

ADEMCO Group, Vista–20HW 2–Partitioned Security System, Installation Instructions, Apr 1996, *ADEMCO Group*, Author: unknown, pp. 1–100.

ADEMCO Group, Vista–20HW 2–Partitioned Security System, Programming Form, Apr. 1996, *ADEMCO Group*, Author: unknown, pp. 1–8.

ADEMCO Group, Vista–20HW$_{SE}$ 2–Partitioned Security System, Installation Instructions, Aug. 1997, *ADEMCO Group*, Author: unknown, pp. 1–84.

ADEMCO Group, Vista–20H$_{SE}$ 2–Partitioned Security System, Programming Form, Aug. 1997, *ADEMCO Group*, Author: unknown, pp. 1–8.

ADEMCO Group, Vista–20$_{SE}$ 2–Partitioned Security System, Installation Instructions, Aug. 1997, *ADEMCO Group*, Author: unknown, pp. 1–100.

ADEMCO Group, Vista–20$_{SE}$ 2–Partitioned Security System, Programming Form, Aug. 1997, *ADEMCO Group*, Author: unknown, pp. 1–8.

ADEMCO Group, Vista–20$_{SE}$/Vista–20HW$_{SE}$ Security System User's Manual, Jun. 1997, *ADEMCO Group*, Author: unknown; pp. 1–52.

ADEMCO Group, Vista–30P$_{SE}$ Security System, Installation Instructions, Apr. 1997, *ADEMCO Group*, Author: unknown, pp. 1–104.

ADEMCO Group, Vista–40 2–Partition Security System, Programming Guide, Jul. 1998, *ADEMCO Group*, Author: unknown, pp. 1–24.

ADEMCO Group, Vista–40 2–Partitioned Security System, Installation and Setup Guide, Jul. 1998, *ADEMCO Group*, Author: unknown, pp. 1–380.

ADEMCO Group, Vista–40 Programming Guide, Jun. 1997, *ADEMCO Group*, Author: unknown, available at http://www.guardianalarms.net, pp. 1–20.

ADEMCO Group, Vista–40 Security System User's Guide, Jul. 1998, *ADEMCO Group*, Author: unknown, pp. 1–60.

ADEMCO Group, Vista–50, Vista–50UL Security System, Nov. 1994, *ADEMCO Group*, Author: unknown, pp. 1–66.

ADEMCO Group Vista–50P, Vista–50PUL Partitioned Security System with Scheduling, Installation Instructions and Programming Guide, Oct. 1997, *ADEMCO Group*, Author: unknown, pp. 1–199.

ADEMCO Group, Vista–50P, Vista–50PUL Security System User's Manual, Jul. 1995, *ADEMCO Group*, Author: unknown, pp. 1–66.

ADEMCO Group, Vista–50P, Vista–50PUL, Partitioned Security System with Scheduling, Quick Start, Aug. 1995, *ADEMCO Group*, Author: unknown, pp. 1–28.

ADEMCO Group, Vista–AT Security System User's Manual, Sep. 1988, *ADEMCO Group*, Author: unknown, pp. 1–56.

ADEMCO Group, V–Link Downloading Software User's Guide, Jun. 1994, *ADEMCO Group*, Author: unknown, availabe at http://guardianalarms.net, pp. 1–126.

ADEMCO Group, V–Plex Security Technology, 1997, *ADEMCO Group*, Author: unknown, available at http://web.archive.org/web/19990421110527/www.ademco.com/ademco on Mar. 5, 2009, pp. 1–6.

ADEMCO Group, Wireless Transmitters/Receivers: 5700 Wireless Transmitters, 1997, *ADEMCO Group*, Author: unknown, available at http://web.archive.org/web/199901271 20423/www.ademco.com/ademco on Mar. 5, 2009, pp. 1–2.

ADEMCO Group, Wireless Transmitters/Receivers: 5800 Wireless Transmitters, 1997, *ADEMCO Group*, Author: unknown, available at http://web.archive.org/web/1999021818 1254/www.ademco.com/ademco on Mar. 5, 2009, pp. 1–2.

ADEMCO Group, Wireless User Interface Devices, 1997, *ADEMCO Group*, Author: unknown, available at http://web.archive.org/web/19990421190353/www.ademco.com/ademco on Mar. 5, 2009, pp. 1–4.

AES • 700 Central Station, Installation & Operation Manual, Document 40–0551u, *AES Corporation*, Author: unknown, Dec. 1996, pp. 1–40.

AES • *Intelli*Guard 7470, *AES IntelliNet*, Author: unknown, Nov. 2003, pp. 1–15.

AES • *Intelli*Net Theory of Operation, *AES IntelliNet*; Author: unknown, Dec. 1996, downloaded from http://www.guardianalarms.net, pp. 1–18.

AES • *Intelli*Net Wireless Network Glossary of Terms, document 40–0551u, *AES IntelliNet*, Author: unknown, Dec. 1996, pp. 1–15.

AES 7000 Smart Central Station InstaCentral Station Installation & Operations Manual, Document No. 40–0551e, *AES Intellinet*, Author: unknown; Nov. 20, 1996, pp. 1–57.

AES 7067 IntelliTap–II Digital Dialer Interface: A Supplemental Alarm Supporting Device, *AES IntellNet*, Author: unknown; Aug. 5, 2004, pp. 1–4.

AES 7099 Central Station Installation & Operation Manual, Document No. 40–0050, *AES Intellinet*, Author: unknown; 1998, pp. 1–20.

AES 7450 RF Subscriber Unit Installation Manual, *AES IntelliNet*, Author: unknown; Jun. 21, 2000, pp. 1–8.

AES 7750–F RF SMART Subscriber Unit Version 2, Including 7750–F–4×4 and 7750–F–8, Installation & Operation Manual, *AES IntelliNet*, Author: unknown, Apr. 2001 (Updated Nov. 2003), pp. 1–60.

AES 7750–F RF SMART Subscriber Unit Version 2, Installation & Operation Manual, *AES IntelliNet*, Author: unknown, Aug. 2000, pp. 1–30.

AES Central Alarm Monitoring, Author: unknown, available at http://web.archive.org/web/19990225163745/www.aes–intellinet.com/ae, on Mar. 5, 2009, pp. 1–3.

AES *Intelli*Net Model 7440 & 7440–XL RF Subscriber Unit, *Addendum, AES Intellinet*, Author: unknown, Aug. 29, 2002, pp. 1.

AES *Intelli*Net 7450 *Addendum, AES Corporation*, Author: unknown, Jul. 9, 2002, pp. 1–2.

AES *Intelli*Net Dealer's List By State, Author: unknown, available at http://web.archive.org/web/20010216234026/www.aes–intellinet.com/list on Mar. 5, 2009, pp. 1–13.

AES *IntelliNet* Model 7003 Central Station, Installation & Operation Manual, *AES IntelliNet*, Author: unknown, Jan. 9, 2001, available at www.guardianalarms.net, pp. 1–25.

AES *IntelliNet* Model 7050, 7750, Subscriber Unit, Version 1.62, Installation & Operation Manual, *AES IntelliNet*, Author: unknown, Dec. 1996, available at www.guardianalarms.net, pp. 1–110.

AES IntelliNet Model 7050–E & 7750–E, RF Subscriber Unit, Version 1.71, Installation & Operation Manual, *AES IntelliNet*, Author: unknown, Feb. 24, 1997, available at www.guardianalarms.net, pp. 1–54.

AES *IntelliNet* Model 7050–E Radio Subscriber Unit Installation Manual, *AES IntelliNet*, Author: unknown, Jul. 17, 2000, available at www.guardianalarms.net, pp. 1–4.

AES IntelliNet Net 77 Version 1.48.30, Installation & Operation Manual, Document 40–0551u, *AES Corporation*, Author: unknown, Jun. 1999, pp. 1–30.

AES IntelliNet Net 77 Version 1.48.4, Installation & Operation Manual, Document 40–0551u, *AES Corporation*, Author: unknown, Nov. 2000, pp. 1–36.

AES *Intelli*Net Net7K Verson 1.48.4, Installation & Operation Manual, Documnet 40–0551, *AES Corporation*, Nov. 2000, pp. 1–36.

AES *Intelli*Net Net7K Version 3, Installation & Operation Manual, Document 40–0551, *AES Corporation*, Jun. 1999, pp. 1–30.

AES *Intelli*Net Radio Communication Subscriber Unit 7050, Sep. 16, 1997, available at http://web.archive.org/web/19990203061203/www.aes–intellinet.com/sp on Mar. 5, 2009, pp. 1–2.

AES *Intelli*Notes Universal Serial Data Interface/ USDI, Bulletin No. 55, *AES Corporation*, Author: unknown, Apr. 5, 2001, pp. 1–12.

AES *Intelli*TAP Model 7068, Version 1.08, Installation Guide, *AES ntelliNet*, Author: unknown, Jun. 15, 2000, pp. 1–11.

AES *Intelli*TRAK 7555–RT GPS Based Vehicle Tracking Unit, Version 2.12, *AES IntelliNet*, Author: unknown, Nov. 6, 2002, pp. 1–16.

AES *IntelliTRAK* 7555–RT GPS Based Vehicle Tracking Unit, Version 2.0a, *AES IntelliNet*, Author: unknown, Feb. 20,2001, pp. 1–16.

AES Net7000, Installation & Operation Manual, *AES IntellNet*, Author: unknown; Nov. 24, 1996, pp. 1–76.

AES Net77 Wireless Network Management Software Installation & Operation ManuCentral Station Manual, Section 3, *AES Intellinet*; Author: unknown; Dec. 1996, pp. 1–87.

AES UL/ULC System Configuration, *AES Corporation*, Author: unknown, May 1, 2003, pp. 1.

Agre et al., Autoconfigurable Distributed Control Systems, *ISADS*, Apr. 25–27, 1995, pp. 162–168.

Agre et al., Development Platform for Self–Organizing Wireless Sensor Networks, *UCLA, Rockwell Science Center*; Date: unknown, pp. 1–25.

AlarmLink, Inc., *A Brief History*, available at http://www.alarmlink.com/Default.aspx?tabid=28, on Mar. 23, 2009, pp. 1.

AlarmLink, Inc., *Alarm Over IP Products*, available at http://www.alarmlink.com/ Default.aspx?tabid=38, on Mar. 24, 2009, pp. 1.

AlarmLink, Inc., *Central Stations*, available at http://www.alarmlink.com/Default.aspx?tabid=35, on Mar. 24, 2009, pp. 1–3.

AlarmLink, Inc., *Home Page*, available at http://www.alarmlink.com/, on Mar. 24, 2009, pp. 1–2.

AlarmLink, Inc., *MeshWorks of Los Angeles*, available at http://www.alarmlink.com/Default.aspx?tabid=39, on Mar. 24, 2009, pp. 1.

Asada et al., Low Power Wireless Communication and Signal Processing Circuits for Distributed Microsensors; Proceedings of the International Circuits and Systems Symposium, ISCAS '97; *UCLA, Rockwell Science Center*; Jun. 1997, pp. 1–5.

Asada, Wireless Integrated Network Sensors (WINS), *UCLA, SPIE* vol. 3673, Mar. 1999, pp. 11–18.

Atlanta Building News, The voice of the Greater Atlanta Home Builders Association, vol. 7, No. 5, May 2006, pp. 1–60.

Baker et al., The Architectural Organization of a Mobile Radio Network via a Distributed Algorithm, *IEEE*; Nov. 1981, pp. 1694–1701.

Bhatnagear et al., Layer netNet: A New Self–Organizing Network Protocol, *Dept. of Electrical Engineering, SUNY; IEEE*; 1990, pp. 1–5.

Black, Lutron RF Technology, Reliable, First, Forward Thinking, *Lutron Electronics Co. Inc.*, Aug. 2006, pp. 1–16.

Blaney, HomeRF™ Working Group, 4th Liaison Report, *IEEE* 802.11–98/360, Nov. 1998, Slides 1–12.

Brownrigg et al., Packet Radio Networks; Architectures, Protocols, Technologies and Applications (1987), (introduction pp. ix–xviii); pp. 3–274.

Brownrigg, The Organization of Computer Resources into a Packet Radio Network, *IEEE*, Jan. 1977, vol. Com–25 No. 1, pp. 169–178.

Bult et al., A Distributed, Wireless MEMS Technology for Condition Based mMaintenance, *EED, Defense Technical Information Center, UCLA, Electrical Engineering Department, Rockwell Science Center*; Apr. 22–26, 1996.

Bult et al., Low Power Systems for Wireless Microsensors, EED, *UCLA; ILSPED*; 1996, pp. 1–15.

Bult et al., Low Power Wireless Integrated Microsensors (LWIM), *EED, UCLA; ARPA—LPE PI Meeting*, Apr. 27–28, 1995, pp. 1–30.

Bult et al., Wireless Integrated Microsensors, *EED, UCLA Electrical Engineering Department, Rockwell Science Center, TRF*; Jun. 6, 1996, pp. 205–210.

Caddx Controls Inc., NetworX CADDX NetworX NX–8 Control/Communicator Installation Manual, *Caddx Controls*; Author: unknown; Jul. 15, 1996, pp. 1–116.

Caddx Installation Instructions Package, document No. 466–1786, *CADDX Installation Controls, Inc., Caddx Controls*; Author: unknown; Aug. 1998, pp. 1–58.

Caddx–Caddi Controls, Inc., Ranger 9000E, *User's Manual*, downloaded from http://www.guardian alarms.net, May 17, 1996, pp. 1–9.

Case Study: Genentech Uses Coactive's Technology to Centralize Monitor and Control Functions in a Mixed Legacy and New Equipment Environment, *Coactive*, Author: unknown, 1998, pp. 1–4.

Case Study: Ingham Regional Medical Center Uses Coactive Technology to Monitor and Control Critical Power Generations in a Mutli–Campus Environment, *Coactive*, 1998, pp. 1–4.

Circon Systems Partners with Coactive Networks to Deliver Circon WebControl™, *Coactive* (press release), Author: unknown; Feb. 7, 2000, pp. 1–4.

Circon Technology Connects Building Management Systems to the Internet Using Coactive Routers, ,*Coactive* (press release); Author: unknown; May 20, 1997.

Circon Technology Connects Building Management Systems to the Internet Using Coactive Routers, *Coactive* (press release), Author: unknown, May 20, 1997, pp. 3.

Cisco's John Chambers Discusses the Internet Consumer Revolution at CES Using Demo Based on Echelon's LonWorks Technology, *Home Toys* (press release); Author: unknown; Jan. 8, 1999, available at http://hometoys.com/htinews/dec98/releases/echelon04.htm on Apr. 22, 2009, pp. 1–6.

Clare et al., Self–Organizing Distributed Sensor Networks, *EED, UCLA, Rockwell Science Center*; Date; unknown, pp. 1–9.

Clare, AWAIRS Progress Review: Planned Milestones, *UCLA: Rockwell Science Center*, Nov. 20, 1998, pp.1–12.

Coactive Bridges Gap between Control Systems and Corporate Data Networks with New Off–the–Shelf Router Family, *Coactive* (press release); Author: unknown; Jun. 8, 1998.

Coactive Enhances Residential Getaway to Enable Multiple Home Networks, *Coactive* (press release), Author: unknown, Jan. 6, 2000, pp. 1–4.

Coactive Joins 3Com to Demonstrate Convergence of Control and Enterprise Networks at Retail Systems '98, *Coactive* (press release), Author: unknown, Jun. 16, 1998, pp. 1–4.

Coactive Launches First Architecture to Support the Convergence Between Control and IP Networks, *Coactive* (press release), Author: unknown, May 20, 1998, pp. 1–4.

Coactive Leads Standardization Effort for LonTalk Routers, *Coactive* (press release); Author: unknown; May 20, 1997.

Coactive Leads Standardization Effort for LonTalk/IP Routers, *Coactive* (press release), Author: unknown, May 20, 1997, pp. 3.

Coactive Networks and Diverse Networks Team to Deliver End–to–End Infrastructure for Enabling the Digital Home, *Coactive* (press release), Author: unknown, Aug. 28, 2000, pp 1–4.

Coactive Networks and Innovex Technologies Deliver Internet Access to Home Security, Lighting and Climate Control, *Coactive* (press release), Author: unknown, Feb. 29, 2000, pp. 1–4.

Coactive Networks and Silicon Energy Partner to Deliver an End–to–End Solution for Internet–Based Energy Monitoring and Analysis, *Coactive* (press release), Author: unknown, Sep. 19, 2000, pp. 1–4.

Coactive Networks and Vicinium Systems Team to Deliver a Complete Television–Based Interface to Digital Homes and Neighborhoods, *Coactive* (press release), Author: unknown, Jun. 19, 2000, pp. 1–4.

Coactive Networks Announces First Shipments of Internet Gateway to Home Control Systems, *Coactive* (press release), Author: unknown, May 3, 1999, pp. 1–4.

Coactive Networks Announces Formation of Technical Advisory Board, *Coactive* (press release), Author: unknown, Oct. 5, 1998, pp. 1–4.

Coactive Networks Announces System Provider Partner Program, *Coactive* (press release), Author: unknown, Jan. 25, 1999, pp. 1–4.

Coactive Networks Bridges Gap between Control Systems and Corporate Data Networks with New Off–the–Shelf Router Family, *Coactive* (press release), Author: unknown, Jun. 8, 1998, pp. 1–6.

Coactive Networks Expands Support for Management and HMI Applications, *Coactive* (press release), Author: unknown, Nov. 2, 1998, pp. 1–4.

Coactive Networks Introduces Multi–Service Home Control Network Access to U.S. Market *Coactive* (press release), Author: unknown, Feb. 16, 1999, pp. 1–4.

Coactive Networks Names Gus Ezcurra Vice President of Sales, *Coactive* (press release), Author: unknown, Jul. 20, 1998, pp. 2.

Coactive Networks Names Janice Roberts, 3Com Senior VP, to Board of Directors, *Coactive* (press release), Author: unknown, Jun. 2, 1998, pp. 2.

Coactive Networks Powers Innovative Energy Management Solution, *Coactive* (press release), Author: unknown, Jan. 5, 2001, pp. 1–4.

Coactive Networks President Named to LonMark Board of Directors;, *Coactive* (press release), *Coactive* (press release); Author: unknown; Jun. 14, 1998, pp. 1–3.

Coactive Networks Shatters Price Barriers with New IP Gateway to Home Control Systems, *Coactive* (press release) Author: unknown, Oct. 26, 1998, pp. 1–4.

Coactive Networks to Supply Internet–Based Home Gateways for up to 400,000 Customers; First Phase of Deliveries Valued at US$22 Million, *Coactive* (press release), author: unknown, Oct. 25, 1999, pp. 1–8.

Coactive Networks Unveils the First Full–Service Residential Getaway, *Coactive* (press release), author: unknown, May 3, 2000, pp. 1–4.

Coactive Networks, Inc., A New Solution for Offering Multiple Telemetry Services to the Home, *Coactive*, 1999, pp. 1–8.

Coactive Networks, Inc., Coactive Connector® 1000 Series, *Coactive*, 2000, pp. 1–4.

Coactive Networks, Inc., Corporate Backgrounder, *Coactive*, 2001, pp. 1–6.

Coactive Networks, Inc., Corporate Fact Sheet, *Coactive*, 2001, pp. 2.

Coactive Networks, Inc., Router–LE: Remote Access to LonWorks Over Ethernet, *Coactive*, 1998, pp. 1–4.

Coactive Networks, Inc., Router–LL: Connect LonWOrks Networks Across Internet Protocol, *Coactive*, 1998, pp. 1–4.

Coactive Receives $2 Million in Funding, *Coactive* (press release), *Coactive* (press release); Author: unknown; Oct. 15, 1997, pp. 3.

Coactive Receives First Round of Venture Funding Investors Embrace Control Network Connectivity Technology, *Coactive* (press release), Author: unknown, Dec. 1, 1997, pp. 2.

Corcoran et al., Browser–Style Interfaces to a Home Automation Network, *IEEE Transactions on Consumer Electronics*, vol. 43, No. 4, Nov. 1997, pp. 1063–1069.

Corcoran et al., CEBus Network Access via the World–Wide–Web, available at http://ieeexplore.ieee.org/xpl/freeabs_all.jsp?arnumber=517285, on Mar. 29, 2009, *Paper* published on *Consumer Electronics*, 1996, Digest of Technical Papers, pp. 236.

Corson et al., Internet–Based Mobile *Ad Hoc* Networking, *IEEE Internet Computing*, Jul.–Aug. 1999, pp. 63–70.

Custom Solutions, Inc., Acessories, available at http://web.archive.org/web/ 19981206221844/www.csi3.com/hv_p4.htm on Feb. 27, 2009, pp. 1–3.

Custom Solutions, Inc., HomAtion 2000 for HomeVision, *Press Release*, available at http://web.archive.org/web/19981207075734/www.csi3.com/HF_PR_0 on Feb. 27, 2009, pp. 1–2.

Custom Solutions, Inc., HomeVision Description, available at http://web.archive.org/web/19981206004955/http://www.csi3.com/HV.htm on Mar. 2, 2009, pp. 1–14.

Custom Solutions, Inc., HomeVision–PC Description, available at http://web.archive.org/web/19981205094024/http://www.csi3.com/hv_pc.htm on Mar. 2, 2009, pp. 1–6.

Custom Solutions, Inc., HomeVision–PC Software, available at http://web.archive.org/web/19990224053817/http://www.csi3.com/hv_p3pc.htm on Feb. 27, 2009, pp. 1–2.

Custom Solutions, Inc., HomVision–PC Version 2.62, *Owner's Manual* (1997) pp. 1–234.

Custom Solutions, Inc., Media Information, Feb. 16, 1999, available at http://web.archive.com/web/19990502073249/www.csi3.com/hv_media.htm on Feb. 27, 2009, pp. 1.

Custom Solutions, Inc., Using Enerzone StatNet Thermostats with HomeVision (1998) pp. 1–16.

DTE Energy Technologies Selects Coactive Networks Internet Getaways to Roll Out New Class of E–Services to Businesses, *Coactive* (press release) Author: unknown, May 3, 2000, pp. 1–4.

DTE Energy Technologies Selects Coactive Networks to Power Distributed Generation Solutions Worldwide, *Coactive* (press release), Author: unknown, Aug. 1, 2001, pp. 1–4.

Echelon corporation Demonstrates Internet Connectivity in Digital Home Applications at 1999 International Consumer Electronics Show, *Home Toys* (press release); Author: unknown; Dec. 15, 1998, available at http://hometoys.com/htinews/dec98/releases/echelon03.htm on Apr. 22, 2009, pp. 1–4.

Eight Leading Controls Companies Join Coactive Partner Program, *Coactive* (press release), Author: unknown, Aug. 21, 2000, pp. 1–4.

Elson et al., Fine–Grained Nnetwork Time Synchronization Using Reference Broadcasts; *UCLA Computer Science Department;* May 17, 2002, pp. 1–14.

Ephremides et al., A Design Concept for Reliable Mobile Radio Networks with a Frequency Hopping Signaling, *IEEE;* 1987, pp. 56–73.

Estrin et al., Next Century Challenges: Scalable Coordination in Sensor Networks, *ACM,* 1999, pp. 263–270.

Frankel, Packet Radios Provide Link for Distributed Survivable Command Control Communications in Post–Attack Scenarios, Microwave System News, Jun. 1983, Circle Reader Service No. 77, pp. 80–108.

GE Security, NetworX NX–4, 2004, pp. 1–2.

GE Security, NetworX NX–548E, 2006, pp. 1–2.

Gerla et al., Multicluster, mobile, multimedia radio network, *CSD, UCLA; Baltzer Journals;* Jul. 12, 1995, pp. 1–26.

Guardian Alarms, Inc., Home Security System—Model 7068 Digital Dialer Interface, Author: unknown, available at www.guardianalarms.net, 2007, pp. 1.

Guardian Alarms, Inc., Security Company—Home Alarm System Monitoring—AES 7067 IntelliTap–II Digital Dialer Interface, Author: unknown, available at www.guardianalarms.net, 2007, pp. 1.

Guardian Alarms, Inc., Security System—Alarm System Monitoring—7160 EZ Router, Author: unknown, available at www.guardianalarms.net, 2007, pp. 1.

Guardian Alarms, Inc., Security System—Alarm System Monitoring—NET 7000, Author: unknown, available at http://www.guardianalarms.net, 2007, pp. 1.

Guardian Alarms, Inc., Security System—Alarm System Monitoring—Radionics FDX, Author: unknown, available at wwww.guardianalarms.net, 2007, pp. 1.

HAI Omni, Features & Specifications, *Home Automation, Inc.,* available at http://web.archive.org/web/19970216055832/www.homeauto.com/omni on Feb. 17, 2009, pp. 1–6.

Home Automation, Inc. *Home Page,* HAI Omni: Features & Specifications, *Home Automation, Inc.* available at http://web.arquive.org/web/19961219004403/http://www.homeauto.com(archived web page) on Feb. 17, 2009; Author: unknown; pp. 1.

Home Toys, Inc., HTINews Review, available at http://www.hometoys.com/htinews/aug97/reviews/homevis/homevis1.htm on Mar. 2, 2009, pp. 1–26.

Honeywell, Inc., Honeywell Home Control Version 2.0 Demonstration, available at http://web.arquive.org/web/19980630195929/www.hbc.honeywell.com/ on Mar. 5, 2009, (7 pages).

Hong et al., U.S. Lighting Market Characterization, vol. II: Energy Efficient Lighting Technology Options, Sep. 30, 2005, *Report* prepared for Building Technologies Program, Office of Energy Efficiency and Renewable Energy, pp. 1–36.

Hotel Technology Next Generation, *A Guide for Understanding Wireless in Hospitality, An HTNG White Paper,* Jun. 2006, (Jayne O'Neill, ed.), pp. 1–77.

How Does the New Power Company Deliver on the Promise of Energy Reconstructing?, *New Power* (press release), Author: unknown, May 31, 2001, pp. 1–6.

Important Dealer Notification—Honeywell AlarmNet–M Network Alert, Source: unknown; Author: unknown; Apr. 2007, pp. 1.

IOConnect Architecture™, *Coactive,* 2001, pp. 1–4.

Jacobsen, The Building Blocks of a Smart Sensor for Distributed Control Networks, *IEEE Technical Applications Conference Northcon,* Nov. 4–6, 1998, pp. 285–290.

JDS Technologies, Stargate Interactive Automation System, 1998, pp. 1–2.

JDS Technologies, Stargate, *Operation Manual,* Mar. 2000, pp. 1–114.

JDS Technologies, *Support: Protocol Specifications,* available at http://jdstechnologies.com/protocol.htm, on Feb. 16, 2009, pp. 1–32.

JDS Technologies, Web Xpander, Installation and Operation Manual, Feb. 2004, pp. 1–34.

Johnson Controls, Inc., LonWorks®Digital Controller, 1998, pp. 1–12.

Keltron's Home Page with Frames, *Index,* available at http://web.archive.org/web/19990831161957//http://www.keltroncorp.com, on Mar. 24, 2009, pp. 1.

Kemp, Home Automation Application Guide, Applications for Home Automation in Any Home, vol. 1, 2000, pp. 1–106.

Khan et al., Advances in Packet Radio Technology, IEEE Nov. 1978, vol. 66, No. 11, pp. 1468–1496.

Khan, Robert E., Issues in Distributed Routing for Mobile Packet Radio Network, IEEE 1982, pp. 233–238.

JDS Technologies, TimeCommander, TimeCommander Plus, *User Guide,* Jun. 1998, pp. 1–95.

Kohno et al., An Adaptive Sensor Network System for Complex Environments, in Intelligent Autonomous Systems (Kakazu et al., eds), *IOS Press,* 1998, pp. 21–28.

Lee et al., Distributed Measurement and Control Based on the IEEE 1451 Smart Transducer Interface Standards, Proceedings of the 16th IEEE Instrumentation and Measurement Technology Conference, vol. 1, May 24–26, 1999, *IEEE,* pp. 608–613.

Leviton Manufacturing Co., Inc., *The DECORA® Collection of Designer Devices,* 2006, pp. 1–85.

Lin et al., CMOS Front End Components for Micropower RF Wireless Systems; EED, *UCLA Electrical Engineering Department;* 1998, pp. 1–5.

Linear Corporation, Supervised Digital Security Transmitters TX–91, TX–92, TX–94, *Operation Instructions,* 1993, pp. 1.

Linear Corporation, Supervised Digital Security Trasmitter T–90, *Installation Instructions,* 2006, pp. 1–2.

Linear Corporation, Supervised Wireless Receiver and Zone Expander SRX–64A, *Installation Instructions,* 2003, pp. 1–2.

Local and Metropolitan Area Networks: Wireless Medium Access Control (MAC) and Physical (PHY) Specifications, Annex A: Protocol Implementation Conformance Statement (PICS) Proforma, Author: unknown; *IEEE,* Nov. 1997, pp. 1–75.

Local and Metropolitan Area Networks: Wireless Medium Access Control (MAC) and Physical (PHY) Specifications, Author: unknown; *IEEE,* Nov. 1997, pp. 1–98.

Pottie, Awairs Mini–Site Review [Presentation], *Rockwell Science Center;* Feb. 23, 1998; pp. 1–58.

Long Range Radio, *AlarmNet®,* Author: unknown; Date; unknown, pp. 1–10.

LonTalk Protocol, LonWorks™ Engineering Bulletin, *Echelon Corp.;* Author: unknown; Apr. 1993, pp. 1–27.

LonWorks® Products, 1998, *Version A, Echelon Corp.,* pp. 1–21.

LonWorks® Router User's Guide, *Echelon Corp.;* Author: unknown; 1995, pp. 1–136.

LonWorks® SMX™ Transceiver, datasheet, *Echelon Corp.;* Author: unknown; 1997, pp. 1–18.

Lutron Electronics Co. Inc., *Homeowner's Guide for the RadioRA® Quick Start Package,* 2004, pp. 1–8.

Lutron Electronics Co. Inc., *How to retrofit RadioRA® Wall–Mounted Master Control into an existing home,* Application #41, 2004, pp. 1–2.

Lutron Electronics Co. Inc., *IR/RS232 Interface for Bang & Olufsen® Beo4® Remote Control and RadioRA®,* Application Note #119, 2004, pp. 1–3.

Lutron Electronics Co. Inc., *Level Capture with a RadioRA® Master Control,* Application Note #73, 2003, pp. 1–3.

Lutron Electronics Co. Inc., *Modem Installation for Home-Works®,* Application Note #9, 1998, pp. 1–4.

Lutron Electronics Co. Inc., *RadioRA® RA–IR–KIT Installation Instructions,* Application Note #61, 2000, pp. 1–4.

Lutron Electronics Co. Inc., *RadioRA® RF Signal Repeater,* 1998, pp. 1–2.

Lutron Electronics Co. Inc., *RadioRA® Single–Location Switch, Controls for Permanently Installed Lighting Loads,* 1998, pp. 1–2.

Lutron Electronics Co. Inc., *RadioRA® Table Lamp Controls, Dimming and Switching Controls for Table and Floor Lamps,* 1999, pp. 1–2.

Lutron Electronics Co. Inc., *Using a Photocell with the RadioRA® System,* Application Note #45, 1998, pp. 1–4.

Lutron Electronics Co. Inc., *Using an Astronomic Timeclock with the RadioRA® System,* Application Note #42, 1998, pp. 1–2.

Lutron Electronics Co. Inc., *Using the RadioRA® System to Activate Scenes 5–16 on a GRAFIK Eye® Control Unit,* Application Note #48, 1998, pp. 1–4.

Lutron Electronics Co. Inc., *Using the RadioRA® Telephone Interface,* Application Note #46, 1998, pp. 1–2.

Maltz et al., Experiences Designing and Building a Multi–Hop Wireless *Ad Hoc* Network Testbed, *Paper,* Mar. 5, 1999, available at http://reportsarchive.adm.cs.cmu.edu/anon/1999/CMU–C S–99–116.pdf, pp. 1–20.

Maltz et al., Experiences Designing and Building a Multi–Hop Wireless *Ad Hoc* Network Testbed, *Paper,* Mar. 5, 1999, pp. 1–22.

Markie et al., LonWorks and PC/104: A winning combination, *PC/104 Embedded Solutions;* Summer 1998, pp. 1–8.

Martel et al., Home Automation Report: A Modular Minimum Complexity, High–Resolution and Low Cost Field Device Implementation for Home Automation and Healthcare, *MIT;* Publisher: unknown; Mar. 31, 1998; pp. 1–29.

Mozer et al., The Neural Network House: An Overview, in L. Niklasson & Boden (Eds,), *Current trends in connectionism* (pp. 371–380); Hillsdate: Erlbaun, 1995; pp. 1–9.

MTC Teams with Coactive Networks to Deliver an Advanced Energy Communications and Management Solution, *Coactive* (press release), Author: unknown, Feb. 5, 2001, pp. 1–4.

Negus et al., HomeRF™ and SWAP: Wireless Networking for the Connected Home, *ACM SIGMOBILE Mobile Computing and Communications Review,* vol. 2, Issue 4, Oct. 1998, available at http://portal.acm.org/citation.cfm?id=1321400.1321401, on Mar. 29, 2009, pp. 1–2.

NewPower and Coactive Networks Announce Strategic Alliance to Deliver the Connected Home, *Coactive* (press release), Author: unknown, Mar. 14, 2001, pp. 1–4.

NX–480 Wireless Motion Sensor, document No. 466–1479 Rev. D;, *Caddx Controls;* AuAuthor: unknown; CADDX Controls, Inc.; May 1, 1998, pp. 1.

Omni Installation Manual, Author: unknown; *Home Automation, Inc.,* Oct. 1997, pp. 1–88.

Omni user manual, *Home Automation, Inc.;* Author: unknown; 1997.

Park et al., SensorSim: A Simulation Framework for Sensor Networks, *ACM,* 2000, pp. 104–111.

Pittway Corporation, Company History, available at http://www.fundinguniverse.com/company–histories/Pittway–Corporation Mar. 6, 2009, pp. 1–5.

Pottie et al., Wireless Integrated Network Sensors: Towards Low Cost and Robust Self–Organizing Security Networks; *EED, UCLA; Rockwell Science Center; SPIE* vol. 3577, Nov. 1, 1998, pp. 86–95 (20 pages).

Pottie et al., Wireless Integrated Network Sensors, *UCLA; Communications of the ACM,* vol. 43, No. 5, May 2000, pp. 51–58.

Pottie, Awairs: Mini–Site Review, *Project Status,* UCLA: Rockwell Science Center, Feb. 23, 1998, pp. 1–58.

Rabaey et al., PicoRadio Supports *Ad Hoc* Ultra–Low Power Wireless Networking, *Computer;* IEEE, Jul. 2000, pp. 42–48.

Raji, Control Networks and the Internet, *Echelon Corp.;* 1998, pp. 1–39.

Raji, End–to–End Solutions with LonWorks® Control Technology: Any Point, Any Time, Any Where, *Echelon Corp.;,* 1998, pp. 1–30.

Smart Home Technology Leader Intelli Selects Coactive Networks Internet Getaways, *Coactive* (press release), Author: unknown, Sep. 11, 2000, pp. 1–4.

Sohrabi et al., Protocols for Self–Organization of a Wireless Sensor Network, *IEEE Personal Communications,* Oct. 2000, pp. 16–27.

Subramanian et al., An Architectural for Building Self–Configuration Systems, *IEEE,* 2000, pp. 63–73.

The New Power Company Announces Revolutionary Energy–Saving Program that Gives Consumers Remote Control of their Thermostats via the Internet, *NewPower* (press release), Author: unknown, Apr. 24, 2001, pp. 1–6.

The SNVT Master Master List and Programmer's Guide, *Echelon Corp.;* Author: unknown: Mar. 1996, pp. 1–23.

Totolo, HomeRF, A New Protocol on the Horizon, Feb. 1999, available at http://www.hometoys.com/htinews/feb99/articles/totolo/totolo.htm, on Mar. 2, 2009, pp. 1–3.

Vardhan et al., Wireless Integrated Network Sensors (WINS): Distributed In Situ Sensing for Mission an Flight Systems, *2000 IEEE Aerospace Conference Proceedings;* 2000, pp. 459–463 (12 pages).

Vista–40 2–Partition Security System Installation and Setup Guide; *Ademco,* Author: unknown; Jul. 1, 1998.

Weiser, Some Computer Science Issues in Ubiquitous Computing, Mar. 23, 1993, *Communications of the ACM;* Jul. 1993, pp. 1–13.

Weiser, The Computer for the $21^{st}$ Century, *Scientific American;* Sep. 1991, available at http://www.ubiq.com/hypertext/weiser/SciAmDraft3.html on Apr. 20, 2009, pp. 1–9.

Wilson, Lexicon 700t Touchscreen Remote, Jan. 1, 1999, available at http://avrev.com/home –theater–remotes–system–control/remotes–system on Mar. 2, 2009, pp. 1–3.

Wireless Accessories, catalog pages, *Home Automation, Inc.;* available at http://web.archive.org/web/19970216060056/www.homeauto.com/ on Feb. 17, 2009(archived web page);, Author: unknown; pp. 1–2.

Wright (ed.), Home–automation networks mature while the PC industry chases a new home LAN, *EDN Design Feature,* Date: unknown, pp. 1–9.

Wunnava et al., Web Based Remote Security System (WRSS) Model Development, *IEEE,* Apr. 7–9, 2000, pp. 379–382.

X10, CK11A ActiveHome, Home Automation System, *Owner's Manual,* Oct. 23, 1997, pp. 1–56.

X10.com: The Supersite for Home Automation, *What's in the Kit,* available at http://web.archive.org/web/19991111133653/www.com /products/x, on Mar. 2, 2009, pp. 1–2.

X10.com: The Supersite for Home Automation, *Wireless Remote Control System (RC5000)*, available at http://web.archive.org/web/1999111453227/www.x10.com/products/x1, on Mar. 2, 2009, pp. 1.

X10: The Supersite for Home Automation, *Transceiver Module,* available at http://web.archive.org/web/20000229141517/www.x10.com/products/x, on Mar. 2, 2009, pp. 1.

Young, A Unifying Dynamic Distributed Multichannel TDMA Slot Assignment Protocol, working paper, *Rockwell International;* Oct. 25, 1995, pp. 1–29.

Young, Usap: A Unifying Dynamic Distributed Multichannel TDMA Slot Assignment Protocol, *Rockwell International Communication Systems Division; IEEE;* 1996, pp. 235.

1997 Project Summary, Held Untethered Nodes, University of California at Los Angeles, available at http://web.archive.org/web/199812052324758/http://www.darpa.mil/leaving.asp.?url=http://www.janet.ucla.edu/glomo, Jul. 25, 2008, pp. 1–5.

1997 Project Summary, Mobile Versatile Radios (MoVeR), University of California at Los Angeles, available at http://web.archive.org/web/19990222140122/http://www.darpa.mil/leaving.asp.?url=http://www.janet.ucla.edu, Jul. 25, 2008, pp. 1–4.

1997 Project Summary, Towards a Wireless Overlay Internetworking Architecture, University of California at Berkeley, available at http://web.archive.org/web/19990202065939/http://www.darpa.mil/leaving.asp.?url=http://daedalus.cs.berkeley.edu, Jul. 25, 2008, pp. 1–8.

Alwan et al., Adaptive Mobile Multimedia Networks, IEEE Personal Communications, Apr. 1996, pp. 34–51.

Amir et al., An Evaluation of the Metricom Ricochet Wireless Network, CS 294–7 Class Project, Department of Electrical Engineering and Computer Science of the University of California at Berkeley, Publisher: unknown, May 7, 1996, pp. 1–20.

Amir, The Ricochet System Architecture (May 7, 1996), available at http://www.lariat.org/Berkeley/node2.html, Sep. 17, 2009, pp. 1–4.

Ball et al., Reliability of Packet Switching Broadcast Radio Networks, IEEE Transactions on Circuits and Systems, vol. CAS–23, No. 12, Dec. 1976, pp. 806–813.

Brayer, Implementation and Performance of Survivable Computer Communication with Autonomous Decentralized Control, IEEE Communications Magazine, Jul. 1983, pp. 34–41.

Brownrigg et al., Development of a Packet–Switching Network for Libarary Automation, Proceedings of The National Online Meeting Apr. 12–14, 1983, pp. 67–74.

Brownrigg et al., Electrons, Electronic Publishing, and Electronic Display, Information Technology and Libraries (Sep. 1985), pp. 201–207.

Brownrigg et al., Implementing Library Automation Plans in a University Computing Environment, Planning for Computing in Higher Education 5, EDUCOM Series in Computing and Telecommunications in Higher Education, 1980, pp. 215–225.

Brownrigg et al., Online Catalogues: Through a Glass Darkly, Information Technology and Libraries, Mar. 1983, pp. 104–115.

Brownrigg et al., Packet Radio for Library Automation, Information Technology and Libraries 3 (Sep. 1984), pp. 229–244.

Brownrigg et al., Packet Switching and Library Automation: A Management Perspective Proceedings of the $45^{th}$ ASIS Annual Meeting Oct. 17–21, 1982, vol. 19, pp. 54–57.

Brownrigg et al., Technical Services in the Age of Electronic Publishing, Library Resource & Technical Services, Jan./Mar. 1984, pp. 59–67.

Brownrigg et al., User Provided Access to the Internet, available at http://web.simmons.edu/~chen/nit/NIT'92/033–bro.htm, Jun. 9, 2005, pp. 1–6.

Brownrigg, Continuing Development of California State Radio Packet Project, Proceedings of the ASIS 1992 Mid–Year Meeting (Silver Spring, MD: American Society for Information Science, 1992), pp. 97–100.

Bruninga, A Wordlwide Packet Radio Network, Signal, vol. 42, No. 10, Jun. 1988, pp. 221–230.

Bult et al, Low Power Systems for Wireless Microsensors, UCLA Electrical Engineering Department, 1996 ISLPED, pp. 1–5.

Carlisle, Edison's Netcomm Project (Sep. 1988), 1989 IEEE, pp. B5–1 to B5–4.

Chen et al., Route Optimization and Location Updates for Mobile Hosts, 1996 IEEE, Proceedings of the $16^{th}$ ICDCS, pp. 319–326.

Cisco Systems, Inc., Enhanced Interior Gateway Routing Protocol, Cisco Systems, Inc., Updated Sep. 9, 2005, pp. 1–44.

Cisco Systems, RFC1812–Requirements for IP Version 4 Routers, Fred Baker ed. (Jun. 1995), available at http://www.faqs.org/rfcs/rfc1812.html, Sep. 14, 2009, pp. 1–129.

Cleveland, Performance and Design Considerations for Mobile Mesh Networks, Milcom '96 Conference Proceedings, vol. 1 of 3, Oct. 22–24, 1996, pp. 245–249.

Cohen et al., IP Addressing and Routing in a Local Wireless Network, 1992 IEEE, 1992, pp. 626–632.

Corson et al., Architectural Considerations for Mobile Mesh Networking, Milcom '96 Conference Proceedings vol. 1 of 3, Oct. 22–24, 1996, pp. 225–229.

Davies et al., The Application of Packet Switching Techniques to Combat Net Radio, Proceedings of the IEEE, vol. 75, No. 1, Jan. 1987, pp. 43–55.

Davies, et al., Internetworking in the Military Environment, Proceedings of IEEE Infocom '82 (1982) pp. 19–29.

Davis et al., Knowledge–Based Management of Cellular Close Fraud, IEEE (1992), pp. 230–234.

Diaz, Intervehicular Information System (IVIS): the Basis for a Tactical Information System, SAE International, Mar. 1994, pp. 1–14.

Distributions, Networks, and Networking: Options for Dissemination; Workshop on Electronic Texts, Session III, available at http://palimpsest.stanford.edu/byorg/lc/etextw/sess3.html, Jul. 17, 2007, pp. 1–10, Author: unknown.

Dixon et al., Addressing, Bridging and Source Routing, IEEE Network, Jan. 1988, vol. 2, No. 1, pp. 25–32.

Eng et al., Bahama: A Broadband Ad–Hoc Wireless ATM Local–Area Network, 1995 IEEE International Conference on Communications, Jun. 18–22, 1995, pp. 1216–1223.

Estrin et al., RFC1940–Source Demand Routing: Packet Format and Forwarding Specification (Version 1), Network Working Group, May 1996, available at http://www.faqs.org/rfcs/rfc1940.html, Sep. 14, 2009, pp. 1–20.

Estrin et al., Source Demand Routing: Packet Format and Forwarding Specification (Version 1), Network Working Group, *Internet Draft*, Jan. 19, 1995, pp. 1–28.

Expert Report of Randy H. Katz, Ph. D, of *SIPCO, LLC et al. v. The Toro Company et al.,* Case No. 2:08–cv–00505.

Frank, Transmission of IP Datagrams Over NET/ROM Networks, ARRL Amateur Radio 7$^{th}$ Computer Networking Conference, Oct. 1988, pp. 65–70.

Frankel, Packet Radios Provide Link for Distributed, Survivable C3 in Post–Attack Scenarios, *MSN* (Jun. 1983), pp. 1–17.

Franz, HiperLAN—Der ETSI–Standard fur locale Funknetze, *NTZ,* Sep. 1995, 10 pages.

Fullmer, Collision Avoidance Techniques for Packet–Radio Networks, *Dissertation,* University of California at Santa Cruz, Jun. 1998, pp. 1–162.

Gale et al., The Impact of Optical Media on Information Publishing, Bulletin of the American Society For Information Science, vol. 12, No. 6, Aug./Sep. 1986, pp. 12–14.

Garbee, Thoughts on the Issues of Address Resolution and Routing in Amateur Packet Radio TCP/IP Networks, ARRL Amateur Radio 6$^{th}$ Computer Networking Conference, Aug. 1987, p. 56–58.

Garcia–Luna–Aceves et al., Wireless Internet Gateways (WINGS), 1997 IEEE, pp. 1271–1276.

Garcia–Luna–Aceves, A Fail–Safe Routing Algorithm for Multishop Packet–Radio Networks, IEEE Infocom '86, Technical Sessions: Apr. 8–10, 1986, pp. 434–442.

Garcia–Luna–Aceves, A Miminum–hop Routing Algorithm Based on Distributed Information, Elsevier Science Publishers, B.V. (North Holland), 1989, pp. 367–382.

Garcia–Luna–Aceves, Routing Management in Very Large Scale Networks, Elsevier Science Publishers, B.V. (North Holland), 1988, pp. 81–93.

Geier et al., Networking Routing Techniques and their Relevance to Packet Radio Networks, ARRL/CRRL Amateur Radio 6$^{th}$ Computer Networking Conference, London, Ontario, Canada, Sep. 1990, pp. 105–117.

Gerla et al., Multicluster, Mobile, Multimedia Radio Network, UCLA Computer Science Department; Baltzer Journals; Wireless Networks; Jul. 12, 1995, pp. 255–265.

Golden Power Manufacturing, 6030 PCT Programmable Communicating Thermostat, Author: unknown, 2007, pp. 1–3.

Golden Power Manufacturing, Ritetemp Universal Wireless Thermostat, Author: unknown, 2007, pp. 1–2.

Gower et al., Congestion Control Using Pacing In A Packet Radio Network, 1982 IEEE Military Communications Conference on Progress in Spread Spectrum Communications, vol. 1, Oct. 17–20, 1982, pp. 23.1–1 to 23.1–6.

Hahn et al., Packet Radio Network Routing Algorithms: A Survey, IEEE Communications Magazine, vol. 22, No. 11, Nov. 1984, pp. 41–47.

Hall, Tactical Internet System Architecture for Task Force XXI, 1996 IEEE, pp. 219–230.

Hamilton et al., Optimal Routing in Multihop Packet Radio Networks, 1990 IEEE, pp. 389–396.

Harrison, Microwave Radio In The British Telecom Access Network, Second IEE National Conference on Telecommunications, Conference Publication No. 300, Date: unknown, pp. 208–213.

Hedrick, An Introduction To IGRP, Rutgers, The State University of New Jersey, Center for Computers and Information Services, Laboratory for Computer Science Research, Aug. 22, 1991 (Updated Aug. 10, 2005), pp. 1–21.

Hedrick, Routing Information Protocol (Jun. 1988), RFC 1058, available at Http://Tools.Ietf.Org/Html/Rfc1058, Jun. 24, 2009, pp. 1–34.

Hinden et al., The DARPA Internet Gateway, RFC 823, Publisher: unknown, Sep. 1982, pp. 1–43.

Hruschka et al., Packet Radio, Drahtlose Datenubertragung im Amateurfunk, *Elektor,* Jun. 1991, pp. 54–57 and 84.

Hubner et al., A Distributed Multihop Protocol for Mobile Stations to Contact a Stationary Infrastructure, The Third IEE Conference on Telecommunications, Conference Publication No. 331, Date: unknown, pp. 204–207.

Jimenez–Cedeno et al., Centralized Packet Radio Network: A Communication Approach Suited for Data Collection in a Real–Time Flash Flood Prediction System, ACM–SAC 1993, pp. 709–713.

Johnson et al., Dynamic Source Routing in *Ad Hoc* Wireless Networks, *Paper,* Publisher: unknown, pp. 1–18.

Johnson et al., Dynamic Source Routing in *Ad Hoc* Wireless Networks, reprinted in Mobile Computing; Tomasz Imielinski and Hank Korth eds., 1996; Kluwer Academic Publishers, pp. 153–181.

Johnson et al., Protocols for Adaptive Wireless and Mobile Networking, IEEE Personal Communications, 3(1), Feb. 1996, pp. 1–18.

Johnson et al., Route Optimization in Mobile IP, *Internet Draft* (Nov. 28, 1994), available at http://www.monarch.cs.rice.edu/internet–drafts/draft–ietf–mobileip–optim–00.txt., Sep. 26, 2009, pp. 1–29.

Johson, Mobile Host Internetworking Using IP Loose Source Routing, Carnegie Mellon University CMU–CS–93–128, DARPA Order No. 7330, Feb. 1993, pp. 1–18.

Johnson, Routing in *Ad Hoc* Networks of Mobile Hosts, 1995 IEEE, pp. 158–163.

Johnson, Scalable and Robust Internetwork Routing for Mobile Hosts, 1994 IEEE, pp. 1–11.

Jubin et al., The DARPA Packet Radio Network Protocols, Proceedings of the IEEE, vol. 75, No. 1, Jan. 1987, pp. 21–32.

Jubin, Current Packet Radio Network Protocols, Proc. of the IEEE Infocom (Mar. 26–28, 1985), pp. 86–92.

Kaashoek et al., FLIP: An Internetwork Protocol for Supporting Distributed Systems, ACM Transactions on Computer Systems, vol. 11, No. 1, Feb. 1993, pp. 73–106.

Kahn et al., Advances in Packet Radio Technology, Proceedings of the IEEE, vol. 66, No. 11, Nov. 1978, pp. 1468–1496.

Kahn, The Organization of Computer Resources into a Packet Radio Network, IEEE Transactions on Communications, vol. COM–25, No. 1, Jan. 1977, pp. 169–178.

Kaiser et al., Low Power Wireless Integrated Microsensor (LWIM), *Program Mission, UCLA;* Jan. 1997.

Kaiser et al., Low Power Wireless Integrated Microsensors (LWIM), Requested for Support to Project, UCLA Electrical Engineering Department, Rockwell Science Center, Sep. 13, 1994, 71 pages.

Kaiser et al., Low Power Wireless Integrated Microsensors (LWIM); UCLA; Rockwell Science Center; LWIM Kickoff Meeting, Aug. 8, 1995, Presented to Dr. Ken Gabriel (ARPA), Dr. Elissa Sobolewski (ARPA), and Dr. Joseph Kielman (FBI), 62 pages.

Karn et al., Packet Radio in the Amateur Service, IEEE Journal on Selected Areas in Communications, vol. SAC–3, No. 3, May 1985, pp. 431–439.

Katz et al., The Bay Area Research Wireless Access Network (BARWAN) (Jun. 1996) (presentation paper), http://daedalus.cs.berkeley.edu/talks/retreat.6.97/BARWAN.597.ppt, pp. 1–66.

Kleinrock et al., Hierarchical Routing for Large Networks, Performance Evaluation, and Optimization, *Computer Networks 1* (1977), pp. 155–174.

Lauer et al., Survivable Protocols for Large Scale Packet Radio Networks, IEEE Global Telecommunications Conference, Nov. 26–29, 1984, vol. 1 of 3, pp. 468–471.

Lauer, Packet–Radio Routing, Routing in Communications Networks, Ch. 11 (1995) pp. 351–396.

Lewis et al., Packet–Switching Applique for Tactical VHF Radios, 1987 IEEE Military Communications Conference, Oct. 19–22, 1987, Conference Record vol. 2 of 3, pp. 449–455.

Lougheed et al., A Boder Gateway Protocol 3 (BGP–3), RFC 1267, (Oct. 1991), available at http://tools.letf.org/html/rfc1267, Jun. 24, 2009, pp. 1–36.

Lowe et al., Publishing Bibliographic Data on Optical Disks: A Prototypical Application and Its Implications, Third International Conference on Optical Mass Data Storage, Proceedings of SPIE, vol. 529, pp. 227–236.

Lynch et al., Application of Data Compression Techniques to a Large Bibliographic Database, Proceeding of the Seventh International Conference on Very Large Databases, Cannes, France, Sep. 9–11, 1981 (Washington, DC: IEEE Computer Society Press, 1981), pp. 435–447.

Lynch et al., Beyond the Integrated Library System Concept: Bibliographic Networking at the University of California, Proceedings of the Second National Conference on Integrated Online Library Systems Proceedings, Sep. 1984, pp. 243–252.

Lynch et al., Conservation, Preservation and Digitization, Energies for Transition: Proceedings of the Fourth National Conference of the Association of College and Research Libraries, Baltimore, MD, Apr. 9–12, 1986 (Chicago, IL: Association of College and Research Libraries, 1986), pp. 225–228.

Lynch et al., Document Delivery and Packet Facsimile, Proceedings of the $48^{th}$ ASIS Annual Meeting, vol. 22, Oct. 22–24, 1985, pp. 11–14.

Lynch et al., Electronic Publishing, Electronic Imaging, and Document Delivery, Electronic Imaging '86 (Boston, MA: Institute for Graphic Communication, Inc., 1986), pp. 662–667.

Lynch et al., Library Applications of Electronic Imaging Technology, Information Technology and Libraries, Jun. 1986, pp. 100–105.

Lynch et al., Racket Radio Networks: Architectures, Protocols, Technologies and Applications, Pergamon Press, 1ed., 1987, pp. 1–275.

Lynch et al., Public Access Bibliographic Databases in a Multicampus University Environment, Databases in the Humanities and Social Sciences—4, Proceedings of the International Conference on Databases in the Humanities and Social Sciences, Jul. 1987, Learned Information, Inc., 1989, pp. 411–419.

Lynch et al., The Telecommunications Landscape: 1986, Library Journal, Oct. 1, 1986, pp. 40–46.

MacGregor et al., Multiple Control Stations in Packet Radio Networks, 1982 IEEE Military Communications Conference on Progress in Spread Spectrum Communications, vol. 3, (Oct. 1982) pp. 10.3–1 to 10.3–5.

Mak et al., Design Consideration for Implementation of Large Scale Automatic Meter Reading Systems, IEEE Transactions on Power Delivery, vol. 10, No. 1, Jan. 1995, pp. 97–103.

Malkin, RFC 2453, RIP Version 2 (Nov. 1998), available at http://tools.ietf.org/html/rfc2453, Jun. 24, 2009, pp. 1–40.

Maltz, Experiences Designing and Building a Multi–Hop Wireless *Ad Hoc* Network Testbed, *Paper,* Mar. 5, 1999, School of Computer Science Carnegie Mellon University, pp. 1–20.

Maltz, On–Demand Routing in Multi–Hop Wireless Mobile Ad Hoc Networks, *Thesis,* May 2001, pp. 1–192.

McQuillin et al., The ARPA Network Design Decisions, Computer Networks, vol. 1, No. 5, Aug. 1977, pp. 243–289.

McQuillan et al., The New Routing Algorithm for the ARPANET, IEEE Transactions on Communications, vol. COM–28, No. 5, May 1980, pp. 711–719.

Mills, Exterior Gateway Protocol Formal Specification (Apr. 1984), RFC 904, available at http://tools.ietf.org/html/rfc904, Jun. 24, 2009, pp. 1–32.

Moy, RFC 2328, OSPF Version 2 (Apr. 1998), available at http://tools.ietf.org/html/rfc2328, Jun. 24, 2009, pp. 1–245.

Murthy et al., An Efficient Routing Protocol for Wireless Networks, Mobile Networks and Applications 1 (1996), pp. 183–197.

Nextgen Searches, *IPCO* v. *The Wireless Sensor Network Industry?* Special Report on *IPCO* v. *ONCOR et al.,* Corporate Manager's Edition, 2009, pp. 1–16.

Oran (ed.), OSI IS–IS Intra–Domain Routing Protocol, RFC 1142 (Feb. 1990), available at http://tools.ietf.org/html/rfc1142, Jun. 24, 2009, pp. 1–665.

Perkins et al., Ad–Hoc On–Demand Distance Vector Routing "AODV", http://moment.cs.ucsb.edu/AODV/aodv.html, Aug. 25, 2009, pp. 1–5.

Perkins et al., Continuous, transparent network access for portable users, A Mobile Networking System Based on Internet Protocol, IEEE Personal Communications, First Quarter 1994, pp. 32–41.

Perkins et al., Highly Dynamic Destination–Sequenced Distance–Vector Routing (DSDV) for Mobile Computers; SIGCOM Conference on Communications Architectures, Protocols ans Applications, London England UK (Aug. 1994); pp. 234–244.

Perkins et al., Highly Dynamic Destination–Sequenced Distance–Vector Routing (DSDV) For Mobile Computers, ACM SIGCOM Computer Communications Review archive vol. 24, Issue 4 (Oct. 1994), pp. 234–244.

Perkins et al., Mobility Support in IPv6, *Internet Draft* (Sep. 22, 1994), available at http://www.monarch.cs.rice.edu/internet–draft/draft–perkins–ipv6–mobility–sup–oo.txt., Sep. 26, 2009, pp. 1–13.

Perkins et al., RFC3561—Ad Hoc On–Demand Distance Vector (AODV) Routing (Jul. 2003), available at http://tools.ietf.org/html?rfc3561, Aug. 25, 2009, pp. 1–38.

Postel (Editor), Internet Protocol, DARPA Internet Program Protocol Specification, RFC 791 (Sep. 1981), Information Sciences Institute, University of So. Cal., pp. 1–45.

Postel (Editor), Internet Protocol, DARPA Internet Program Protocol Specification, RFC 791 (Sep. 1981), Information Sciences Institute, University of So. Cal., available at http://www.rfc–editor.org/rfc/rfc791.txt on Sep. 14, 2009, 51 pages.

Pottie et al., Adaptive Wireless Arrays Interactive Recconaissance, Surveillance, and Target Acquisition in Small Unit Operations (AWAIRS); Lower Power Wireless Integrated Microsensors (LWIM), Presented to Dr. E. Carapezza, Dr. D. Lao and Lt. Col. J. Hernandez, *UCLA, Rockwell Science Center;* Mar. 21, 1997, pp. 1–110.

Pottie, Wireless Sensor Networks, ITW 1998, Jun. 22–26, 1998, available at http://dantzig.ee.ucla.edu/oclab/Pottie.html, 2 pages.

Radlherr, Datentransfer Ohne Draht und Telefon, *Funkschau*, Nov. 1991, pp. 49–52.

Rehkter et al., A Border Gateway Protocol 4 (BGP–4), RFC 1771, (Mar. 1995), available at http://tools.ietf.org/html.rfc1771, Jun. 24, 2009, pp. 1–58.

Rosen, Exterior Gateway Protocol (EGP), RFC 827 (Oct. 1982), available at http://tools.ietf.org/html/rfc827, Jun. 24, 2009, pp. 1–48.

Saltzer et al., Source Routing for Campus–wide Internet Transport (Sep. 15, 1980), available at http://groups.csail.mit.edu/ana/publications/pubPDFs/Sourcerouting.html, Sep. 21, 2009, pp. 1–14.

Schulman et al., SINCGARS Internet Controller–Heart of the Digitized Battlefield, Proceedings of the 1996 Tactical Communications Conference, Apr. 30–May 2, 1996, pp. 417–421.

Shacham et al., A Packet Radio Network for Library Automation; 1987 IEEE Military Communications Conference, vol. 2, at 21.3.1 (Oct. 1987); pp. 456–462.

Shacham et al., Dynamic Routing for Real–Time Data Transport in Packet Radio Networks, IEEE Proceedings of INFOCOM '82, pp. 152–159.

Shacham et al., Future Directions In Packet Radio Architectures And Protocols, Proceedings of The IEEE, vol. 75, No. 1, Jan. 1987, pp. 83–99.

Shacham et al., Future Directions In Packet Radio Technology, Proceedings of IEEE Infocom 85, Mar. 26–28, 1985, pp. 93–98.

Shacham et al., Packet Radio Networking, Telecommunications vol. 20, No. 9, Sep. 1986, pp. 42,43,46,48,64 and 82.

Shoch, Inter–Network Naming, Addressing and Routing, Internet Experiment Note # 19, Notebook section 2.3.3.5, Xerox Palo Alto Research Center, Jan. 29, 1978, Publisher: unknown, pp. 1–9.

Sunshine, Addressing Problems in Multi–Network Systems (Apr. 1981), available at ftp://ftp.isi.edu/in–notes/ien/ien178.txt, Sep. 14, 2009, pp. 1–26.

Sunshine, Addressing Problems in Multi–Network Systems, Proceedings INFOCOM '82, 1982 IEEE, pp. 12–18.

Sunshine, Network Interconnection and Gateways, IEEE Journal on Selected Areas in Communications, vol. 8, No. 1, Jan. 1990, pp. 4–11.

Sunshine, Source Routing in Computer Networks, Information Sciences Department of The Rand Corporation (1977), Publisher: unknown, pp. 29–33.

Technology Review, Metricom's Ricochet Packet Radio Network, Ham Radio Online, 1996, Author: unknown, pp. 1–3.

Tobagi–et–al., Packet Radio and Satellite Networks, IEEE Communications Magazine, vol. 22, No. 11, Nov. 1984, pp. 24–40.

Toh, A Novel Distributed Routing Protocol to Support Ad–Hoc Mobile Computing, Conference Proceedings of the 1996 IEEE Fifteenth Annual International Phoenix Conference on Computers and Communications, Mar. 27–29, 1996, pp. 480–486.

Varadhan et al., SDRP Route Construction, Internet Draft, available at draft–ietf–sdr–route–construction–01.{ps,txt}, Feb. 27, 2005, pp. 1–12.

Westcott et al., A Distributed Routing Design for a Broadcast Environment, 1982 IEEE Military Communications Conference on Progress in Spread Spectrum Communications, vol. 3, Oct. 17–20, 1982, pp. 10.4.1–10.4.5.

Westcott et al., Hierarchical Routing for Very Large Networks, IEEE Military Communications Conference, Oct. 21–24, 1984, Conference Record vol. 2, pp. 214–218.

Westcott, Issues in Distributed Routing for Mobile Packet Radio Networks, Proceedings of Computer Networks Compcon '82, Sep. 20–23, 1982, pp. 233–238.

Wey et al., Clone Terminator: An Authentication Service for Advanced Mobile Phone System; IEEE (1995); pp. 175–179.

Wikipedia, Ad Hoc On–Demand Distance Vector Routing, available at http://en.wikipedia.org/wiki/Ad_Hoc_On–Demand_Distance_Vector_Routing on Aug. 25, 2009, pp. 1–3.

Wikipedia, Bellman–Ford Algorithm, available at http://en.wikipedia.org/Wiki//Bellman–Ford, Jun. 24, 2009, pp. 1–4.

Wikipedia, Border Gateway Protocol, available at http://en.wikipedia.org/wiki/Border_Gateway_Protocol, Jun. 24, 2009, pp. 1–13.

Wikipedia, Distance–Vector Routing Protocol, available at http://en.wikipedia.org/wiki/Distance–Vector_Routing_Protocol, Jun. 24, 2009, pp. 1–4.
Wikipedia, Enhanced Interior Gateway Routing Protocol, available at http://en.wikipedia.org/wiki/EIGRP, Jun. 24, 2009, pp. 1–7.
Wikipedia, Exterior Gateway Protocol, available at http://en.wikipedia.org/wiki/Exterior_Gateway_Protocol, Jun. 24, 2009, pp. 1.
Wikipedia, Interior Gateway Routing Protocol, available at http://en.wikipedia.org/wiki/Interior_Gateway_Routing_Protocol, Jun. 24, 2009, pp. 1–2.
Wikipedia, IS–IS, available at http://en.wikipedia.org/wiki/IS–IS, Jun. 24, 2009, pp. 1–3.
Wikipedia, L. R. Ford, Jr., available at http://en.wikipedia.org/wiki/L._R._Ford,_Jr, Jun. 24, 2009, pp. 1.
Wikipedia, Open Shortest Path First, available at http://en.wikipedia.org/wiki/Open_Shortest_Path_First, Jun. 24, 2009, pp. 1–9.
Wikipedia, Richard E. Bellman, available at http://en.wikipedia.org/wiki/Richard_Bellman, Jun. 24, 2009, pp. 1–3.
Wikipedia, Routing Information Protocol, available at http://en.wikipedia.org/wiki/Routing_Information_Protocol, Jun. 24, 2009, pp. 1–4.
Wu, Distributed System Design; CRC Press (1999); pp. 177–180 and 204.
Zander et al., The SOFTNET Project: A Retrospect, 1988 IEEE, pp. 343–345.

US 7,103,511 C1

EX PARTE
REEXAMINATION CERTIFICATE
ISSUED UNDER 35 U.S.C. 307

THE PATENT IS HEREBY AMENDED AS
INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 1-12 and 27-29 is confirmed.

Claims 13-26 are cancelled.

New claims 30-64 are added and determined to be patentable.

30. *The wireless communication device of claim 1, wherein the site controller is configured to send a command message to the second wireless transceiver, wherein the command message includes a "to address" portion, and wherein the "to address" portion identifies the second wireless transceiver and identifies a device type of the second remote device.*

31. *The wireless communication device of claim 1, wherein the site controller is configured to send a command message to the second wireless transceiver, wherein the command message includes a "to address" portion, and wherein the "to address" portion identifies a manufacturer of the second remote device.*

32. *The wireless communication device of claim 1, wherein the site controller is configured to send a command message to the second wireless transceiver, wherein the command message includes a "to address" portion, and wherein the "to address" portion identifies an owner of the second remote device.*

33. *The wireless communication device of claim 1, wherein the site controller is configured to send a command message to the second wireless transceiver, wherein the command message includes a "to address" portion, and wherein the "to address" portion identifies that the command message is directed towards all remote devices.*

34. *The wireless communication device of claim 1, wherein the site controller is configured to send a command message to the second wireless transceiver, and wherein the command message controls an actuator associated with the second remote device.*

35. *The wireless communication device of claim 34, wherein the command message controls a change in a current actuator setting of the actuator.*

36. *The wireless communication device of claim 1, wherein a data field of an upstream message identifies a number of upstream repeaters and sets a number of retries by each identified upstream repeater.*

37. *The wireless communication device of claim 1, wherein the plurality of wireless transceivers includes a first wireless transceiver, and wherein the first wireless transceiver has two unique addresses comprising a first repeater address and a first unique non-repeater address.*

38. *The wireless communication device of claim 37, wherein the first wireless transceiver is configured to substantially repeat messages directed to the first unique repeater address, and is configured to not repeat messages directed to the first unique non-repeater address.*

39. *The wireless communication device of claim 37, wherein the first wireless transceiver is configured to evaluate an incoming message to determine whether the incoming message is directed to the first unique repeater address or is directed to the first unique non-repeater address.*

40. *The wireless communication device of claim 39, wherein the first wireless transceiver is configured to, upon a determination that the incoming message is directed to the first unique repeater address, substantially repeat the incoming message.*

41. *The wireless communication device of claim 39, wherein the first wireless transceiver is configured to, upon a determination that the incoming message is directed to the first unique non-repeater address, perform a function according to the incoming message.*

42. *The wireless communication network of claim 5, wherein the first message originating from the site controller is assigned a first message number by the site controller which identifies the first message.*

43. *The wireless communication network of claim 42, wherein a second message responding to the first message has a second message number which identifies the second message, and wherein the second message number is equal to the first message number incremented by one.*

44. *The wireless communication network adapted for use in an automated monitoring system for monitoring and controlling a plurality of remote devices via a host computer connected to a wide area network, the wireless communication network comprising:*

*a plurality of wireless transceivers comprising at least a first wireless transceiver and a second wireless transceiver;*

*a site controller in communication with at least the second wireless transceiver,*

*the first wireless transceiver having a first unique identifier, being configured to receive a first sensor data signal from a first remote device, and being configured to transmit a first original data message comprising the first unique identifier and the first sensor data signal;*

*the second wireless transceiver having a second unique identifier, being configured to receive a second sensor data signal from a second remote device, and is configured to transmit a second original data message comprising the second unique identifier and the second sensor data signal,*

*the second wireless transceiver being further configured to receive the first original data message from the first wireless transceiver, and to transmit a first repeated upstream data message including the first unique identifier and the first sensor data signal,*

*the first wireless transceiver being further configured to receive the second original data message from the second wireless transceiver, and to transmit a second repeated upstream data message including the second unique identifier and the second sensor data signal,*

*the transmissions having a predefined wireless communication protocol, and*

*the site controller being configured to: receive the data messages, identify each remote device associated with each sensor data signal in each received data message, and provide information related to each sensor data signal in each received data message to the wide area network for delivery to the host computer.*

45. *The wireless communication network of claim 44, further comprising a plurality of repeaters having unique* identifiers, each of the plurality of repeaters being in communication with at least one of the plurality of wireless transceivers and being configured to receive the first original data message transmitted by the at least one of the plurality of wireless transceivers and transmit a repeated data message using predefined communication protocol, the repeated data message including the sensor data signal from the first original data message and the unique identifier corresponding to the repeater.

46. The wireless communication network of claim 44, wherein the site controller is further configured to provide a command message to one of the plurality of wireless transceivers, each of the plurality of wireless transceivers being further configured to transmit, in response to the command message, a responsive original data message, wherein the responsive original data message corresponds to the command message.

47. The wireless communication network of claim 44, the predefined communication protocol comprising a data packet including:
   a receiver address identifying the receiver of the data packet;
   a sender address identifying the sender of the data packet; and
   a command indicator specifying a predefined command code.

48. The wireless communication network of claim 47, wherein the data packet further comprises:
   a packet length indicator which indicates a total number of bytes in the current packet;
   a total packet indicator which indicates the total number of packets in the current message;
   a current packet indicator which identifies the current packet; and
   a message number identifying the current message.

49. The wireless communication network of claim 48, wherein a first message originating from the site controller is assigned a first message number by the site controller which identifies the first message.

50. The wireless communication network of claim 49, wherein a second message responding to the first message has a second message number which identifies the second message, and wherein the second message number is equal to the first message number incremented by one.

51. The wireless communication network of claim 44, wherein the plurality of wireless transceivers are further configured to receive signals via Bluetooth technology.

52. The wireless communication network of claim 44, wherein the plurality of wireless transceivers are further configured to receive signals via IEEE standard 802.11(b).

53. The wireless communication device of claim 44, wherein the site controller is configured to send a command message to the second wireless transceiver, the command message including a "to address" portion, wherein the "to address" portion identifies the second wireless transceiver and identifies a device type of the second remote device.

54. The wireless communication device of claim 44, wherein the site controller is configured to send a command message to the second wireless transceiver, the command message including a "to address" portion, wherein the "to address" portion identifies a manufacturer of the second remote device.

55. The wireless communication device of claim 44, wherein the site controller is configured to send a command message to the second wireless transceiver, the command message including a "to address" portion, the "to address" portion identifies an owner of the second remote device.

56. The wireless communication device of claim 44, wherein the site controller is configured to send a command message to the second wireless transceiver, the command message including a "to address" portion, wherein the "to address" portion indicates that the command message is directed toward all remote devices.

57. The wireless communication device of claim 44, wherein the site controller is configured to send a command message to the second wireless transceiver, the command message controlling an actuator associated with the second remote device.

58. The wireless communication device of claim 57, wherein the command message controls a change in a current actuator setting of the second remote device.

59. The wireless communication device of claim 44, wherein a data field of an upstream message identifies a number of upstream repeaters and sets a number of retries by each identified upstream repeater.

60. The wireless communication device of claim 44, wherein the first wireless transceiver has two unique addresses comprising a first unique repeater address and a first unique non-repeater address.

61. The wireless communication device of claim 60, wherein the first wireless transceiver is configured to substantially repeat messages directed to the first unique repeater address, and is configured to not repeat messages directed to the first unique non-repeater address.

62. The wireless communication device of claim 60, wherein the first wireless transceiver is configured to evaluate an incoming message to determine whether the incoming message is directed to the first unique repeater address or is directed to the first unique non-repeater address.

63. The wireless communication device of claim 62, wherein the first wireless transceiver is configured to, upon a determination that the incoming message is directed to the first unique repeater address, substantially repeat the incoming message.

64. The wireless communication device of claim 62, wherein the first wireless transceiver is configured to, upon a determination that the incoming message is directed to the first unique non-repeater address, perform a function according to the incoming message.

* * * * *